United States Patent [19]
Gilbert

[11] Patent Number: 5,590,356
[45] Date of Patent: Dec. 31, 1996

[54] MESH PARALLEL COMPUTER ARCHITECTURE APPARATUS AND ASSOCIATED METHODS

[75] Inventor: Ira H. Gilbert, Carlisle, Mass.

[73] Assignee: Massachusetts Institute of Technology, Cambridge, Mass.

[21] Appl. No.: 294,757

[22] Filed: Aug. 23, 1994

[51] Int. Cl.⁶ .................................................. G06F 13/00
[52] U.S. Cl. .............. 395/800; 395/200.01; 364/DIG. 1; 364/228; 364/229; 364/242.3; 364/231.9; 364/230.4
[58] Field of Search ............................ 395/800, 200.01, 395/200.02, 309, 445, 495, 842; 364/131–133, 736, 780

[56] References Cited

U.S. PATENT DOCUMENTS

| | | | |
|---|---|---|---|
| 3,979,728 | 9/1976 | Reddaway | 340/172.5 |
| 4,101,960 | 7/1978 | Stokes et al. | 364/200 |
| 4,314,349 | 2/1982 | Batcher | 364/716 |
| 4,463,423 | 7/1984 | Potash et al. | 364/200 |
| 4,466,061 | 8/1984 | Desantis et al. | 364/200 |
| 4,468,736 | 8/1984 | Desantis et al. | 364/200 |
| 4,598,400 | 7/1986 | Hillis | 370/60 |
| 4,701,847 | 10/1987 | Nichols | 364/200 |
| 4,729,095 | 3/1988 | Colley et al. | 364/200 |
| 4,782,444 | 11/1988 | Munshi et al. | 364/300 |
| 4,873,626 | 10/1989 | Gifford | 364/200 |
| 4,967,326 | 10/1990 | May | 364/220 |
| 5,031,092 | 7/1991 | Edwards et al. | 364/200 |
| 5,038,282 | 8/1991 | Gilbert et al. | 364/200 |
| 5,045,993 | 9/1991 | Murakami et al. | 364/200 |
| 5,101,480 | 3/1992 | Shin et al. | 395/325 |
| 5,113,523 | 5/1992 | Colley et al. | 395/800 |
| 5,121,498 | 6/1992 | Gilbert et al. | 395/700 |
| 5,150,290 | 9/1992 | Hunt | 364/736 |
| 5,179,672 | 1/1993 | Genduso et al. | 395/375 |
| 5,239,654 | 8/1993 | Ing-Simmons et al. | 395/800 |
| 5,243,698 | 9/1993 | May | 395/200 |
| 5,251,303 | 10/1993 | Fogg, Jr. et al. | 395/275 |
| 5,280,607 | 1/1994 | Bruck et al. | 395/575 |
| 5,349,682 | 9/1994 | Rosenberry | 395/800 |
| 5,355,492 | 10/1994 | Frankel et al. | 395/700 |
| 5,361,363 | 11/1994 | Wells et al. | 395/800 |
| 5,367,636 | 11/1994 | Colley et al. | 395/200 |

OTHER PUBLICATIONS

Bouknight et al., "The Illiac IV System", *Proceedings of the IEEE*, 60:369–388 (1972).

Hillis, Daniel, "The Connection Machine", *Scientific American*, 108–115 (1987).

Hunt et al., "Application of a Parallel Processor to the Solution of Finite Difference Problems", *Elliptic Problem Solvers*, 339–344 (1981).

Norrie, "Supercomputer for Superproblems: An Architectural Introduction", *IEEE*, 62–73 (1984).

D. Parkinson, "The Distributed Array Processor", *Computer Physics Communications*, 28:325–337 (1983).

Reed et al., "The Aspro Parallel Inference Engine", *Digital Systems Department, Goodyear Aerospace*, 248–259 (1973).

(List continued on next page.)

*Primary Examiner*—Mehmet B. Geckil
*Attorney, Agent, or Firm*—Testa, Hurwitz & Thibeault, LLP

[57] ABSTRACT

A Monolithic Synchronous Processor (MeshSP) processes data and incorporates a mesh parallel computer architecture, primarily SIMD, thereby combining high data throughput with modest size, weight, power and cost. Each MeshSP processor node utilizes a single DSP processor element, a large internal memory of at least 128k-bytes, and separately operable computational and I/O processing sections. The processor element provides data throughput of at least 120 MFlops. The processor is programmed in ANSI C and without parallel extensions. A combination of on-chip DMA hardware and system software simplifies data I/O and inter-processor communication. The MeshSP is programmed to solve a wide variety of computationally demanding signal processing problems. A functional simulator enables MeshSP algorithms to be coded and tested on a personal computer.

40 Claims, 16 Drawing Sheets

OTHER PUBLICATIONS

Smith, Douglas R., "The Architecture of the Massively Parallel Processor", *IEEE*, 56–59 (1987).

Tsoras, John, "The Massively Parallel Processor", *Digital Technology Department, Goodyear Aerospace Corporation*, 196–201 (1981).

"User Manual for the ILLIAC IV System", *Burroughs Corporation*, (1960 and 1973).

O'Donnell, "Parallel VLSI Architecture Emulation and the Organization of ASPA/MPP", *First Symposium on the Frontiers of Massively Parallel Computation, NASA's Goddard Space Flight Center*, 75–84 (1986).

"Technical Summary–The Massively Parallel Processor", *First Symposium on the Frontiers of Massively Parallel Scientific Computation, NASA's Goddard Space Flight Center*, 293–298 (1986).

Diefendorff et al., "Organization of the Motorola 88110 Superscalar RISC Microprocessor", *IEEE Micro*, 40–63 (1992).

Wodopian, Mike, "High Performance DMA for the VMEbus", *Digital Design*, 89–94 (1985).

Srinivasan et al., "A Novel Addressing Scheme for Two Dimensional Data Access in Digital Signal Processors", *IEEE*, 1:2–6 (1989).

Srinivasan et al., "Two–Dimensional Addressing Scheme for Digital Signal Processors", *Electronics Letters*, 8:677–679 (1991).

Johnson, I. C., "A Microcontolled DMA with Versitile Linked List Capability for Lan Gateway Applications", *IEEE*, (1986).

"Request for Proposal for the Development and Fabrication of a Monolithic Synchronous Processor Slave Element", (1990).

Gilbert et al., "The Monolithic Synchronous Processor", *Lincoln Laboratory, Massachusetts Institute of Technology*, (1994).

"ADSP—21060 Preliminary User's Manual–SHARC", *Analog Devices*, (1993).

"ADSP–2106x SHARC Preliminary User's Manual", *Analog Devices*, (1994).

"ADSP–21060/62 SHARC Preliminary Data Sheet ADSP–21060/62 SHARC Super Harvard Architecture Computer", *Analog Devices*, (1994).

"ILLIAC IV Systems Characteristics and Programming Manual." *Goodyear Aerospace Corporation.*, Nasa CR-2159: 2–10 to 2–12 (1973).

Batcher, Kenneth E., "Architecture of the MPP." *Goodyear Aerospace Corporation.*, 170–174.

Batcher, Kenneth E., "Array Unit." *Goodyear Aerospace Corporation.*, 1–190.

Batcher, Kenneth E., "The MPP in the Future." *Defense Systems Division Goodyear Aerospace Corporation.*, 60–62 (1987).

Bond, John, "Parallel–Processing Concepts Finally Come Together In Real Systems." *Computer Design.*, 51–74 (1987).

Fisher, James R. "Frontiers of Massively Parallel Scientific Computation." *National Aeronautics and Space Administration.*, Nasa CP-2478: 1–321 (1987).

Mokhoff, Nicolas, "Parallelism Breeds A New Class of Supercomputers." *Computer Design.*, 53–65 (1987).

Norrie, Chris, "Supercomputers for Superproblems: An Architectural Introduction." *Computer.*, 62–73 (1984).

Reed, et al., "The Aspro Parallel Inference Engine (A Real–Time Expert System)." *Goodyear Aerospace Corporation.*, 248–259.

Smith, Douglas R., "The Architecture of the Massively Parallel Processor." *Goodyear Aerospace Corporation.*, 56–59 (1987).

Tsoras, John, "The Massively Parallel Processor (MPP) Innovation In High Speed Processors." *Goodyear Aerospace Corporation.*, 196–201 (1981).

User Manual for ILLIAC IV System by Burroughs Corporation, 1960's.

Joe E. Brewer et al, "A Monolithic Processing Subsystem", IEEE Transactions on Components Packaging and Manufacturing Technology, Part B, vol. 17, No. 3, Aug. 1994.

```
Loop over TCBs
{
    read path information
    if end of program, break
    if end of TCB, continue
    SYNCHRONIZE with all the slaves
    loop over one-slave shifts
    {
        get transmit and receive directions for this shift.
        get a constant from the constant register, if needed.
        set "done" flag if all shifts have been traversed.
        if not done
        {
            make sure transmit and receive directions match
            determine destination slave number for this shift
            pass along the constant from constant register.
        }
        update array of destination handles for each slave
        if this is the last shift or broadcast mode
        {
            SYNCHRONIZE with all the slaves
            write destination handles to slaves via pipes
        }
    if done, break
    }
}
```

Fig. 13

```
loop over TCBs in a chain
{
    send the TCB to the server
    if the chain pointer is FINI, break
    SYNCHRONIZE with server
    get leg lengths
    loop over the "stores" (normally one; more for broadcast)
    {
        SYNCHRONIZE with server
        read CM destination write handle via CM read handle
        write data, according to TCB, via CM dest. write handle
        read data, according to TCB, via CM read handle
    }
}
```

Fig. 14

MESH PARALLEL COMPUTER ARCHITECTURE APPARATUS AND ASSOCIATED METHODS

This invention was made with government support under Contract Number F19628-90-C-0002 awarded by the Air Force. The government has certain rights in the invention.

FIELD OF THE INVENTION

The invention generally relates to methods and apparatus for processing data. More particularly, the invention concerns methods and apparatus for synchronously processing data using nearest-neighbor mesh communications.

BACKGROUND OF THE INVENTION

Computer architectures which utilize parallel or synchronous processing hardware and software are known. Such architecture are particularly known for increasing the speed at which computationally sensitive data is processed.

Typical prior art synchronous processing architectures are specially designed to accommodate a particularly demanding processing problem. These specialized designs usually result in a system that has separate processing functions allocated to separate hardware subsystems, an approach which is both costly and inflexible. Such an organization makes it particularly difficult to reallocate processor resources between hardware subsystems as requirements change. In addition, the unique hardware of each subsystem demands its own design effort.

It is, accordingly, an object of the invention to provide a high speed data processor which is more flexible and less costly than existing processors with comparable processing power.

It is another object of the invention to provide a monolithic processor element which may be paired with other processor elements to form an efficient and programmable synchronous processing system.

Still another object of the invention is to provide methods for transferring and collecting data communicated between processor elements in a digital data processing system.

These and other objects will be apparent in the specification which follows.

SUMMARY OF THE INVENTION

As used herein, "processing element" denotes a digital signal processing chip which processes data. "Master processor" or "master" denotes a processing element which additionally broadcasts instructions to like or similar processing elements for synchronous processing. "Slave" or "slave processor element" denotes a processor element which receives and executes instructions by the master processor.

One aspect of the invention is directed to a parallel computer architecture which incorporates a Mesh Synchronous Processor (MeshSP). The MeshSP is preferably a Single Instruction-Stream Multiple DataStream (SIMD) architecture which connects to a host computer and which includes (i) a single monolithic processor element as a master processor, (ii) an array of slave processor elements connected via a two-or-three-dimensional nearest-neighbor mesh, (iii) a Serial Input/Output (SIO) module, and (iv) program memory. Each processor element provides digital signal processing capability, and contains a large on-chip memory and special hardware to facilitate interprocessor communications and SIMD-compatible data transfers. The master processor is similar to other processor elements; and in addition has direct access to the relatively large off-chip program memory which stores MeshSP program software and data.

In operation, the host first downloads a program to the MeshSP program memory. The master processor thereafter retrieves instructions from the program memory; and simultaneously broadcasts the instructions to the processor array for parallel execution. Data may be concurrently passed between the slave array and the host computer "in the background", i.e., without interrupting primary parallel processing activities. This data is mediated by the SIO module, which communicates with the slave array and with a bus structure connecting the host computer to the master processor and program memory.

Each processor element contains a relatively large internal memory, i.e., between approximately 256k-bytes and one M-bytes, to store data and instructions. Each element also contains a computational core processor section, an I/O processing section, and high speed data links to communicate with other processing elements. Interprocessor communication hardware between the several slaves and master processor includes the capability to re-map logical directions in the software to physical links. This enables various processor-dependent communication patterns and processor connectivity changes with minimum impact on application software.

Preferably, the instructions at each slave processor element are identical; but the executable data stored within the internal memory are different from other slave processor elements. In this manner, the array processes a large block of data in parallel, thereby spreading out the processing power of the array to minimize the overall execution time.

In accord with one aspect of the invention, data transfers are specified with a standard data structure, denoted as a Transfer Control Block (TCB), which is often stored in the processor element's internal memory. Such transfers include input and output with the host computer, and interprocessor data movements. TCBs designate an arrangement of data in two-dimensional form which may be partitions of larger arrays or sparsely sampled arrays. The I/O processor section controls data transfers specified by a chain of TCBs without intervention by, or interference with, the core (arithmetic) functions of the core processor section. The capabilities of the processor element enhance throughput by means of concurrent computation and communication.

In other aspects of the invention, MeshSP program software utilizes explicit and symmetric problem decomposition across the slaves. The application software is written in ANSI standard C, without parallel extension. SIMD considerations do however impose programming restrictions, which are characterized by a few programming rules and by three classes of variables that are dependent upon location: on-chip, off-chip, and multiple-valued across the processor elements.

In still another aspect of the invention, a library of callable routines is provided to specify and direct data transfers. These routines range from the lowest level, i.e., specification of the contents of TCBs, to very high-level communication patterns spanning many, or all, of the processor elements.

In yet another aspect, the invention provides a functional simulator which permits the execution of MeshSP application code on an inexpensive workstation without the need for MeshSP hardware. Simulation permits the development, testing, and debugging of MeshSP applications written in C.

A multi-tasking operating system is employed to separately represent program execution in each processing element.

The MeshSP architecture preferably forms a printed circuit board suitable for interfacing with the backplane of a personal computer, operating as the host. In one aspect of the invention, the backplane is used for master/host communications; and the printed circuit board interconnects to the computer via a ribbon cable. In this manner, additional MeshSP printed circuit boards can be operated jointly to increase overall processing power. The processing power can also be adjusted by constructing the array with fewer or greater numbers of processor elements in the array.

There are several advantages of the invention. The MeshSP is architecturally simple, which facilitates software development, and which further encourages economical, low-powered, and compact hardware. As an example, processor element's large internal memory reduces the total amount of logic required to provide the MeshSP with the functions described herein. The MeshSP architecture is also multiuse, highly extensible, and can incorporate new device technology while maintaining investments in software and algorithm development.

The processor elements additionally provide considerable tolerance to interprocessor timing skew and delay, thereby permitting the construction of arrays of thousands of elements without sacrificing reliability. Further, various mesh connectivities are feasible: two-dimensional and three-dimensional rectangular meshes, as well as two-dimensional triangular and hexagonal meshes.

The MeshSP is particularly advantageous as an economical solution to computationally demanding multi-dimensional signal processing problems. It is particularly suitable, for example, in applications involving three-dimensional graphics or multi-dimensional signal processing, neural networks (e.g., multi-layer perceptions), tomographic reconstruction, large Fourier transforms, and the solution of large systems of linear equations.

One consequence of the SIMD architecture is that the MeshSP appears to the programmer as a single computer which executes a single program, even though there are many processor elements processing in parallel. This too reduces programming complexity.

The invention is next described further in connection with preferred embodiments, and it will be apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIG. 13 illustrates selective pseudo-code of actions suitable for a CM server in a functional simulator constructed according to the invention;

FIG. 14 illustrates selective pseudo-code of slave process actions during communications associated with a functional simulator constructed according to the invention.

DESCRIPTION OF THE PREFERRED EMBODIMENT

Figure 1:
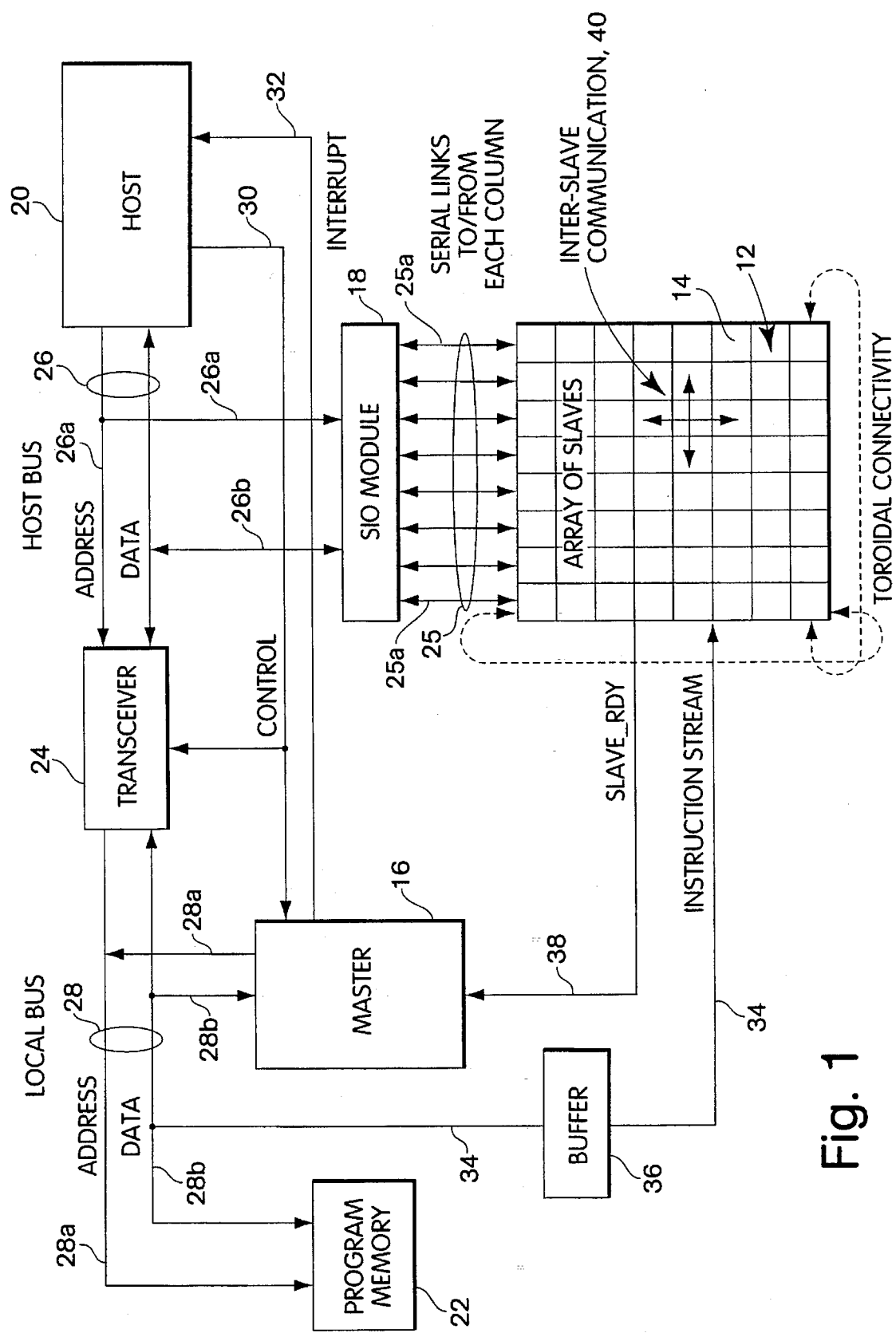
FIG. 1 shows a schematic block diagram of monolithic synchronous processor apparatus (MeshSP) constructed according to the invention.

FIG. 1 shows a Monolithic Synchronous Processor (MeshSP) 10 constructed according to the invention. The MeshSP 10 includes an array 12 of slave processing elements 14, a master processor 16, a Serial Input/Output (SIO) module 18, and a host computer 20. The master processor 16 is substantially the same as each slave 14, except that it has direct access to a large off-chip program memory 22. Program instructions are executed by the master 16 and broadcast to the processor array 12 for parallel execution, thereby obtaining the desired synchronous processing.

The host computer 20 provides control of the MeshSP 10 and preferably serves as an interface for external users. It accesses the master's external memory 22 via the transceiver 24, the host bus 26, and local bus 28. Each bus 26, 28 has, respectively, an address line 26a, 28a and a data line 26b, 28b. The host 20 initializes and interrupts the master processor 16 via control bus 30; while the master 16 interrupts the host 20 along interrupt bus 32 to demand a variety of services. Interrupts generated by the slaves 14 are either AND-ed or OR-ed before being transmitted to the master 16. This allows the master to flexibly respond to various error conditions in any slave, and to resume SIMD operations when all slaves are ready.

The master processor 16 communicates with the local bus 28 such that it accesses the stored program and data residing in the memory 22. Data and instructions from the memory 22 are broadcast by the master 16 to the processor array 12 via an instruction bus 34 and buffer 36. SIMD operation is recovered using a "slave ready" signal, which is communicated across all slaves 14 and to the master 16 via a slave ready bus 38. Other features described below enable conditional code and conditional debugging in a SIMD context.

Data input and output to the slaves is mediated by the SIO module 18. The SIO module 18 includes registers (shown in FIG. 7) for holding data in route, and connects to the array 12 via a set of one-bit wide, 40 Mhz serial data lines 25. The serial lines 25 are "daisy-chained" through a collection of slaves such that each line 25a connects to one column of slaves 14. Such an arrangement permits delivery of multivalued data to and from the array 12. The MeshSP 10 architecture accommodates other SIO arrangements so that the hardware complexity may be tailored to I/O bandwidth requirements for a particular application.

Figure 2:
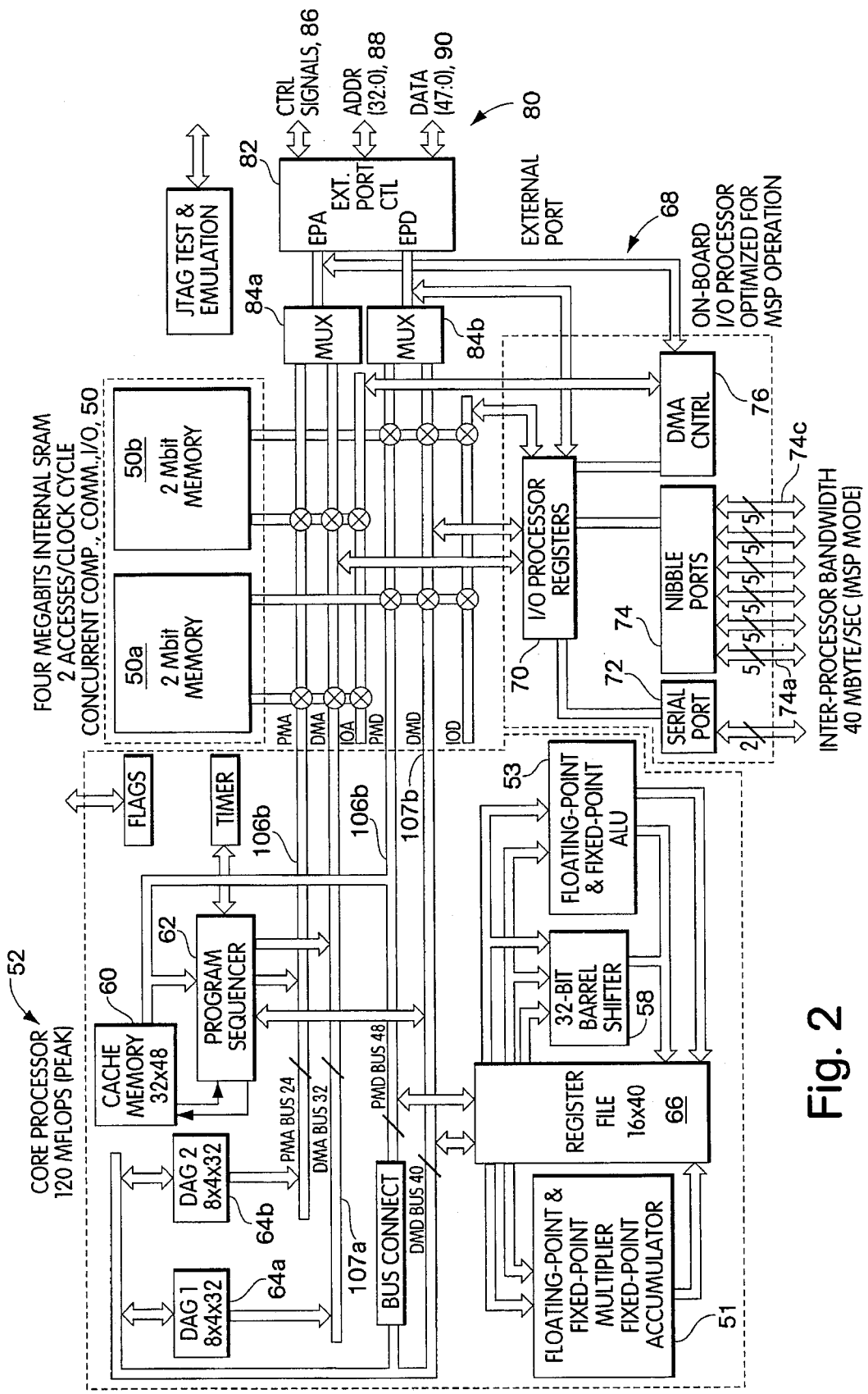
FIG. 2 shows a processing element for use in the apparatus of FIG. 1.

FIG. 2 shows the internal and operational hardware of a single processor element 14. A large on-chip memory 50 includes two separate SRAMs 50a, 50b which store data and processing instructions. In the illustrated embodiment, each SRAM 50a, 50b has 256k-byte of memory, although smaller memory, e.g., 128k-byte, is acceptable. A core processor section 52 includes a multiplier-accumulator 51, an Arithmetic Logic Unit (ALU) 53, and a 32-bit barrel shifter 58 to perform single-cycle operations. Other components of the core processor section 52 include a cache memory 60, a program sequencer 62, two Data Address Generators (DAGs) 64a, 64b, and a register 66 to load and unload data from the memory 50a, 50b.

More particularly, the multiplier-accumulator 51 performs floating-point arithmetic operations on data. The ALU 53 performs logical and integer operations. The barrel shifter 58 aligns data for such operations as floating-point addition. The cache memory 60 temporarily retains instructions from the program sequencer so that the program bus 106 may be used to access data. The DAGs 64a, 64b are used to access data that is read from, or stored to, the memory 50a, 50b.

Processor element 14 also contains an I/O processor section 68 which includes an I/O processor register 70, a serial port 72, nibble ports 74, and a DMA controller 76. The I/O processor register 70 is used to load and unload data from the memory 50a, 50b, and from a variety of other data ports, e.g., from the serial port 72, nibble ports 74, and the DMA controller 76. The nibble ports 74 are a series of six interprocessor communication data links 74a . . . 74f which communicate via a nearest-neighbor mesh to other processor elements. The links 74a . . . 74f are four bits wide, and operate one at a time at 80 Mhz for an interprocessor bandwidth of 40M-bytes/sec at each slave.

The illustrated processor element 14 of FIG. 2 also has an external port 80 which includes an external port control 82 and multiplexers (MUXs) 84a, 84b. The port 80 communicates with other components of the meshSP 10, FIG. 1, and thus provides interface to a control signal bus 86, an address bus 88, and a data bus 90.

Those skilled in the art will appreciate that the illustrated processor 14 of FIG. 2 includes interconnections to communicate among the various components, and may include other sub-components (not shown) to facilitate and construct a processor element as described herein. Accordingly, various additions and subtractions of the processor element 14 may be made without departing from the scope of the invention.

With further reference to FIG. 1, the slaves 14 execute code broadcast by the master processor 16 as well as code stored on their internal on-chip memory 50a, 50b. The slaves 14 communicate on a nearest-neighbor mesh 40 with up to six interprocessor high speed links per slave 14, making a number of topologies possible. In the preferred embodiment illustrated in FIG. 1, the array 12 is formed by a 2D toroidally connected 8×8 array of slaves. Four of these links implement a 2D toroidal network, and two of the links reach to the next-nearest neighbors on the same row. This permits "column jumping" to provide a form of fault tolerance. Other 3D geometries may be implemented with fully synchronized communication to form a variety of other multi-processor and uni-processor configurations.

Interprocessor communication hardware within the processor element 14 thus includes the capability to re-map logical directions in the software to physical links. This enables various processor-dependent communication patterns and processor connectivity changes with minimum impact on application software.

The processor elements 14, 16 of the meshSP 10 are ideally suited to SIMD operation due to the single-cycle execution of instructions and the inclusion of a rich set of single-cycle conditional operations. Accordingly, the MeshSP 10 primarily supports SIMD processing, although a number of non-SIMD capabilities are supported. For example, the MeshSP 10 supports Multiple Instruction-Stream Multiple Data-Stream (MIMD) computations when code segments are loaded into a processor element's on-chip memory 50a, 50b, FIG. 2.

Several key features of the processor elements facilitate the operations of the MeshSP 10, including:

(a) 512k-byte of fast, on-chip memory (SRAM);

(b) 16, 32 and 40 bit floating point formats;

(c) six high speed communication ports for interprocessor communication, each at 40M-byte/sec bandwidth;

(d) two-dimensional DMA controllers;

(e) nested zero overhead loops and delayed branching.

(f) instruction set compatible with SIMD operation(data insensitive);

(g) Non-interfering access of memory by the core processor section and the I/O processor section;

(h) Five M-byte/sec input/output;

(i) 120 MFLOPS peak data throughput;

(j) auto-chaining of transfer control blocks (TCBs).

These key features will be described in greater detail in the sections which follow.

TCBs specify the data involved in a data transfer, and separately indicate the source and destination locations for data transfers. TCBs designate a general arrangement of data in two-dimensional form, such as arrays, partitions of larger arrays, or sparsely sampled subsets of arrays. TCBs are stored in the processor element's on-chip memory 50a, 50b, or in the master memory 22; they are also created on-the-fly or they may be repeatedly reused, depending upon time and memory constraints. Very complex data transfers are specified by "chaining" a sequence of TCBs, as described in more detail in connection with FIG. 3. The processor element's on-chip I/O processor section hardware 68 will complete a data transfer indicated by a chain of TCBs without intervention by the core processor section 52. On completion, a processor interrupt is generated and communicated to the host computer 20 via the slave ready signal line 38.

There are two general types of data transfers: input and output between a processor element and the host 20; and interprocessor communication between processor elements in the array 12. These two different data transfers share a common DMA mechanism in the hardware of each processor element and are specified by TCB data structures. In each case, one channel of the DMA hardware serves to move data into the processor element, while another channel moves data out. The transfers are carried out independently of, and non-interfering with, the computational core processor section 52 of the processor element due to its dual-ported memory. Data transfers are also "through-routed", and are stored in memory only after arriving at the destination processing element. Such transfers thus bypass the internal memory of intervening slaves when there is communication between non-adjacent slaves. In this manner, the processor element enhances throughput via concurrent computation and communication. An interprocessor TCB transfer is described in more detail in connection with FIG. 3.

MeshSP software provides features to facilitate concurrency between computation and interprocessor communication, even in difficult situations. Communication requests are queued in two ring buffers with different priorities, as described in more detail in connection with FIG. 8. In a situation where the computational task depends on, and waits for, the result of a small communication operation, the operation may be placed on the high-priority buffer 36, FIG. 1, and dispatched after the currently active TCB completes. In a situation where a large communication task must wait for the result of a small amount of computation, the programmer may specify a vector to a C function to be executed on receipt of the interrupt after a communication chain is complete, without disrupting other computational tasks in progress.

Programs processed by the MeshSP 10 utilize explicit and symmetric problem decomposition across the slaves 14; and are therefore typically formulated by an algorithm designer. Alternatively, program parallelization codes may be used to eliminate some or all of the specialized programming. MeshSP code development is nevertheless facilitated by the simplicity of the architecture, the autonomous nature of the data transfers, the extensive use of standard commercially available tools, e.g., compilers and debuggers, and the availability of a library of MeshSP-specific services.

A substantial library of MeshSP routines described in greater detail below provides common signal processing operations and functions specific to the MeshSP 10. Several functions are available, for example, to specify and direct data transfers. These range from the lowest level, specification of the contents of TCBs, to very high-level communication patterns spanning many or all of the slaves 14. There is also a collection of functions implementing one-dimensional and two-dimensional fast Fourier transforms (FFTs) for radix-2 and radix-3 cases. Other routines perform common matrix operations.

SIMD Processing

The following SIMD operation is the common mode of operation for the MeshSP 10 of FIG. 1. The master processor 16 first executes the program from its external memory 22. As each instruction is fetched from memory 22, it appears on the data bus 28b, 26b and is broadcast to the array 12 of slaves 14. Each slave 14 attempts to fetch its own instructions by generating addresses into its own (non-existent) external memory space. Each broadcast instruction from the master processor 16 arrives at the slave 14 in time to satisfy the slave memory read. Thus, each slave 14 effectively has a copy of the master's program. The same procedure can provide the slaves 14 with copies of data items in the external memory 22.

SIMD operation depends on proper timing for the receipt of data from the master processor 16. Distribution of the broadcast information involves electrical buffering and transmission delays, particularly for a large array of slaves 14. Synchronization is ensured by broadcasting the system clock along with the instruction stream on the instruction bus 34. Thus, slave processing can follow master processing by several clock cycles, and the delays are arranged so that the slaves are closely synchronized.

MIMD Options

The slave's capability to execute code from its own internal memory, e.g., memory 50a, 50b of FIG. 2, enables limited forms of MIMD processing. The master processor 16, executing its SIMD program, can broadcast a section of code as data to the internal memory space. The code must be self-contained in terms of program flow: no jumps out of the section are permitted. The master processor 16 can transfer control to this internal code, and all the slaves will do the same. Once internal code execution is underway, the usual SIMD restrictions are not in effect. For example, the slaves 14 may independently branch on the basis of slave-dependent data values. Of course, there must be a mechanism for re-establishing SIMD operation.

Full MIMD Operation

SIMD synchronization can be regained with the following handshaking dialogue. As MIMD processing commences, the master processor 16 and slaves 14 set their slave-ready output signals to FALSE. The master slave-ready output is used to generate an external signal that inhibits slave operation if an external memory access is made. As the slaves 14 independently finish their routines, they set their slave-ready signals to TRUE and branch to a pre-arranged location in external memory 22, causing a pause. Meanwhile, the master processor 16 polls its slave-ready input signal which becomes TRUE only when all the slaves 14 are simultaneously ready. Then the master 16 sets its slave-ready signal to TRUE, releasing the slaves 14 for subsequent SIMD processing.

This MIMD mechanism permits MIMD code segments to be executed, with a broadcast of the code and a re-establishment of SIMD operation for each segment. The amount of on-chip memory, however, constrains the size of these MIMD code segments.

Simple MIMD Conditionals

The MeshSP 10 also supports a simpler "if-then-else" construct in a MIMD context. The code for the "then" clause is maintained in external memory 22, while the code for the "else" clause is moved to the internal memory on every processor element. The code is structured so that:

1. The "else" clause is written as a jump to internal code, followed by a jump back to the location following the "then" clause.
2. The two clauses take the same number of cycles to execute (with NOP padding, if necessary).
3. The condition is always formulated as true for the master.

The slaves that branch to internal memory cease listening to the "then" clause broadcast by the master. The equality of execution time brings all slaves back into SIMD operation without any handshaking.

Conditional Debugging

The slave-ready signal can also be used to support slave-dependent debugging. An error condition is often anticipated at a particular point in the processing stream, such as a call to the square root function with a parameter outside the legal domain. A code fragment may be inserted at that point to check for that error condition. If the condition is violated in any slave, that slave sets the slave-ready signal to FALSE, interrupting the master processor 16. The master may then output a message to the host computer 20. It is necessary to compensate for the delay in the master's response by the insertion of a few NOPs in the code fragment.

Data Storage and SIMD Operation

During SIMD operation, the MeshSP 10 program can access both external (master) memory 22 and internal (master and slave) memory. Variables stored in the external memory 22 are termed master variables. When read by the program, the value of a master variable is fetched by the master processor 16 and broadcast to the slaves 14. When a master variable is written, it is written to external memory 22 by the master processor 16 alone. Since a master variable exists as a single copy, it may be freely used in conjunction with data dependent transfers of control: if statements, loop indices, subroutine calls, etc.

Variables stored internal to a processor element must be treated more carefully since their values in the master 16 and in the various slaves 14 are not necessarily tied together. In order to maintain proper SIMD synchronization, two classes of internal variables are distinguished: single-valued (or single) variables which are forced by the program to be identical in the master and all slaves; and multi-valued (or multi) variables whose values may differ between slaves. Single variables exist as multiple physical copies with a single numerical value, allowing them to be used as freely as master variables.

Single variables consume valuable internal memory. They are used in place of master variables primarily in two cases. First, the run-time program stack is necessarily maintained in internal memory in order to accommodate slave-dependent parameters. Since all variables declared within a function are maintained on the stack, they are stored in internal memory. When such variables are used for control transfer, they must be single variables. Secondly, it is often useful to maintain variables internally so as to free the instruction bus 34, FIG. 1. This allows internal data and external instructions, or internal data and external data, to be made available to the master processor 16 on a single cycle.

It is important that the program maintain the proper synchronization of single-valued variables, and not make inappropriate use of multi-valued variables. This is ensured by following the programming rules presented in the section below entitled "MeshSP Software".

Master-Host Interface

To the programmer, the MeshSP 10 appears like a conventional computer with all the usual facilities for storing and accessing data, and for communicating with the outside world. This is accomplished by exploiting the operating system of the host computer 20; and not by providing the MeshSP 10 with its own operating system.

Accordingly, the usual C language routines for opening files, reading the keyboard, etc., have been replaced in the MeshSP library with code that requests these services from the host 20. This indirect mechanism relies on the master's ability to interrupt the host, and on the host's ability to access the master's on-chip memory. All MeshSP operating system requests are thus initiated directly from the (single) MeshSP program stored in memory 22.

More particularly, in order to invoke any host operating system service, the master 16 first writes a word identifying the desired service into a specific location in external master memory 22. The master 16 then copies the parameter list of the calling function to a known location in external master memory 22. These parameters are usually pointers to data in master memory 22, but may, in some cases, be data themselves. The host computer 20 is then interrupted; and the host 20 thereafter branches to a general purpose master-host interrupt service routine.

The first action of this interrupt service routine is to cause the master 16 to relinquish the bus 26, 28 to its external data memory by means of the external bus tristate (TS) signal. The same signal is broadcast to the array 12 to maintain synchronism between the master 16 and slaves 14. At this point the host 20 is free to access this memory without interference from the master 16. The host 20 then reads the requested service identifier and parameter list from master memory 22. Based on the service identifier and parameter list, the host 20 performs the requested service, transferring data between host peripherals e.g., keyboard, screen, disk files, and external memory. Finally, the host 20 zeroes the service identifier in shared memory to indicate completion. At that point, the TS signal is released, allowing array processing to resume. The master 16 resumes processing activities once it determines that the service identifier has been reset. Depending on the nature of the requested service, the host 20 may read or write to various other locations in the external memory 22.

This same mechanism is used to initialize the MeshSP system 10. In such a case, both the TS and reset signals are first asserted, holding the master 16 at reset. The host 20 then downloads code and data to the external program memory 22 and then releases the master 16 to begin processing.

Autonomous Communication and I/O via Data Structures

The MeshSP 10 completes extensive and complex data transfers with reduced impact on computation. The two types of data transfers are interprocessor communication (denoted CM) and transfers between the host 20 and the slave array 12 via the Serial I/O links 26 (denoted SIO). Both transfer types may proceed concurrently with computation activities, and both are specified by compact data structures in memory.

Figure 3:
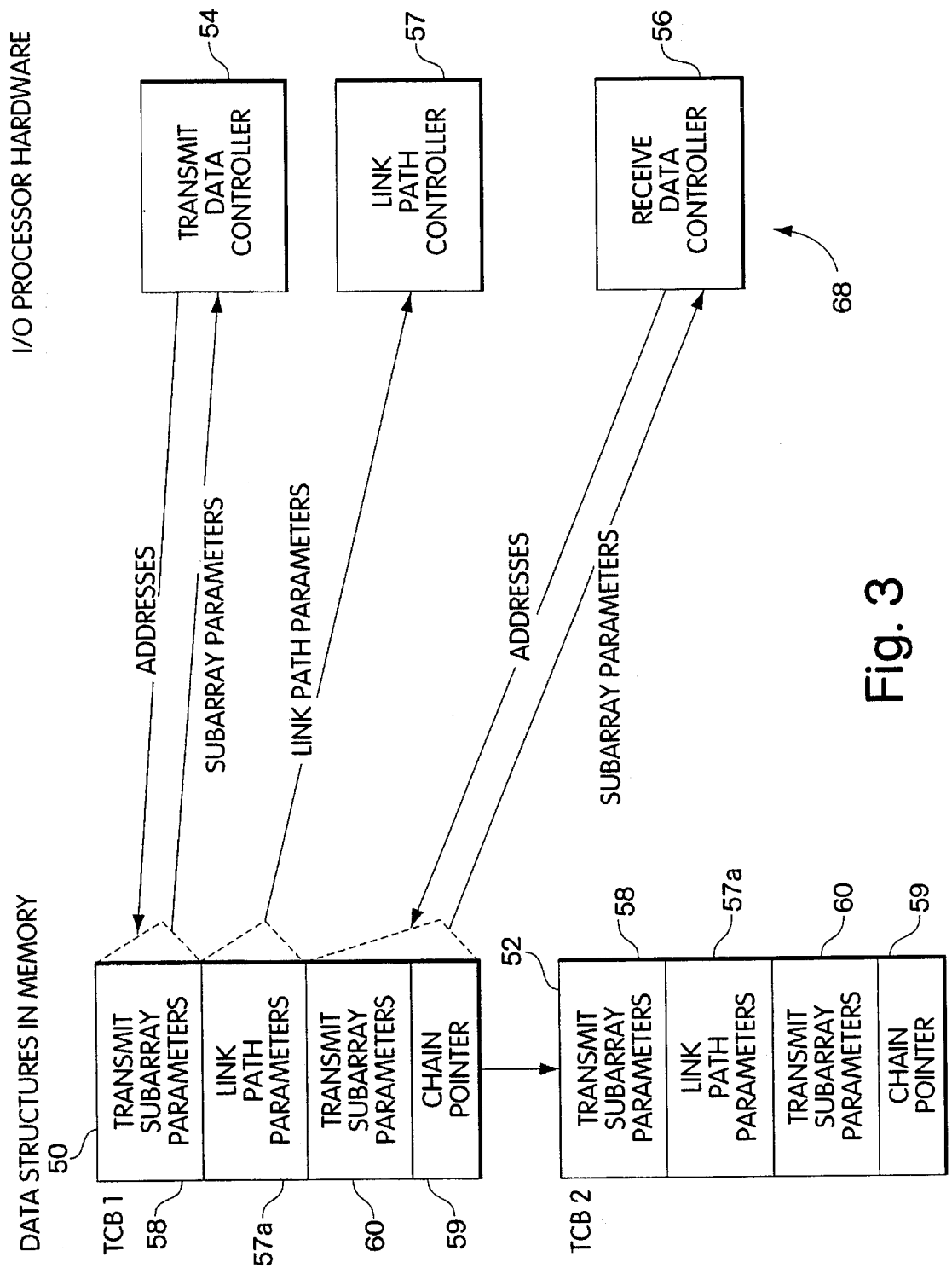
FIG. 3 schematically illustrates TBC data structures and their functional link through auto-chaining to the I/O processor section of the processor element shown in FIG. 2.

With reference to FIG. 3, both CM and SIO transfer specifications are done with the data structures called transfer control blocks (TCBs). TCBs, such as the illustrated TCBs 50 and 52, may be stored in external master memory if the transfers have no slave dependency. Often this is not the case, and the TCBs must be stored internally, e.g., within memory 50a, 50b of FIG. 2. If memory must be conserved, the TCBs may be created "on the fly." If processor time is at a premium, the TCBs may be created once and then repeatedly reused. Often, a mixed strategy is appropriate.

CM and SIO data transfers are carried out by the I/O processor section hardware 68 of FIG. 2, which is independent of, and non-interfering with, the computational core processor section 52. As shown in FIG. 3, two direct memory access (DMA) channels 54, 56 are provided for CM and two more for SIO. In each case, receive channel 56 serves to move data into the slave, while the transmit channel 54 moves data from the slave. A link controller 57 provides link path parameters for a TCB transfers. In the case of slave-to-slave communication, the need for two channels is obvious as each slave is necessarily both a source of data and a destination. Two channels are required for SIO as well because the SIO system is not only capable of simultaneous input and output, it is actually incapable of operating in one direction alone. One-way transfers are performed by transferring dummy data to or from a fixed internal memory location.

Corresponding to the receive and transmit channels 56 and 54 for CM or SIO, each TCB consists of two data blocks, one for each channel. While each processor element does not assume any relation between the locations of these two portions, the MeshSP software does. As further shown in FIG. 3, a MeshSP TCB is a single data structure, including a transmit section 58 and a receive section 60, and a chain pointer 59. The link path parameter section 57a can be separate from or integral with the sections 58, 60.

Figure 3A:
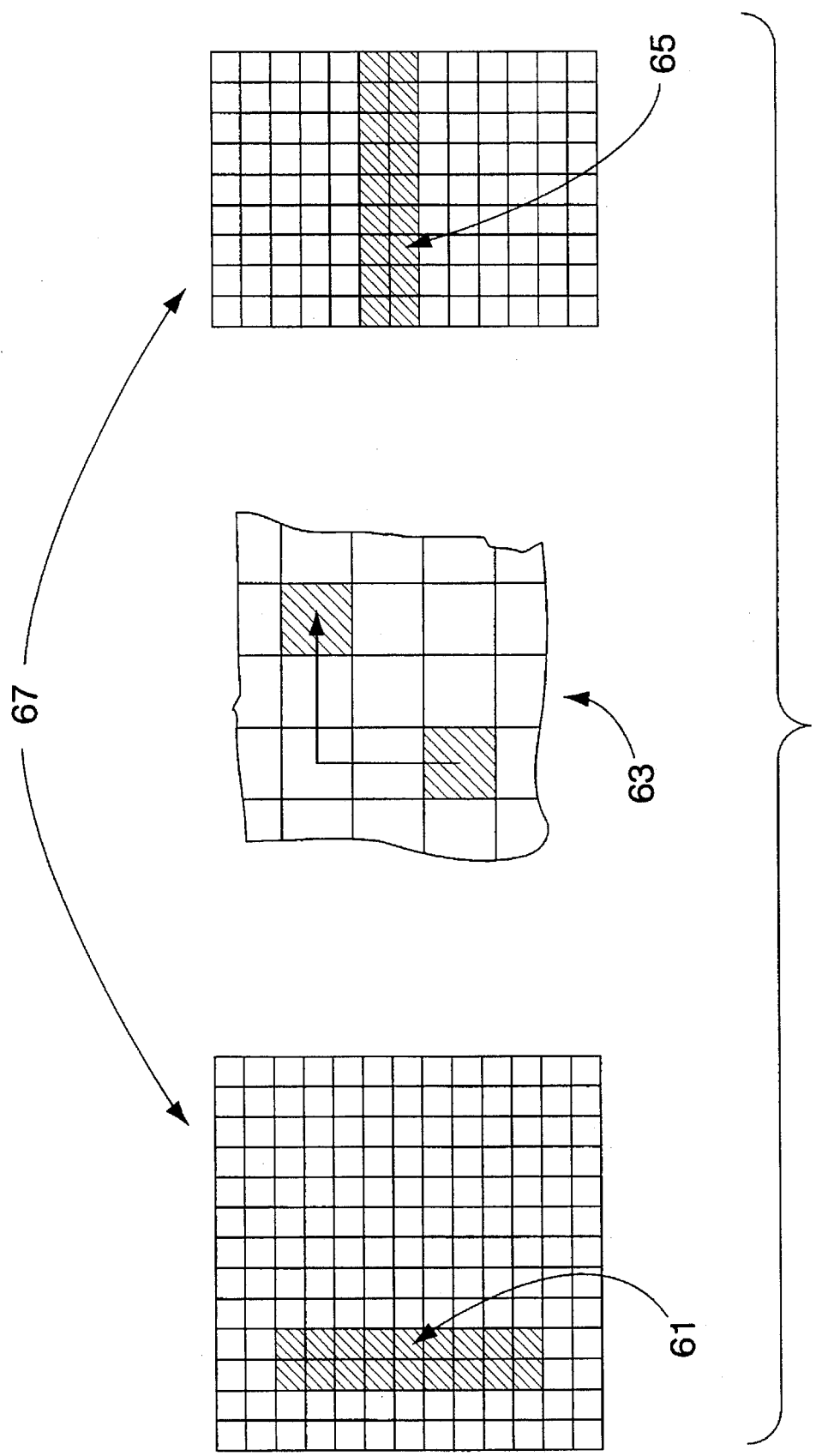
FIG. 3A illustrates an interprocessor data communication utilizing a TCB data structure in accord with the invention.

FIG. 3A illustrates the specification of an interprocessor communication with a TCB. More specifically, FIG. 3A shows a relatively complex communication pattern from a source data subarray 61, across an interprocessor path 63, and to a destination subarray 65. Each subarray 61, 65 is contained within the data arrays 67 of the processor element's internal memory. The TCB which specifies the illustrated communication includes information about the communication part 63, and the memory storage pattern for both the source and destination subarrays 61, 65.

Auto-chaining

Each DMA channel contains a register (chainpointer) which may be initialized with the starting location of the send or receive portion of a TCB. When these registers hold zeroes, the transfer hardware is quiescent. To initiate a CM or SIO transfer, the core processor section of the slave loads the transmit chain pointer register with the starting address of the transmit portion of the TCB, and then loads the receive chain pointer register with the starting address of the receive portion of the TCB. At that point, the DMA transfer hardware 68 becomes active and the core processor section 52 is free to turn its attention to other activities.

The first operation in a CM or SIO transfer is the transfer of the contents of transmit and receive portions 58 and 60 of the TCB to a processor element's internal control registers in the I/O processor section 68. These registers determine the arrangement of the transferred data in internal memory. In the case of a CM, the transmit portion of the TCB contains three additional words specifying the ports and duration for the transfer. They too are loaded automatically. With the control registers loaded, the transfer then runs to completion without further intervention by the core processor section 52.

A single TCB describes an elementary transfer, such as a data transfer from one two-dimensional subarray to another. A composite transfer is specified as a sequence of elementary transfers. Through auto-chaining, the MeshSP 10 of FIG. 1 is capable of carrying out an arbitrary sequence of such transfers without further participation of the core processor section 52.

Each channel of a TCB (receive or transmit) contains a word which may be a pointer to the same channel of the next TCB. These words, like other portions of the TCB, are loaded into the DMA control registers of the I/O processor section 68, FIG. 2. When the current transfer is complete, and if these chain pointers are not zero, the control registers are immediately loaded with the contents of the next TCB, initiating the corresponding transfer. The auto-chaining mechanism allows an arbitrary number of elementary CM or SIO transfers to be performed in sequence without interfering with the activities of the core processor section 52. The TCB pointer word contains an interrupt bit 61 which may be used to cause a hardware interrupt at the completion of the transfer specified by the TCB. This allows coordination of the transfer with arithmetic processing, as described below in the section entitled "Communication and I/O Support Software Data Structures".

Two-Dimensional Arrays and Subarrays

Figure 4:
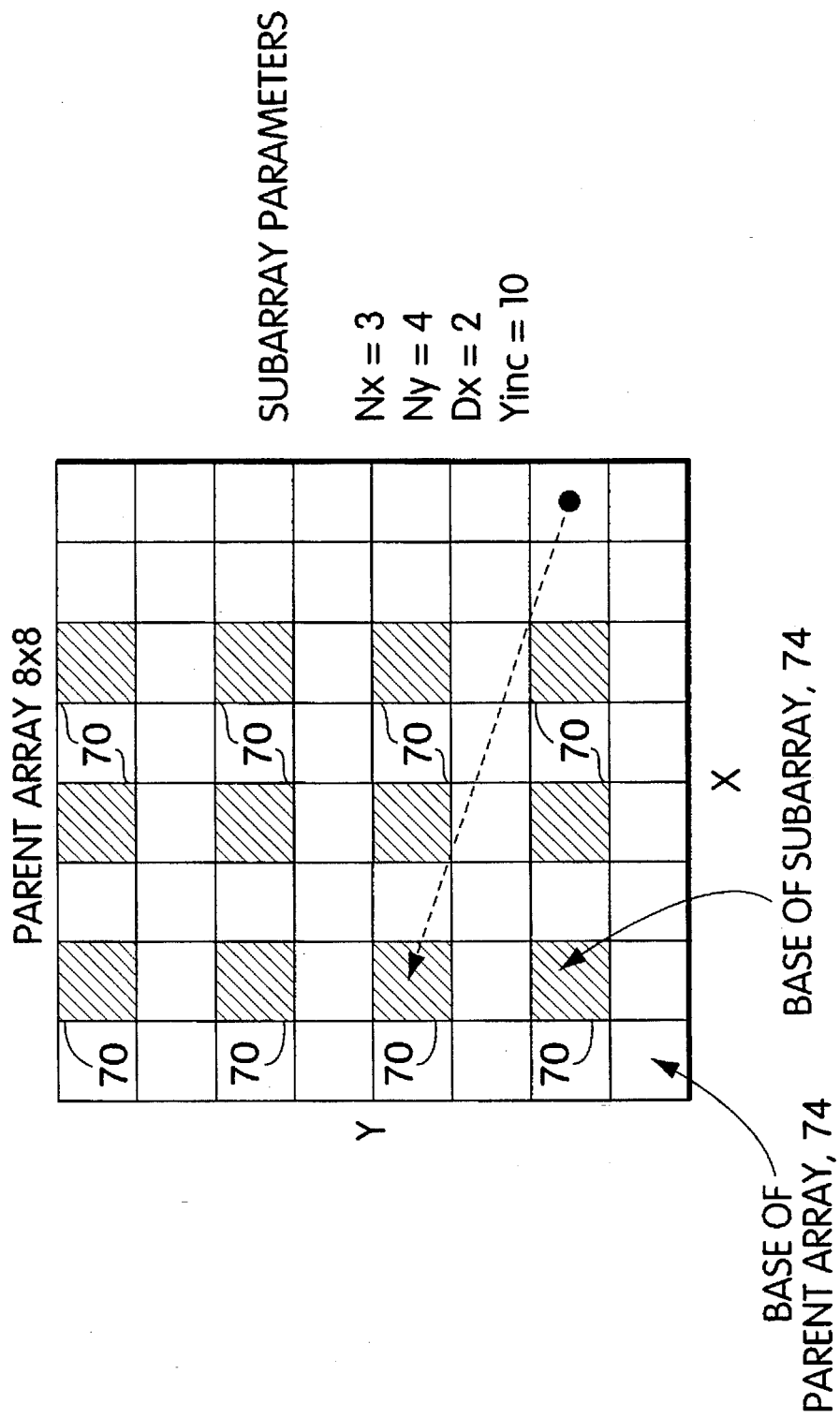
FIG. 4 schematically illustrates a typical construction of a two-dimensional array of data with a two-dimensional subarray in accord with the invention.

MeshSP algorithms often involve the transfer of multi-dimensional data arrays between the slaves 14, or between the array 12 and the host 20. A common operation, for example, involves the transfer of two-dimensional subarrays of two-dimensional parent arrays, or arrays of complex data, or data down sampled in the x- or y-directions (or both). An example of such a subarray is shown in FIG. 4, where a 3×4 downsampled subarray 70 is defined within an 8×8 parent array 72. The parent array 72 and subarray 70 have, respectively, a base address 76 and 74, as indicated.

The following parameters are used by the DMA hardware of the processor element to generate an address sequence:

| | |
|---|---|
| Addrs | base address of array |
| Nx | number of points in x-direction |
| Ny | number of points in y-direction |
| Dx | x step size |
| Yinc | y increment |

While the first four parameters have straightforward interpretations, the fifth does not. Yinc is the difference between the address increment when one moves from the end of one row to the beginning of the next; and Dx is the address increment between elements interior to a row. In general:

$$Yinc = Dy*Nx_{parent} - Dx*Nx,$$

where Dx and Dy are the basic steps in the x- and y-directions, and $Nx_{parent}$ and Nx are, respectively, the x dimensions of the parent array and subarray. Thus, while Yinc is not quite as fundamental as Dy, it is easily computed.

The five parameters which define a two-dimensional subarray, together with a chain pointer, includes the 6-word transmit and receive sections for SIO TCBs and the receive section for CM TCBs, such as shown in FIG. 3. The CM transmit section also contains three additional words, specifying the communication input and output ports of the processor element.

CM System

With further reference to FIGS. 1 and 2, the MeshSP processor elements communicate via a nearest-neighbor, rectangular mesh under the control of the master 16. The global topology is preferably toroidal. For example, each of the eight rows of the array 12 forms a ring, as do each of the eight columns. Toroidal connectivity is useful in creating a uniform and seamless computational fabric. Because of toroidal connectivity, no MeshSP slave 14 is more distant than four X locations and four Y locations from any other slave 14. It is especially useful in performing global operations, e.g., a two-dimensional global FFT, or in applications such as the mapping of ground-stabilized data from a moving sensor.

Since each slave of the MeshSP 10 is provided with six interprocessor (or link) ports 74a . . . 74f, FIG. 2, a two-dimensional nearest-neighbor mesh leaves two ports unused. The MeshSP 10 of FIG. 1 uses these extra ports for "column jumping" to provide fault tolerance; and further uses the ports for rapid row-directed communications in an intact array. More particularly, each slave 14 is connected not only to the slaves 14 on the same row and adjacent columns, but also to slaves on the same row and two columns over. If either adjacent column fails, it is bridged by this next-nearest-neighbor link. This allows the array 12 to degrade gracefully when a slave 14 fails. The array is diminished in size, but no discontinuities remain after the column is bridged. If fault tolerance were not needed, the full set of six links could be used to form a three-dimensional mesh. The MeshSP hardware and software are compatible with any such homogeneous mesh architecture.

CM Link Operation

Figure 5:
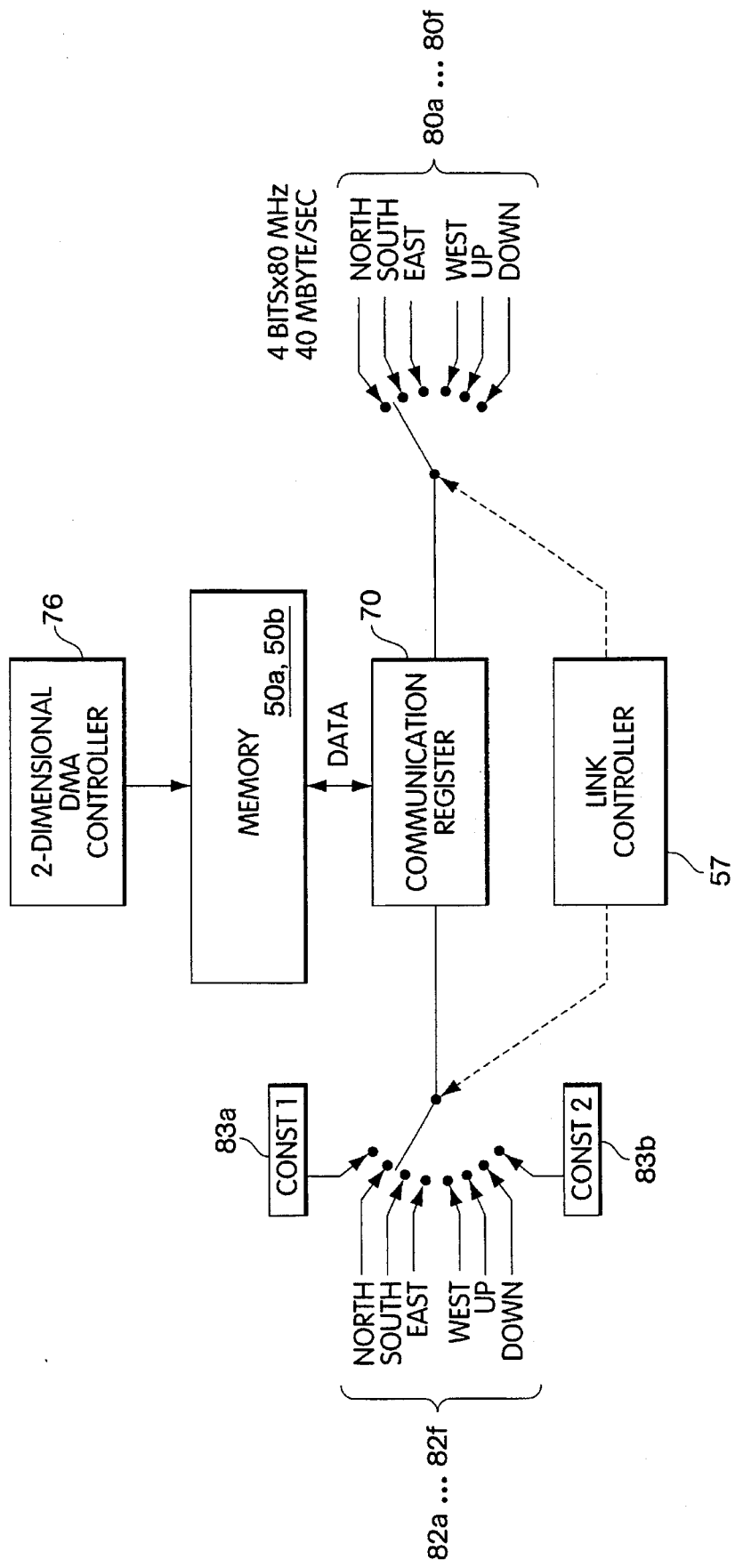
FIG. 5 shows a CM link, constructed according to the invention, for transferring data between several processor elements.

FIG. 5 illustrates a CM data transfer for a typical processor element. Each node of the interprocessor communication system includes the communication register 70 of the I/O processor section 68, together with its six associated communication links 74a . . . 74f, FIG. 2. An elementary CM transfer is specified by a direction of transmission, a direction of reception, and a duration. There are six transmit directions 80a . . . 80f, corresponding to the six link ports 74a . . . 74f, FIG. 2; and eight receive directions 82a . . . 82f, corresponding to the six link ports plus two internal constant registers 83a, 83b. The link controller 57 sets the direction of data, both incoming and outgoing. A constant register may be used as a substitute for data that otherwise would arrive from one of the physical link directions, as discussed in more detail below.

Communication begins by transferring a word from the internal memory 50a, 50b of a slave to its communication register 70. This word is then passed from slave to slave along a preselected path until it arrives at the destination slave. At that point it is copied from the communication register 70 to the memory 50a, 50b of the destination slave. Neither the internal bus, nor the memory of intervening slaves are impacted in any way. When the word has been stored at the destination, the DMA hardware initiates transfer of the next word as specified by the TCB.

The memory locations from which data are loaded into (and stored from) the communication register may be completely different for different slaves. The only requirement is that the same number of words are to be transferred by each slave.

Communication is fully synchronized between slaves, and the network is kept completely filled. During an ongoing transfer, a word shifted from the communication register 70 to the output link is replaced by a word arriving from the input link. The physical transfer is a 4-bit wide nibble. Thus, eight CM clocks are required to transfer a single 32-bit word from one slave to the next. Since the CM clock operates at twice the processor clock speed, four CPU clocks are required to transfer a 32-bit word.

Data are moved from slave to slave in a series of up to three legs. The duration of each leg is the length of time during which the identity of the receive port and the transmit port are unchanged. These ports may be reselected between legs. The transfers are fully synchronous in that all slaves load data at the same time, shift at the same time, and unload at the same time.

For the simplest CM transfers, all slaves receive data from one direction and transmit data to the opposite direction, e.g., receive from the west and transmit to the east. In that case, if the duration of the leg is N words, each word is shifted N slaves from west to east. In more complex situations, the relationship between the leg duration (seen by a fixed slave) and the geometrical displacement (seen by a moving data word) is less direct. The communication illustrated in FIG. 6, for example, consists of a single leg with a duration of two.

Figure 6:
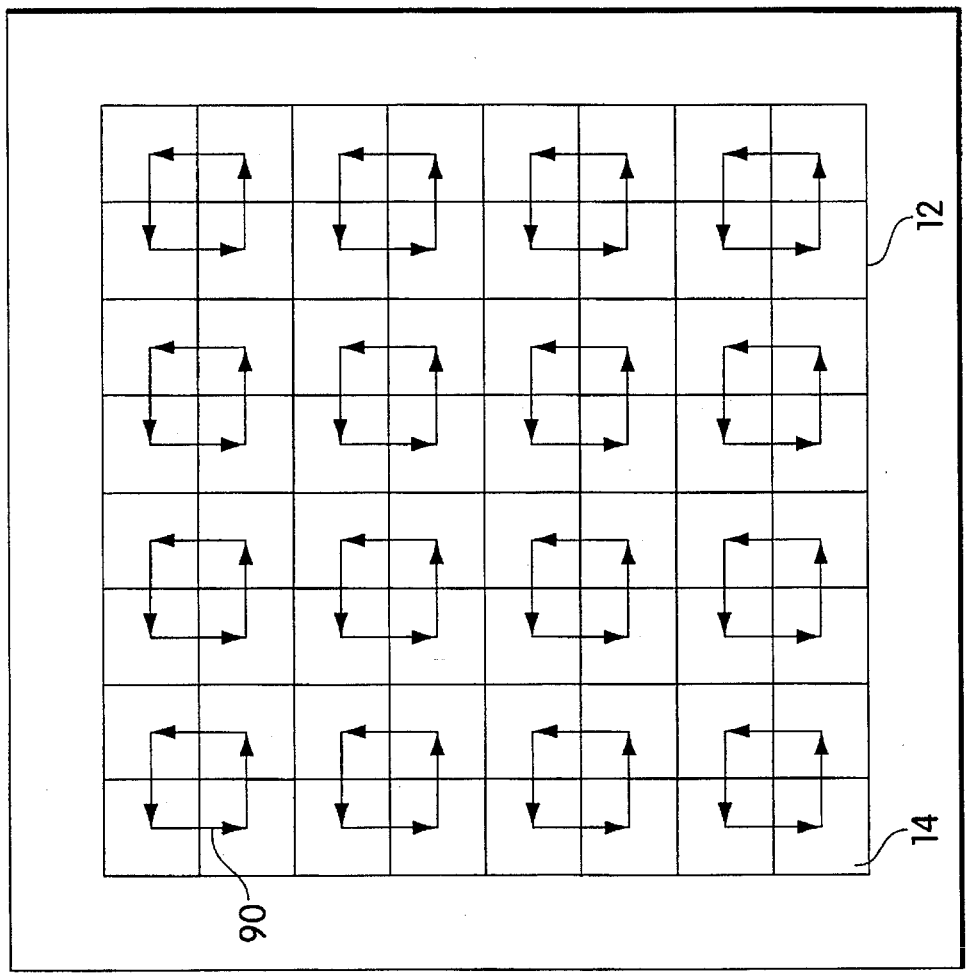
FIG. 6 illustrates a collisionless data transfer between the array of processor elements shown in FIG. 1.

In FIG. 6, each slave maintains a single input direction and a single output direction. These directions are not, however, opposite. Thus the slave in the upper left of each quartet always receives data from below and always sends it to the right. The leg has a duration of two data interchanges between opposite corners of the quartet. Moving with the data, one encounters two displacements, e.g., left and down. Staying with a slave, the directions are fixed. The important consideration is that the leg specification is bound to the slave, not to the moving data. The sole requirement in such transfers for which the directions differ between slaves is that no data "collisions" are permissible.

Physical Assignment of Logical Link Ports

There are times when it is useful to alter the basic nearest-neighbor physical connectivity. The MeshSP 10, FIG. 1, supports column jumping for fault tolerance, as stated above. Two of the six link ports may be physically connected to slaves on the same row and two columns over. If one or more slaves in a given column fail, that column may be effectively removed. Slaves on the two adjacent columns accept data via these auxiliary inputs, bridging the failed column. This reassignment is accomplished by appropriately setting the processor element's link configuration register (LNKC) in the I/O processor section 68, FIG. 2. Once the LNKC register is set, all transfers which have been programmed to come from the failed column will actually come from one slave over. This repair mechanism works for any number of non-contiguous failed columns. For a large array, contiguous failed columns should be more infrequent than isolated or non-contiguous failures. When they do occur, contiguous failures result in an un-repairable gap.

Another possible reason for re-mapping the logical link ports might be to support slave-dependent communication patterns, such as illustrated in FIG. 6. While such transfers may be performed using multi-valued TCBs, master TCBs may be preferable to save space. By using common logical ports, and re-mapping them via the link configuration register LNKC, the slave-dependent patterns need not consume valuable internal memory.

Toroidal vs Open Connectivity

Although the MeshSP array 12, FIG. 1, is globally toroidal (edgeless), some algorithms require the array to be treated as being embedded in an infinite plane of zeroes. This is called planar or open connectivity. The MeshSP 10 provides for planar connectivity by allowing certain "edge" slaves to accept data from one of two internal constant registers in place of data arriving from a neighboring slave. The constant may be set to 0, or to any other number.

Two separate mechanisms have been provided to support this process. Each of the three words of a CM TCB contains a field which specifies whether the received data are to be accepted from the designated logical port, or from one of the two constant registers, e.g., registers 84a, 84b of FIG. 5. This allows the connectivity to be associated with that particular transfer. On the other hand, the link configuration register also contains a field which may be used to map a given logical port to a constant register. In this case, all transfers will be performed in open connectivity as long as the link configuration is so set.

Broadcast Mode and Intra-Slave Transfers

It is sometimes useful to distribute information from each slave to an entire set of other slaves, e.g., from each slave to all others in the same row or column. The invention provides for this in hardware via the broadcast mode. In the broadcast mode, the usual load-shift-shift- . . . -shift-unload sequence is modified by having every shift followed by an unload. For example, a broadcast mode transfer of duration seven in the x-direction on the 8×8 processor array results in a given word being sent to all other slaves in the same-row. In this case, the TCB receive section specifies seven times the storage as the TCB transmit section.

This CM transfer scheme can be used to affect intra-slave transfers as well. For example, by selecting the same port for transmit and receive, such transfers are effectively made into a single leg of unit duration.

Serial Input/Output System

Figure 7:
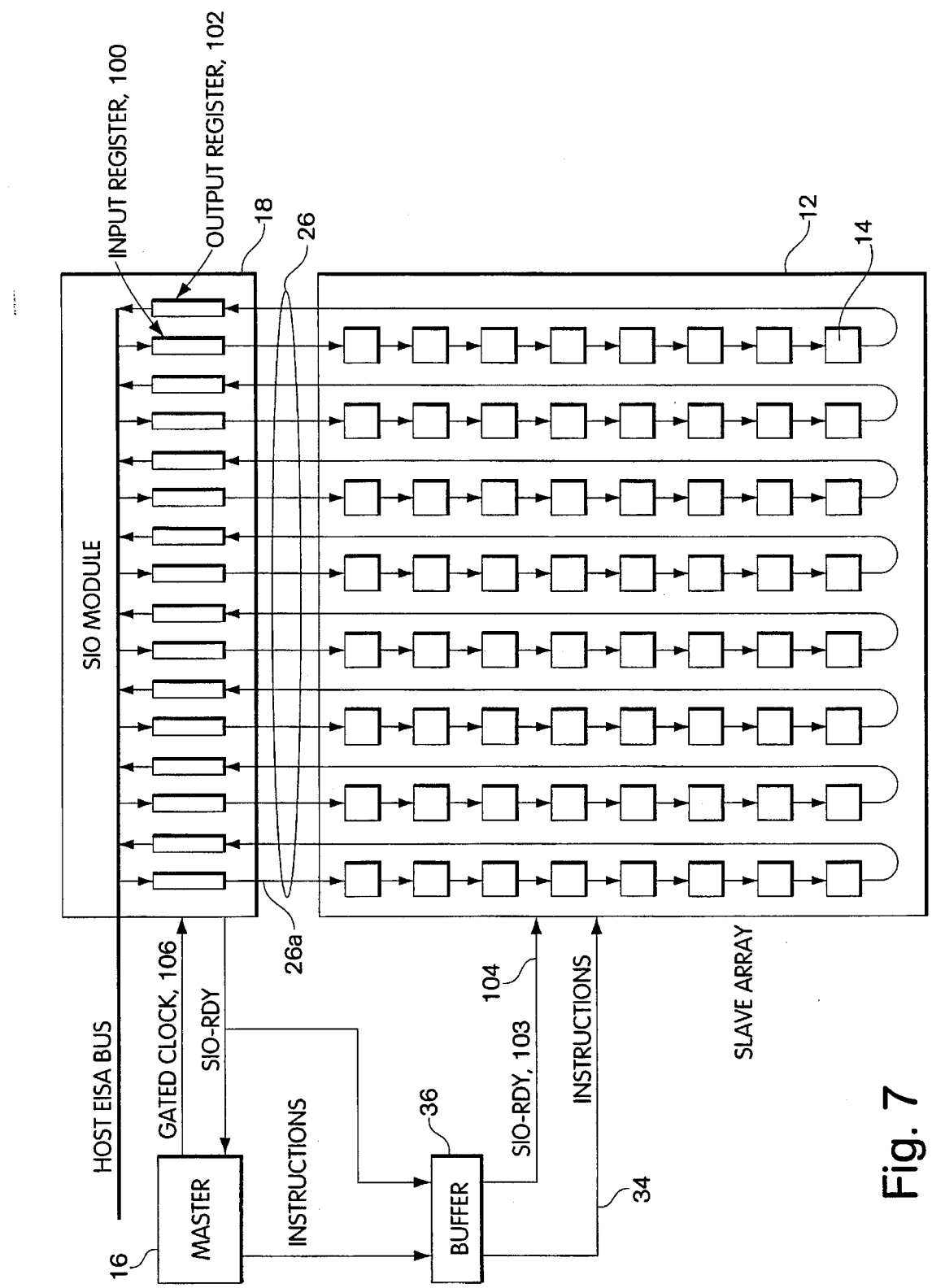
FIG. 7 shows a schematic diagram of the serial input/output section of the apparatus of FIG. 1.

FIG. 7 illustrates the serial input and output system of the MeshSP 10. Data transferred between the array 12 and host 20, FIG. 1, as a serial input-output (SIO) transfer is independent of interprocessor communication (CM) data transfers, and includes eight bit-serial chains of eight slaves apiece, is shown in FIG. 7. Operating at 40 MHz, it has a transfer rate of 40 MBytes/sec. Other arrangements are possible, matching the I/O capabilities of the array to system requirements. For example, if a data rate of only five MBytes/sec is sufficient, it is possible to daisy-chain all sixty-four processor elements, reducing the number of connections and simplifying the hardware. On the other hand, if a data rate of 320 MBytes/sec is needed, the serial ports of all slaves can be paralleled. In general, the maximum possible I/O rate is forty Mbits/sec multiplied by the number of slaves in the array; while the minimum hardware solution provides forty Mbits/sec total. For many systems, intermediate values provide the proper balance of hardware and data throughput.

As shown in FIG. 7, the eight slaves 14 of each column are linked to form a serial chain. The eight chains (one per column) also pass through a custom integrated circuit which forms the SIO module 18 of FIG. 1. The SIO module 18 provides the physical interface between the slave array 12 and the host processor data bus 26, FIG. 1. It is accessible to the host 20 as a set of memory mapped registers.

SIO System Operation

The basic SIO operation is the simultaneous transfer of data from the MeshSP array 12 to a host output file, and from an input file on the host 20 to the MeshSP array.

In preparation for a SIO data transfer, the MeshSP program first opens the appropriate files via the master-host interface, as described above, and constructs the appropriate TCBs. The program initiates the SIO transfer via a software function which takes pointers as arguments to the files and to the TCBs. The master (and slaves) then load the SIO DMA chain pointer registers of the DMA controller 76, FIG. 2, with pointers to the receive and transmit portions of the first TCB. This allows the transfer to begin by loading the slave's SIO register of the I/O register 70 from internal memory, e.g., the memory 50a, 50b of FIG. 2. However, data are not shifted out until a valid SIO-RDY signal is received from the SIO module 18. The SIO module 18 generates this signal while its input registers 100 are not full and its output registers 102 are not empty. This requires cooperation by the host 20.

The host 20 is informed of the need to read and write to these registers 100, 102 via a standard master-host handshake. Through its access to the SIO TCB, the MeshSP master 16 knows how many words must be transferred. This parameter, along with pointers to the host files, is placed in the external master memory 22. The host 20 is then interrupted; and the host thereafter forces the master to relinquish the bus 26, 28 and read the parameter list. At that point, the master 16 is once again allowed access to the bus 28 to become active again. The host 20 and the autonomous SIO DMA of the master 16 now begin the body of the SIO transfer.

The host 20 begins by writing the first eight input words to the SIO module 18, causing the SIO-RDY signal 103 on the signal line 104 to become active. This allows each slave serial link 72, FIG. 2, to shift out one 32-bit word into the corresponding output register 102, and to shift in one 32-bit word from the corresponding input register 100.

The bit-serial lines 26 are actually a pair of wires, one for data, and one for clock. Data flowing into the SIO module 18 are clocked by pulses generated by the slaves. As shown in FIG. 7, data from the SIO module 18 to the slaves 14 are accompanied by the gated clock signal 106, which may be generated by the master 16, or alternatively derived from the clocks received by the SIO module 18 from the array 12.

When the eight input words have been shifted out of the SIO module 18, and eight output words have been shifted in, the SIO-RDY signal is de-asserted, halting the transfer until the host 20 reads the output words and writes the new input words. This process is repeated until the total number of words, previously passed to the host 20 as a parameter, have been transferred.

Access to the SIO module 18 by the host 20 is controlled by a READY signal, preventing the host 20 from writing to the registers 100, 102 which are not empty, or from reading the registers 100, 102 which are not full.

The operation of the serial port 76, FIG. 2, requires that every bit clocked in must be accompanied by a bit clocked out. However, one-way transfers are supported by modes in which the SIO module 18 generates its SIO-RDY signal 103 when either the input registers 100 are full, or the output registers 102 are empty. In this case, the host 20 is not obligated to perform both read and write operations, but only one or the other.

Memory Organization and SIMD Operation

With further reference to FIG. 2, the four Mbit internal memory 50a, 50b is divided into two 2-Mbit blocks. This presents a potential pitfall for SIMD processing. It is possible in a valid SIMD program for different slaves 14 to access different variables at the same time. This may be through the use of multi-valued pointers or slave dependent array indices. The core processor section 52 is capable of accessing two variables on a single cycle, providing one variable is passed over the internal program bus 106 and the other passed over the internal data bus 107. But each memory block supports only a single access by the core processor section 52 on each cycle. The program bus 106 and internal data bus 107 have, respectively, an address bus 106a, 107a and data bus 106b, 107b.

Thus, if two variables are needed, and if they reside in different blocks, they may be read in a single cycle. If they reside in the same block, two cycles are required. Slave dependent addressing can therefore result in a loss of synchronization. In order to prevent this from occurring, a bit has been provided in a System Configuration Register, in the I/O processor section 68, which may be used to inhibit simultaneous access to the two memory blocks. It is the responsibility of the MeshSP software to set this bit when the potential for de-synchronization exists. It is necessary to set this bit only when indirectly accessing arrays, structures, etc., which span the two memory blocks.

Data Types

The internal memory of the processor element 14 provides for storage of 48-bit instructions (for MIMD processing), 40-bit extended precision floating point data, 32-bit floating point and integer data, and 16-bit floating point data. The 32-bit and 16-bit data may be freely intermixed within a single block. 48-bit instructions, 40-bit data and 32-bit data may be stored in the same block, but all instructions and 40-bit data must reside in the lower address locations; while 32-bit and 16-bit data reside in higher address locations. At any time, each block may be configured either for 32/16-bit data access, or for 40-bit data access. To avoid excessive toggling of this configuration, computations involving mixed 40-bit and 32-bit data should separate the data between two blocks.

16-Bit Floating Point Format

One objective of the monolithic processor element 14 is to reduce the cost of the meshSP 10, especially for systems which have large processor arrays. While the processor element 14 has much more on-board memory than related prior art DSP chips, more memory is nonetheless desirable for applications dealing with large amounts of data. On the other hand, digital signal processing often demands less precision and dynamic range than afforded by the standard 32-bit floating point format (as the success of 16-bit integer DSP chips attests). Accordingly, the MeshSP processor element 14 provides instructions for converting floating point data to and from a 16-bit floating point format for the purpose of increasing storage capacity.

All floating point computations are done internally to 40-bit precision, eight-bits of exponent and 32-bits of mantissa. Results stored in the standard 32-bit floating point format lose the eight least significant bits of the mantissa. The sixteen-bit floating point storage format uses a 4-bit exponent, effectively allowing a shift of the binary point by sixteen locations for a dynamic range of 96 dB, before losing any precision. The 12-bit mantissa provides over 80 dB signal-to-noise (SNR) against quantization noise. While not all algorithms can tolerate this lowered precision, it suffices for many signal processing applications.

Single-Cycle Operation

As shown in FIG. 2, the processor element's computational units include a multiplier-accumulator 54, an ALU 56, and a 32-bit barrel shifter 58. These units 54, 56, 58 perform single-cycle operations; there is no computation pipeline. The output of any unit may be the input of any unit on the next cycle. In a multi-function operation, the ALU 56 and multiplier 54 perform independent, simultaneous operations. Most arithmetic and logical operations may be paired with concurrent data moves which load or unload the registers to memory. Beyond the usual parallel operations, there is even an instruction which performs the following parallel multiply, add, subtract:

$$z=x*y;\ c=a+b;\ d=a-b;$$

Here a,b,c,d,x,y,z are either floating point or fixed point variables. This triple operation forms the core of the FFT butterfly. The availability of this operation allows full complex FFTs to be performed in $2N\log_2 N$ cycles. It leads to the peak throughout of 120 MFLOPS and a 1024 point full complex FFT in 0.47 ms.

Instructions Which Simplify SIMD Processing

The key to efficient SIMD processing is the avoidance of data dependent execution times and unnecessary control transfers. The processor element according to the invention has an instruction set very well suited to the SIMD role. This was a major motivation in choosing it as the basis of the MeshSP processor element.

Most instructions for the processor elements are available in conditional form. Here the processor element checks for one of thirty-two possible conditions (ALU=0, ALU<0, Multiplier sign, etc.). If that condition is true, the designated computation and/or data transfer is carried out. If the condition is false, the operation is not performed. The entire process takes a single cycle, qualifying it for SIMD operation. This is a simple and effective way of implementing conditional NULL operations.

Each processor element supports single instructions which form the maximum or minimum of pairs of integer or floating-point arguments. In less capable, prior art processors, this would be done by data-dependent branching, inconsistent with SIMD processing. Similarly, there are instructions which clip arguments at specified absolute values.

CM Timing Considerations, Delay and Skew

In order to enable the construction of large MeshSP systems, it is important that the CM and SIO data transfers be relatively insensitive to propagation delay and inter-processor timing skew. This is especially important with regard to CM, as that transfer operates at a 80 MHz bit rate which is twice the basic processor 40 MHz clock rate. The serial and link ports of the processor elements specifically meet this requirement. As with the broadcast instruction stream, the serial and link data are accompanied by a clock pulse transmitted along the same path. Moreover, the ports themselves contain special circuitry to allow the I/O processor section 68, FIG. 2, to maintain synchronism with the core processor section 52 even when the communication path introduces significant timing delay and skew relative to the local clock. The received bits are clocked in by the accompanying clock signal, allowed to settle, and then resynchronized relative to the local clock. The result is robustness to timing errors as great as two cycles (25 ns) in either direction. With good engineering practice, this margin is sufficient to allow construction of systems which extend across multiple boards.

An effective route to simple yet highly efficient programs for the MeshSP 10 involves the explicit and symmetric distribution of processing among equivalent slaves. The responsibility for this decomposition, as well as for explicitly specifying the required interprocessor communication, primarily remains with the algorithm designer. By choosing this approach, one is free to use a standard C compiler with no extensions for parallel operation. Existing serial programs which do not comprehend this decomposition are not directly usable.

In order to simplify interprocessor communication and input/output software, a library of functions is provided which perform these operations at various levels of abstraction. While the MeshSP programmer is free to control the system at the lowest level, he is also free to use high level functions which perform quite complex and flexible transfers. As MeshSP coding progresses, other high-level functions can be added to this library.

The essential process of problem decomposition on the mesh encourages creativity on the part of the algorithm designer. The availability of the MeshSP high-level communication support functions enables rapid assembly of working programs. This frees the designer to concentrate on the issues of parallel decomposition and data distribution. Further, explicit decomposition is the designer's opportunity to extract maximum performance for the problem of interest, and ample assistance is found in the existing base of MeshSP application code.

Considerations for SIMD Processing

The MeshSP is intended primarily for SIMD operation. This imposes certain constraints on the code: some constraints are associated with the division of system memory between on-chip (internal) memory and off-chip master memory, while other constraints arise from the need to avoid slave dependent branching.

Data Storage Classes

Certain memory constraints are most easily understood in terms of the MeshSP data storage classes. As previously discussed, MeshSP variables are assigned to one of three storage classes:

1. master variables located in external memory.
2. single variables with identical copies located in internal memory.
3. multi variables with independent copies located in internal memory.

While all MeshSP programs are ordinary C programs, not all legal C programs are compatible with SIMD operation. Thus, the MeshSP utilizes rules governing the use of these data storage classes which guarantee that a MeshSP program is compatible with SIMD processing.

The C language makes extensive use of pointer variables, and these must be treated carefully. In addition to the location in which it is stored, a pointer variable has another, independent property: the storage class of the variable to which it points. A MeshSP SIMD program allows any pointer variable to point to one and only one such storage class.

For example, ptr may be a pointer to a multi variable. If ptr itself is a master variable, it exists in a single copy in the master and points to a common location in the internal memories of the master and all slaves. Since ptr is a pointer to multi, the contents of that common internal memory location may vary from slave to slave. A similar situation results if ptr is a single variable, existing in replicated form in all slaves. Finally, ptr might itself be a multi variable. In that case, the various copies of ptr may themselves point to different internal memory locations.

Program code must obey six rules to ensure correct SIMD functioning with respect to storage class. They are listed below and are better understood with the help of the following definitions: an expression is considered multi-valued if any component of its construction (variable, index, pointer, etc.) is multi-valued. The term single-valued refers to either the master or single storage classes.

Rule 1. A multi-valued expression may not be assigned to a single variable.

This includes either explicit assignments, or a value passed as an argument to a function anticipating a single argument.

Rule 2. A pointer may be assigned the value of another pointer only if both pointers refer to variables of the same storage class.

The storage class of the pointers themselves need not agree, provided Rule 2 is obeyed. Thus a multi pointer to a single variable may be assigned the value of a single-valued pointer to a single-valued variable.

Rule 3. A multi-valued pointer may not point to a master variable.

This follows from the observation that only the copy of a pointer to master which resides in the master can access the master variable. To ensure that all copies of this variable maintain the same value, the pointer should either be a master variable or a single variable.

Rule 4. A multi-valued pointer pointing to a single-valued variable may be read but not written.

In C terminology, the dereferenced pointer may not be treated as an L-value, a quantity on the left hand side of an assignment statement. That is, it may be used on the right hand side of an assignment statement but not the left. It may not be used to return a value from a function via a passed parameter. This is best understood in terms of a specific example. Suppose all slaves have a copy of the same look-up table in internal memory (a table of single-valued variables). The slaves are free to individually look up values based on their own local data, making use of a multi-valued pointer to read these table entries. On the other hand, if the slaves were to write to this table via multi-valued pointers, the table would no longer remain identical in all slaves, because its single-valued character would be compromised.

Rule 5. Data transferred via the master/host inter-face must reside in external memory.

The host cannot directly access the internal memory of the slave array. Therefore, a write to the master's internal memory violates the SIMD assumption that a single variable will be reflected in both the master and slaves. A read from master's internal memory is, however, physically possible.

Rule 6. Automatic variables may not be master variables.

This rule exists because automatic variables are stored on the run-time stack which is necessarily in internal memory.

A frequent question regarding SIMD operation concerns the impact of "garbage" data in the master's internal memory. The master, after all, receives no data via the CM or SIO data transfer systems. This is of no concern for computation. Since any such data are necessarily multi-valued variables, they cannot affect the program flow. Most importantly, for SIMD operation the processor element is operated in a mode where no data dependent run-time exceptions (such as overflow) can affect operation. Thus, by following the rules above, integrity of SIMD processing is assured.

The situation is slightly more complex where CM and SIO are concerned. No difficulty arises when the controlling TCBs are master or single variables. However, the MeshSP 10, FIG. 1, supports data access and communication patterns which may be slave dependent. These require TCBs which contain multi variables. If the master initialized its DMA with invalid parameters, it might overwrite otherwise valid (single) data. It is not, nevertheless, difficult to avoid such problems.

For a variety of reasons, each slave may be informed of its location via the SIO data transfer system. A pair of multi variables, slave_x and slave_y, contain the coordinates of the slave in the MeshSP array 12. The master, too, must be aware of its identity. This is supported in hardware by connecting the master SIO input permanently to ground. A convenient way to avoid problems with slave-dependent transfers is to assign the master the slave_x and slave_y coordinates of a valid slave, e.g., (0,0).

SIMD Compatible Program Flow Rules

The C language includes a number of constructs that control the program flow based on the value of an expression. SIMD compatibility requires the use of single-valued expressions in all cases. The following is a list of C constructs requiring a single-valued expression s in the indicated position:

| | |
|---|---|
| if (s) { } | |
| while (s) { } | |
| for (; s;) { } | |
| do { } while (s); | |
| switch (s) { } | |
| s ? : ; | |
| (*s) ( ); | (pointer to a function) |
| s \|\| | (logical OR first argument) |
| s && | (logical AND first argument) |

SIMDCompatible Surrogates for Data-Dependent Branching

Standard C code often involves branches which depend on the sign of a quantity or relative magnitude of a pair of quantities. For example, one may need to write:

if (x<0) f=a(x);

else if (x==0) f=b(x);

else f=c(x);

Or, as another example:

(x<y) ? a(x) : a(y);

When the quantities x and y are multi-valued, such conditional expressions are incompatible with SIMD processing. However, the MeshSP has several native macros which enable such operations to be effectively performed. These macros make use of the ability of the processor element to perform various comparisons in a SIMD compatible manner. The following macros accept integer arguments:

| | | | |
|---|---|---|---|
| zero(x) | = | 1 if x=0, | 0 otherwise. |
| pos(x) | = | 1 if x>=0, | 0 otherwise. |
| neg(x) | = | 1 if x<0, | 0 otherwise. |
| min(x,y) | = | minimum of x and y. | |
| max(x,y) | = | maximum of x and y. | |
| abs(x) | = | absolute value of x. | |
| clip(x,y) | = | x if \|x\| <= \|y\|, | |
| | = | \|y\| if x>0 and \|x\| > \|y\|, | |
| | = | −\|y\| if x<0 and \|x\| > \|y\|, | |

A corresponding set of macros accepting floating point arguments are: fzero(x), fpos(x), fneg(x), fmin(x,y), fmax(x, y), fabs(x) and fclip(x,y). The first three of these macros return integer values, while the last four return floats. With the aid of these SIMD compatible macros the two examples above may be rewritten:

$$f=a(x)*neg(x)+b(x)*zero(x)+c(x)*neg(-x);$$

and $$f=a(min(x,y));$$

Note that since all the functions a( ), b( ) and c( ) are executed each time, the correspondence with the original conditional example is valid only if the functions do not produce side effects.

Restricted Library Functions

Some ANSI standard functions may be restricted in their use. For example, functions dealing with memory management (malloc) or interrupts (signal) require arguments of class single.

Global Variables and Direction Conventions

In writing MeshSP programs, it is often necessary to know a slave's position in the array. This information is contained in global variables defined in the header file msp.h. They are:

| | |
|---|---|
| ARRAY_X_DIM | x dimension of processor array |
| ARRAY_Y_DIM | y dimension of processor array |
| slave_x | x position of slave |
| slave_y | y position of slave |
| pe_num | ordinal number of slave |

If ARRAY_X_DIM=ARRAY_Y_DIM=8, slave_x and slave_y vary from 0 to 7, while pe_num varies from 0 to 63. In addressing slaves in the processor array, as well as data elements within a slave, one preferred convention is that increasing x or y always corresponds to increasing address or pe_num. Furthermore, as address or pe_num increases, the x value varies more rapidly than y. That is, two elements whose y values are equal but differ in x by one, have addresses or pe_nums which differ by one. If the x values are equal, but y differs by one, the addresses or pe_nums differ by the full width of the data or processor array. This is consistent with referring to array elements as A[y][x] (two-dimensional storage) or A[x+y*Nx] (one-dimensional storage) in the C language.

Communication and I/O Support Software Data Structures

While there are trivial SIMD programs for which the processors execute independently from beginning to end, most programs require the exchange of data among slaves during the course of processing. The functions which support these transfers form the core of the MeshSP software.

CM and SIO Data Structures

The transfer control blocks (TCBs) used to define MeshSP interprocessor communication (CM) and serial input/output (SIO) are defined as C language data structures. An SIO TCB is defined as:

```
typedef struct sio_tcb
{
    dma t;      /* specifies transmit data */
    dma r;      /* specifies receive data */
}sio_tcb;
```

It consists of two parts: the first describing the arrangement the data to be transferred from the slave, the second describing the arrangement of data to be transferred to the slave. Each of these descriptions is itself a structure of the form:

```
struct dma
{
    void *addrs;    /* address      */
    int dx;         /* x increment  */
    int nx;         /* x count      */
    dma *cp;        /* next pointer */
    int yinc;       /* y increment  */
    int ny;         /* y count      */
}
```

The name of this structure reflects the fact that the processor element's DMA controllers accept these six parameters directly. The meaning of the parameters is discussed above. A CM TCB is similar to an SIO TCB, but contains three additional words for the leg descriptors:

```
typedef struct cm_tcb
{
    dma t;      /* transmit dma structure */
    int leg1;   /* 1st leg descriptor */
    int leg2;   /* 2nd leg descriptor */
    int leg3;   /* 3rd leg descriptor */
    dma r;      /* receive dma structure */
}cm_tcb;
```

The quantities leg1, leg2, and leg3, denote the 1–3 possible communication path legs. Each descriptor is a 32-bit word which contains fields for the input direction, output direction, and duration of the leg. The first leg must have a duration greater than 0. The format of each leg is as follows:

| bits 0–15  | leg duration |
| bits 16–19 | receive link |
| bits 20–23 | transmit link |
| bits 24–25 | specify constant register input |
| bit 28     | broadcast communication mode |
| bits 29–31 | unused. |

The 3-bit link directions have been arbitrarily defined as follows:

| 0  | 1  | 2  | 3  | 4  | 5  |
|----|----|----|----|----|----|
| –Y | +X | +Y | –X | +Z | –Z |

This convention leads to the following special cases where the transfers are in the x- or y-directions (– to +) or (+ to –):

| #define PLUS_X  | 0x00130000 |
| #define MINUS_X | 0x00310000 |
| #define MINUS_Y | 0x00020000 |
| #define PLUS_Y  | 0x00200000 |

A transfer which is purely internal to a slave is accomplished by defining a leg whose input and output links coincide. This may be arbitrarily chosen to be the positive y-direction. Leg1 is specified as:

define INTERNAL 1L

The 2-bit field, bits 24–25, allows for data to be received from one of two constant registers rather than from another slave. The encoding is:

| 10 | use const_1 |
| 11 | use const_2 |
| 00 | use receive data |

These bits are set in software on the basis of the contents of a structure which summarized the connectivity status of the given processor element:

```
struct EDGE
{
    multi int plus_x;
    multi int minus_x;
    multi int plus_y;
    multi int minus_y;
    multi int plus_z;
    multi int minus_z;
} edge;
```

Each element of edge may be set to 0 to receive data from the corresponding direction, or set to 0x01000000 or 0x11000000 to receive the contents of const_1 or const_2 respectively. If bit 28 is set, the communication occurs in a "broadcast mode." That is, instead of a single load, multiple shifts, and a single store, the communication stores the shifted word at the current slave after each shift. This allows one to efficiently distribute a given word in each slave to all other slaves in the same row or column. In this case, the receive data are more numerous than the transmit data by the length of the communication path.

The CM Control Structure

TCBs may be chained together for sequential, autonomous operation. A chain pointer which is not NULL causes the immediate loading of a next TCB. If the interrupt bit of the chain pointer is not set, the core processor section 52, FIG. 2, remains unaware of this process. If the interrupt bit is set, the core processor section is interrupted. While there is no hardware requirement linking the interrupt bit to a NULL address field, MeshSP software enforces that connection through the definition of the chain terminator FINI, defined as:

define FINI (dma *) 0x20000L

FINI denotes the end of a chain, the finest scale on which CM and SIO are controlled by the core processor section. Whether a chain consists of a single TCB or many, the chain pointer of the last TCB is always FINI, preventing further auto-chaining, and interrupting the core processor section.

The interrupt service routine performs a number of functions. If other chains are pending, the interrupt service routine will launch the next one. In the CM case, this may involve checking two queues of different priorities. The routine can also arrange to hold the core processor section from further computation at a point where the program requires completion of a specified transfer. Finally, the interrupt service routine can call other user specified computation to be inserted on completion of a particular transfer chain.

This last capability supports a limited form of multi-tasking which is especially useful when a small amount of computation is directly associated with a communication task. For example, one may wish to form the average (or maximum, etc.) of data distributed across the array. This is most efficiently done in stages, where intermediate results are computed and then redistributed. Dominated by communication, this process can be effectively overlaid with another purely arithmetic task. From the programmer's point of view, combining the communication and computation portions of the global average allows them to be initiated with a single function call, and run to completion with maximum concurrency.

Figure 8:
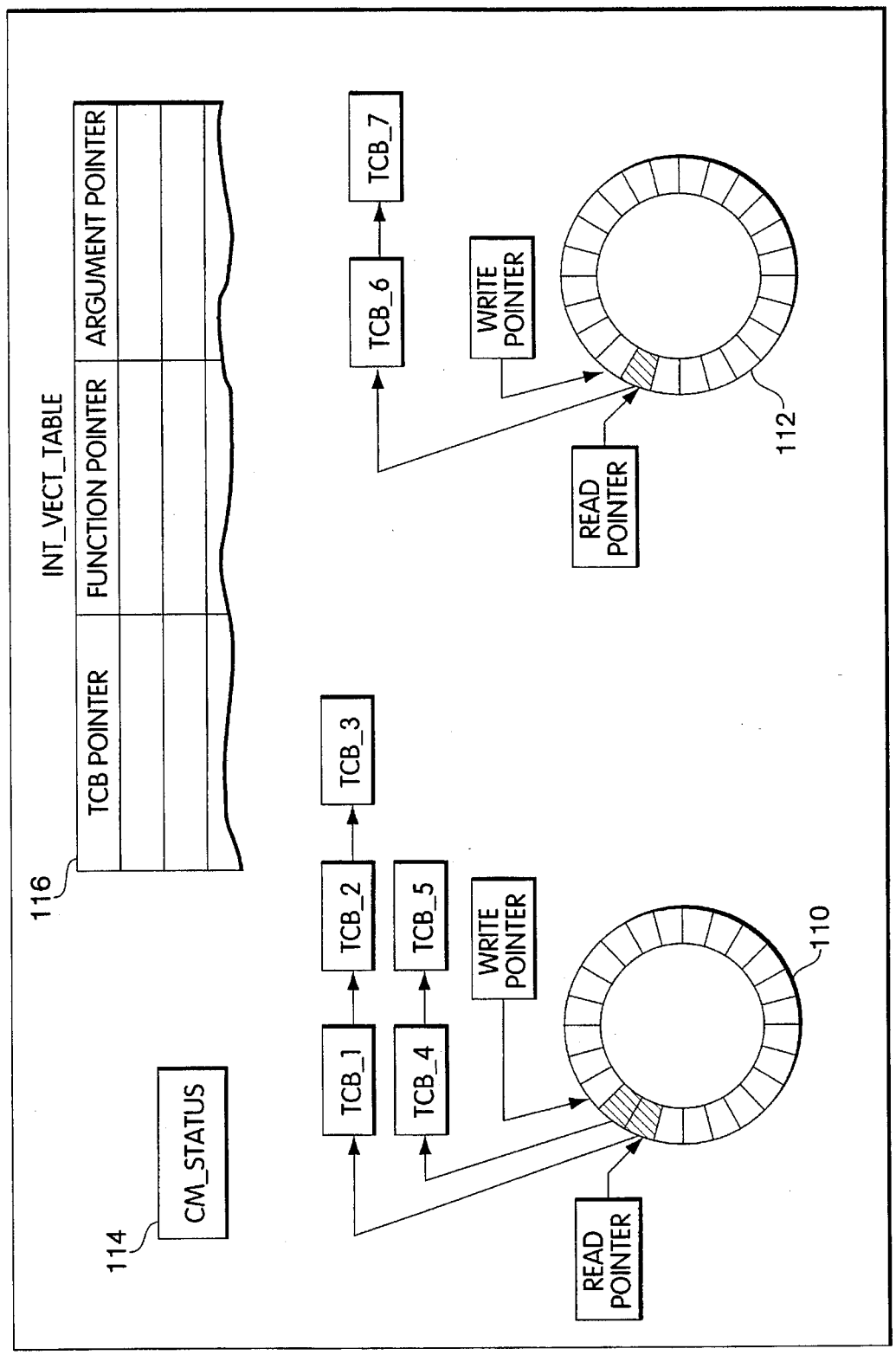
FIG. 8 illustrates a CM control system, constructed according to the invention, for use in the apparatus of FIG. 1.

The CM system control structure which supports these capabilities is shown in FIG. 8. It includes a pair of ring buffers 110, 112 (one for each priority), an integer table (CM_status) 114, and an interrupt vector table (INT_VECT_TABLE) 116, for use by the multi-tasking system described above. The status word indicates whether a transfer is running and its priority:

| | |
|---|---|
| CM_status = 0 | No CM transfer in progress |
| CM_status = 1 | Low priority transfer in progress |
| CM_status = 2 | High priority transfer in progress |

The ring buffers 110, 112 maintain a pair of queues of pointers to TCB chains. A pointer to a TCB is maintained on the appropriate queue until the transfer is complete. While a transfer is in progress, the appropriate read pointer points to the TCB at the head of the chain. Pointers to other chains, pending execution, are further back on the queue.

When a chain is completed, the interrupt service routine first checks to see whether there is an entry in INT_VECT_TABLE 116 with a TCB pointer which corresponds to the transfer just completed. If so, the corresponding function is called with a single argument: the pointer which is the third entry in the table. The fact that the interrupt function takes a single pointer argument is really no restriction since that pointer can point to an arbitrarily complex structure.

When the called function returns (or immediately if the table contains no entry with a TCB pointer matching the completed transfer) the current TCB pointer is deleted from the circular buffer by advancing the read pointer. If both queues are empty, the routine simply returns. Otherwise, another transfer is initiated. If there is anything in the high-priority queue, the next high-priority transfer is initiated. If the high-priority queue is empty, the next low-priority transfer is initiated. The status word is then set to indicate whether a transfer is in progress, and if so, its priority.

The SIO control system is essentially identical to that of CM, with the simplification of a single priority and no interrupt vector table. The SIO status word is either 1 or 0, depending on whether or not a SIO transfer is in progress.

CM and SIO Software Functions

One may distinguish three levels of CM and SIO software:

1. Low-level functions for accessing hardware directly.
2. Mid-level functions for creating and modifying data structures.
3. High-level function for convenient access to complex communication and I/O patterns.

Low-Level CM and SIO Functions

```
int CM(
    int priority,        /* LOW or HIGH        */
    cm_tcb *chain_ptr)   /* pointer to CM chain */
```

CM( ) is used to initiate transfers between slaves via the communication system. It returns the value 0 if the transfer starts immediately, 1 if the transfer is pending, and −1 if the ring buffer for that priority is full.

CM( ) first disables the CM hardware interrupt to prevent any new chains from being initiated by the interrupt service routine. If the ring buffer at the requested priority is full, the interrupt is enabled and the function returns a value −1, indicating an error condition. If the ring buffer is not full, it is written with the chain_ptr, and the write is pointer advanced. If no transfer is currently in progress, the requested transfer is started immediately by writing chain_ptr to the transmit DMA chain-pointer register, and by writing chain_ptr+9 to the receive DMA chain-pointer register. The offset of 9 corresponds to the specification of a cm_tcb as a 9 word transmit portion and a 6 word receive portion.

```
int WaitCM
    (cm_tcb *chain)    /* pointer to head of chain */
```

WaitCM( ) provides synchronization of processor and CM activities. This may be required to ensure that needed data are available for a computation or to verify that an output buffer is free to be reused. WaitCM( ) takes a single argument, a pointer to the TCB at the head of the CM chain. When the processor arrives at WaitCM( ), it continuously checks to see if the referenced TCB is presently active on either ring buffer. If so, it waits until the transfer is completed (and the entry disappears). If the referenced TCB is not present on a ring buffer the function returns immediately. WaitCM( ) returns 1 if the designated transfer was in progress when it was called, and 0 if it was not.

Another use of this function concerns temporary TCBs, either created as automatic variables on the system stack via a function call or by explicit dynamic memory allocation. It is important to note that the TCB must survive intact, not merely until after the CM(TCB) function call, but until after the transfer completes. This is ensured by means of the WaitCM( ) function. A function which creates a TCB as an automatic variable should not return without first executing a WaitCM(TCB), and if the TCB is created via malloc( ), it should not be freed before a corresponding WaitCM(TCB).

```
int SIO (sio_tcb *chain_pointer);
int WaitSIO (sio_tcb *chain)
```

These functions are similar to their CM counterparts, with the simplification of a single priority.

```
int SetVect(
    cm_tcb *TCB,      /* pointer to tcb      */
    void (* func)
        (void *),     /* pointer to function */
    void *arg)        /* pointer to argument */
int FreeVect(
    cm_tcb *TCB)      /* pointer to tcb      */
```

As previously described, the MeshSP software supports insertion of computational code between communication chains. The function SetVect( ) is used to add a function to the interrupt vector table, and FreeVect( ) to remove it. A function to be added to this table must take a single argument: a pointer to void. If a more complex set of arguments is required, these arguments can be gathered into a single structure, and the address of the structure passed as the argument. The inserted code should not initiate or wait for CM.

```
void InputOutput(
    void *infile,      /* host input file */
    void *outfile,     /* host output file */
    int size,          /* number of bytes per slave */
    void *indata,      /* pointer to slave input data */
    void *outdata)     /* pointer to slave output data */
```

InputOutput( ) is a simplified I/O call. It assumes that the data to be simultaneously input and output are in contiguous blocks of "size" bytes. This function prepares the necessary TCB, and calls SIO( ) to perform the desired transfer.

```
void Input(
    void *file,        /* host input file */
    int size,          /* number of bytes per slave */
    void *data)        /* pointer to slave input data */
void Output(
    void *file,        /* host output file */
    int size,          /* number of bytes per slave */
    void *data)        /* pointer to slave output data */
```

Input( ) and Output( ) are a similar to InputOutput( ) but transfer data in one direction only.

Functions for Preparing TCBs and Chains

```
void MkDma(
    multi dma *DMA,    /* pointer to dma descriptor */
    void *base,        /* base address of parent array */
    int Nx,            /* parent array dimension */
    multi int x,       /* x pos. of subarray relative to base */
    int dx,            /* x step */
    int nx,            /* number of elements in x-direction */
    multi int y,       /* y pos. of subarray relative to base */
    int dy,            /* y step */
    int ny)            /*number of elements in y-direction */
```

MkDma( ) is an intermediate-level function that fills in the elements of a DMA structure on the basis of a higher-level description of the data arrangement. It accepts a description of the parent array in terms of its base address and the non-downsampled width in the x-dimension. The subarray is specified in terms of its (x,y) location relative to the parent base, the degree of down-sampling in the x- and y-direction, and the number of elements in each direction. From these it determines the necessary DMA parameters. That is, the elements in each row (constant y) are addressed before the elements in an adjacent row. If the increments dx and dy are negative, the rows or columns are traversed backwards (in the direction of decreasing address).

```
void MkDmaY(
    multi dma *DMA,    /* pointer to dma descriptor */
    void *base,        /* base address of parent array */
    int Nx,            /* parent array dimension */
    multi int x,       /* x pos. of subarray relative to base */
    int dx,            /* x step */
    int nx,            /* number of elements in x-direction */
    multi int y,       /* y pos. of subarray relative to base */
    int dy,            /* y step */
    int ny )           /* number of elements in y-direction */
```

MkDma( ) is similar to the function MkDMA( ) ( above). It differs only in that columns are traversed before rows. Rows and columns may be interchanged by using MkDma( ) for the transmit dma, and MkDmaY( ) for the receive dma (or vice versa).

```
void MkDmaC(
    multi dma *DMA,    /* pointer to dma descriptor */
    void *base,        /* base address of parent array */
    int Nx,            /* parent array dimension */
    multi int x,       /* x pos. of subarray relative to base */
    int dx,            /* x step */
    int nx,            /* number of elements in x-direction */
    ulti int y,        /* y pos. of subarray relative to base */
    int dy,            /* y step */
    int ny )           /* number of elements in y-direction */
```

MkDmaC( ) is used to construct a dma structure to address complex data. In this case, the complete two-dimensional flexibility for scalar variables is not available. MkDmaC( ) may be used only for subarrays which are either not downsampled in x, or else are not downsampled in y, and are of full width in x (parent width equals subarray width).

void Connectivity(int con)
        /* constant defining */

Connectivity( ) is used to produce either open or toroidal connectivity. Connectivity(TORROIDAL) ensures that subsequent CM TCBs are constructed so that data fully wrap around the array, i.e., data leaving the top edge arrive at the bottom, and data leaving the left edge arrive at the right. Connectivity(OPEN), on the other hand, ensures that data arriving at the edges of the array are zeroes.

```
void XYPath(
    cm_tcb *TCB        /* pointer to CM TCB */
    int xleg,          /* (signed) x distance */
    int yleg)          /* (signed) y distance */
```

XYPath( ) sets the leg descriptors in a cm_tcb for simple rectilinear transfers in the x- and y-directions.

```
void LinkCM(
    cm_tcb *TCB1,      /* first TCB */
    cm_tcb *TCB2)      /* second TCB */
void LinkSIO(
    sio_tcb *TCB1,     /* first TCB */
    sio_tcb *TCB2)     /* second TCB */
```

LinkCM( ) and LinkSIO( ) set the dma pointer of the first TCB to point to the second. This permits the construction of extended communication and I/O chains which are transferred in their entirety without intervention by the core processor.

void EndCM (cm_tcb *TCB)

void EndSIO (sio-tcb *TCB)

It is important that any chain be terminated properly, even those consisting of a single TCB. That is, the final DMA chain pointers must be FINI. The functions EndCM( ) and EndSIO( ) simply put FINI into the chain pointers of the referenced TCB.

Data Extraction and Insertion Functions

MeshSP software provides a convenient and uniform high-level mechanism for exchanging data between the host and the MeshSP array 12 or master 16, FIG. 1. The data extraction functions allow results to be captured for later display and analysis, while the data insertion functions provide a means for data to be injected into the processing stream at various points. The functions Extract, ExtractM, Insert and InsertM, which provide these services, may be distributed throughout the code, but activated on any particular run only as desired. They are controlled by means of a system of file pointers.

The MeshSP library declares two arrays of file pointers, InFile[] and OutFile[], stored in master memory. The dimensions of these arrays are declared in cm_sio.h as MAX_IN_ID and MAX_OUT_ID, and are set to 256 in one practice of the invention. These arrays must be declared as externs in the application code:

```
extern FILE *OutFile[ ]; if extraction to be performed */
extern FILE *InFile[ ]; if insertion is to be performed */
```

Each call to one of the extraction or insertion functions specifies an ID parameter. The operation is performed only if the corresponding file pointer is not NULL, i.e., set to a legitimate host file. Thus, initialization code may enable or disable data extraction and insertion, as well as select the file which is to receive or transmit data. To enable data extraction associated with a specific ID one assigns OutFile[ID] to a valid pointer to a previously opened file. By assigning NULL to OutFile[ID] this particular data extraction is inhibited.

Each data message consists of a fixed size header containing five fields, and a variable length data field. The header is defined by the following structure:

```
typedef struct edm_header
{
    int ID;          /* message identifier */
    int size;        /* total size of data in bytes (all slaves) */
    char type[20];   /* type descriptor */
    int Ny;          /* number of data rows (per pe) */
    char legend[96]; /* legend string */
}edm_header;
```

The second element of the header, size, represents the total quantity of data to be transferred to the file, i.e., the sum of the data items (in bytes) present in all slaves. The third element, type, is a string which must correspond to a currently defined C data type. This may be a basic type such as "float," "int," etc., or it may be a data type defined in a typedef statement, e.g., "complex" or "cm_tcb," or some other user defined type. The fourth element, Ny, is used to support two-dimensional arrays, a very common MeshSP data type.

The functions which extract and insert data are:

```
void Extract(
    int ID,           /* extraction message identifier */
    char *type,       /* type descriptor */
    int Nx            /* x dimension */
    int Ny            /* y dimension */
    char *legend,     /* pointer to legend */
    multi void *data  /* slave array data to be extracted */
void ExtractM(
    int ID,           /* extraction message identifier */
    char *type,       /* type descriptor */
    int Nx            /* x dimension */
    int Ny            /* y dimension */
    char *legend,     /* pointer to legend */
    master void       /* master data to be extracted */
int Insert(
    int ID,           /* extraction message identifier */
    char *type,       /* type descriptor */
    int Ny,           /* y dimension */
    multi void *data  /* slave array data to be inserted */
int InsertM(
    int ID,           /* extraction message identifier */
    char *type,       /* type descriptor */
    int Ny,           /* y dimension */
    multi void *data  /* master data to be inserted */
```

The functions Extract and Insert are used to transfer data between the slave array and disk files; while ExtractM and InsertM perform the corresponding functions between master memory and disk files.

The arguments of these functions are related to the quantities appearing directly in the header file. They are actually modified by the C preprocessor by the following redefinitions in the header file cm_sio.h:

```
#define Insert(ID, type, Ny, data) \
        insert(ID, #type, Ny, data)
#define Extract(ID, type, Nx, Ny, legend, data) \
        extract(ID, (Nx)*(Ny)*sizeof(type), type, Ny, \
            legend, data)
#define InsertM(ID, type, Ny, data) \
        insertM(ID, #type, Ny, data)
#define ExtractM(ID, type, Nx, Ny, legend, data) \
        extractM(ID, (Nx)*(Ny)*sizeof(type), type, Ny, \
            legend, data)
```

Where extract( ), insert( ), extractM( ), and insertM( ), are the functions which appear in the library, as opposed to Extract( ), Insert( ), ExtractM( ), and InsertM( ), which are the function calls which appear in the application code.

Note that the second argument of Extract( ) and ExtractM( ), type, appears in the function call without surrounding quotes. This allows the preprocessor to use it as an argument for the compile time function sizeof( ), and in conjunction with Nx and Ny to determine the number of data bytes per slave. The function extracts then uses the global variable ARRAY_SIZE (total number of slaves) to determine the total size of the recorded data. The header also requires type to be converted into a character string for insertion into the header. This is accomplished by the preprocessor symbol #.

The fifth argument of Extract( ) and ExtractM( ), legend, is an optional descriptive label. It is passed on unmodified to the extraction function.

High-Level CM Functions

A number of communication patterns are commonly used in MeshSP applications and have therefore been packaged as general-purpose library functions.

```
void Augment(
    multi float *r,   /* pointer to destination data */
    multi float *t,   /* pointer to source data */
    int nx,           /* x dim. of unaugmented data */
    int ny,           /* y dim. of unaugmented data */
    int dx,           /* columns to be added each side */
    int dy)           /* rows to be added top and bottom */
```

Augment( ) is a high level function which expands an original (unaugmented) array, bringing in data from neighboring slaves. It is used primarily to support segmented convolution, a technique for filtering data which has been divided among the slaves. The process is described in more detail below.

Figure 9:
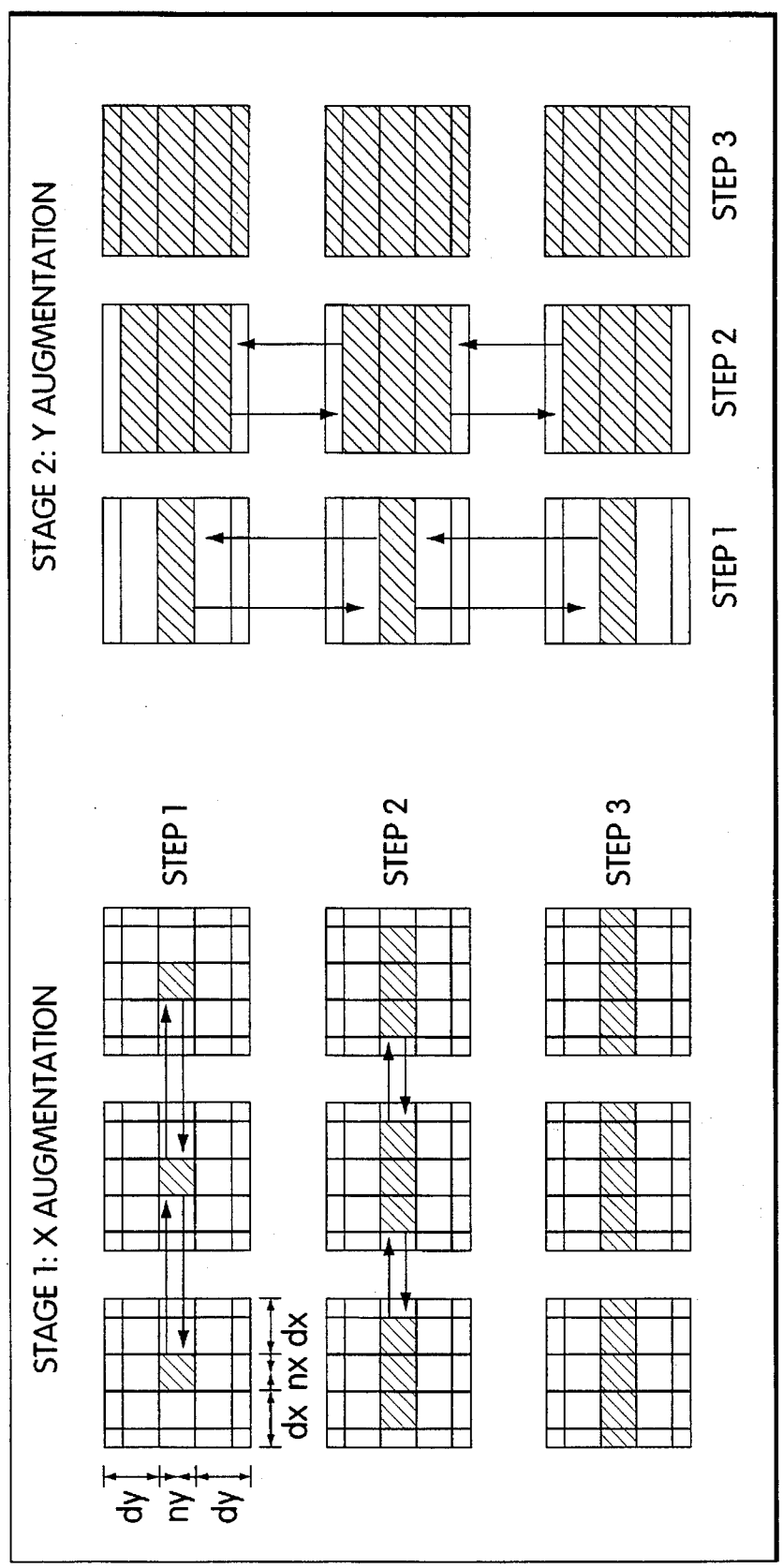
FIG. 9 illustrates a two-stage schematic of an augmentation procedure suitable for use as a high level CM library function in accord with the invention.

Augment( ) is written in general form, and will reach out as many slaves as necessary to obtain the required data. It augments first in the x-direction, then the y-direction, as shown in FIG. 9. The source and destination arrays are non-overlapping and one of differing dimension: nx*ny for the source and (nx+2dx)*(ny+2dy) for the destination.

```
void Excise(
    int mode,         /* mode = SET or ADD */
    multi float *r,   /* excised array */
    multi float *t,   /* augmented array */
    int nx,           /* x dimension of excised array */
```

-continued

```
    int ny,       /* y dimension of excised array */
    int dx,       /* columns (each side) to be trimmed */
    int dy)       /* rows (top and bottom)
                     to be trimmed */
```

Excise( ) is essentially the inverse of Augment( ). It removes the central portion of a rectangular array and either places it in another, smaller array, or else adds the contents of the central portion to the smaller array. In the first case, the function is called with mode=SET, in the second case, the function is called with mode=ADD. The arrays need not be different, but in most cases will be, since the excised array will be dimensioned nx*ny while the augmented array will be dimensioned (nx+2*dx)*(ny+2*dy).

```
void GlobalAugment(
    multi float *r,   /* pointer to destination data */
    multi float *t,   /* pointer to source data */
    int nx,           /* x dim. of unaugmented data */
    int ny)           /* y dim. of unaugmented data */
```

This function is a variant of Augment( ) which causes a data array r to be created by importation of data from all other slaves in the array. This new array is the original data array t, as distributed across the entire processor array. It is identical in all processors. If the array t has the dimension nx*ny, the array r will have the dimension (ARRAY_X_DIM*nx)* (ARRAY_Y_DIM*ny).

```
void Shift(
    multi float *r,   /* pointer to destination data */
    multi float *t,   /* pointer to source data */
    int nx,           /* x dimension of array */
    int ny,           /* y dimension of array */
    int dx,           /* x shift (cell) */
    int dy)           /* y shift (cells) */
```

Figure 10:
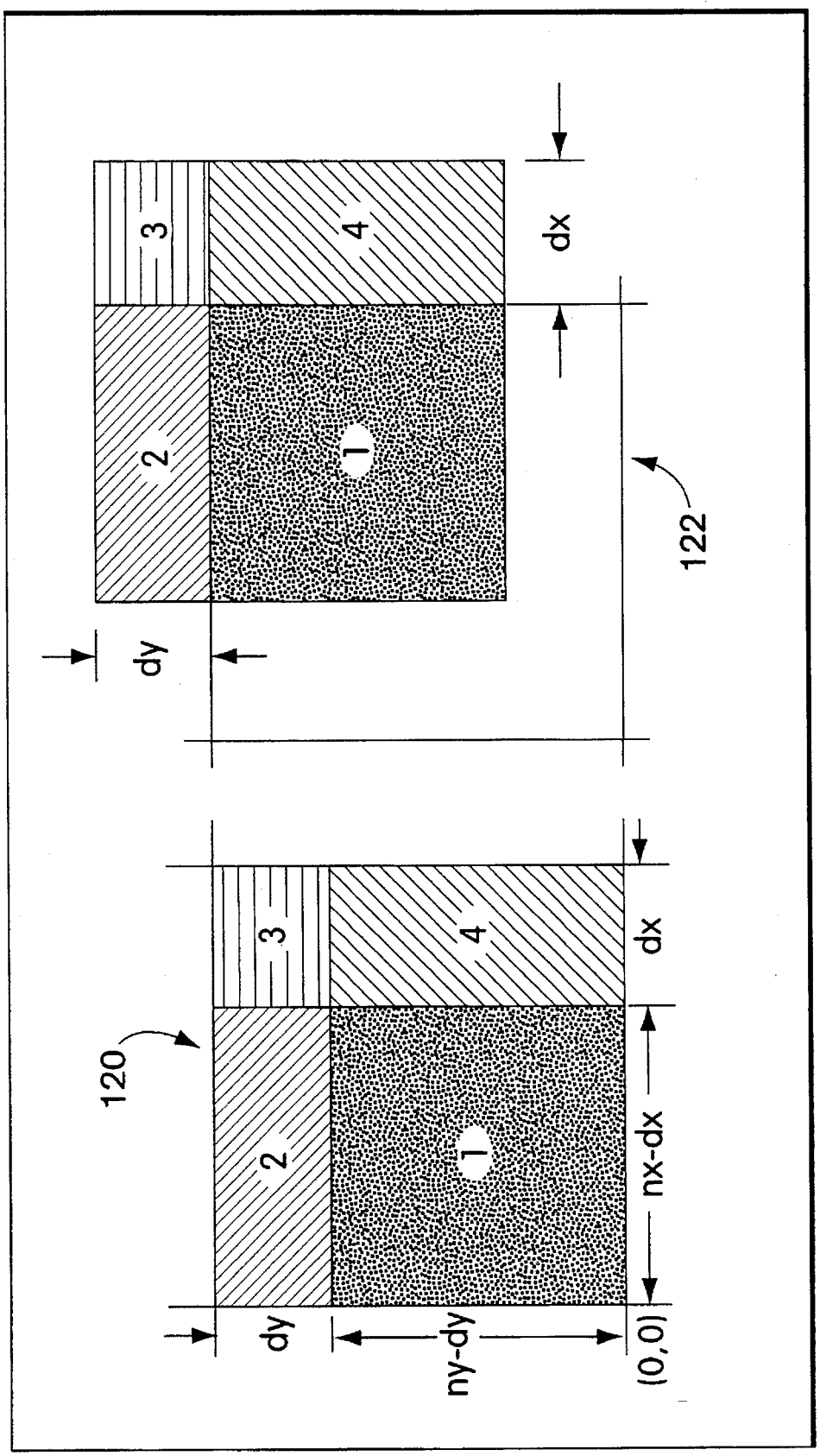
FIG. 10 schematically illustrates the operation of a library function suitable for shifting a subarray of data in accord with the invention.

Shift( ) moves an array, distributed across all slaves, by dx in the x-direction and dy in the y-direction, such as the transmit array 120 and receive array 122 shown in FIG. 10. The function imports data from as far as necessary to perform the shift. The source and destination arrays must be non-overlapped; otherwise, data will be overwritten.

```
void Permute_X(
    cm-tcb *tcb,      /* ptr to first of a chain of
                         ARRAY_X_DIM tcbs */
    int sign,         /* determines the direction of
                         permutation */
    dma dma1,         /* describes first subarray */
    int step1,        /* address offset between subarrays */
    dma dma2,         /* describes second subarray */
    int step2)        /* address offset between subarrays */
void Permute_Y(
    cm-tcb *tcb,      /* ptr to first of a chain of
                         ARRAY_Y_DIM tcbs */
    int sign,         /* determines the direction of
                         permutation */
    dma dma1,         /* describes first subarray */
    int step1,        /* address offset between subarrays */
    dma dma2,         /* describes second subarray */
    int step2)        /* address offset between subarrays */
```

Permute_X( ) and Permute_Y( ) have been found to be valuable in many apparently unrelated contexts, e.g., two-dimensional Fourier transformation, global additions of arrays, and supervised learning in multi-layered neural networks. These functions perform generalized permutations in the row and column directions, respectively. The nature of these permutations may be understood most easily by first considering a simple special case.

Suppose each slave contains a one-dimensional numerical array, whose dimension equals the number of columns in the processor array (ARRAY_X_DIM). Each element may then be thought of as being identified by three indices; two indices designating the slave row and column, the third designating the element of the data array. We may let A(i)(j)[k] represent the k-th element of the data array A in the i-th slave row and j-th slave column. The communication pattern which performs the transform A(i)(j)[k] –>A(k)(j)[i] is called a row permutation, while A(i)(j)[k] –>A(i)(k)[j] is called a column permutation.

As actually implemented, considerably greater generality is provided. The transmitted data need not be a set of ARRAY_X_DIM simple elements, but can instead be a set of ARRAY_X_DIM subarrays, the shape of which is defined by the contents of dma2 if sign=1, or dma1 if sign=−1. Correspondingly, the received data may be differently arranged, with a shape defined by dma2 if sign=1 or dma1 if sign=−1. By linking the roles of dma2 and dma1 to the sign parameter the permutation operations are reversed by simply negating sign.

This flexibility is useful in a variety of applications. In particular, the function GlobalFFT( ) uses it to rearrange complex rows or columns so that each row or each column is packed into a single slave in preparation for one-dimensional Fourier transformation.

```
void Spread_X(
    multi void *r_data,   /* pointer to receive data */
    multi void *t_data,   /* pointer to transmit data */
    int n)                /* number of words to be
                             transmitted */
void Spread_Y(
    multi void *r_data,   /* pointer to receive data */
    multi void *t_data,   /* pointer to transmit data */
    int n)                /* number of words to be
                             transmitted */
```

The functions Spread_X( ) and Spread_Y( ) communicate the contents of a block of data within a slave to all slaves in the same processor row or column, respectively. The number of transmitted words is n, and the number of received words in then either n·ARRAY_X_DIM or n·ARRAY_Y_DIM. The communication uses toroidal connectivity.

The received data are arranged in cyclic fashion, with data from the reference slave appearing first, followed by data from the slave at the next higher column (or row), etc. The last block of data is that which was received from the slave at the next lower column (or row).

String and Character Data for Master-Host Interface Functions

The functions of the master-host interface described above provide the connection between data stored in the MeshSP master 16 and the I/O streams maintained in the host 20, FIG. 1. These streams include disk files, keyboard input, and CRT output. Through the master-host interface, the MeshSP is provided with essentially all standard C input/output functions via host resources. One area which requires special attention is the difference between the treatment of characters and strings in the 32-bit processor element and in the byte-oriented host computer 20.

The basic character type of the host 20 is the 8-bit byte. Strings are sequences of such characters, and each 32-bit double word can contain four characters. This convention is supported in hardware by byte addressability. The 32-bit processor element does not provide byte addressability, and the basic character size is 32-bits wide. The processor element's strings are sequences of 32-bit words.

All strings stored in internal memory, master or slave, maintain each character in its own 32-bit word. This allows any string to be accessed by the ANSI C string functions provided with the C compiler.

On the other hand, all strings maintained in host memory adhere to the standard 8-bit byte convention. This allows the strings to be accessed by host hardware and software without modification.

Generally, the origin and destination of character strings is unambiguous. Consider, for example, the function fgets(s, n, file), which reads at most the next n−1 characters from the stream file into the array s. The function understands that the 8-bit characters in file must be converted to 32-bit characters before storage in s (in MeshSP memory). Similarly, the format string appearing as the first argument in a printf( ) statement is understood to reside in MeshSP memory as 32-bit characters.

The only possible ambiguity concerns the functions fread( ) and fwrite( ). These functions are passed pointers to MeshSP memory buffers without consideration of their contents. Accordingly, they make no conversion. If the buffer contains a string of 32-bit characters, it will be stored as 32-bit characters in the host file. If conversion is desired, a function which explicitly recognizes character strings (such as fputs( )) must be used.

Functional Simulator

The functional simulator is a program that executes MeshSP application code. It runs on an OS/2 platform, although it may be ported to other platforms. This section discusses the simulator's operation.

The MeshSP simulator provides functional simulation for the MeshSP architecture, meaning that it reproduces the functions of the MeshSP hardware with enough fidelity to permit algorithm development, coding and debugging independently of the hardware. This work can additionally proceed on relatively inexpensive workstations.

The MeshSP simulator provides the following non-limiting activities:

1. Accepts the same C language application source code as the MeshSP hardware.
2. Simulates the results of SIMD computation for the slave array.
3. Reproduces the effect of interslave communication.
4. Reproduces the effect of I/O with the host computer.

There are also differences between the simulator and MeshSP hardware, including:

1. The simulation is carried out on a single processor; it is not literally parallel.
2. No details of the processor element's hardware (registers, multipliers, etc.), are simulated.
3. The simulation is not bit-for-bit; floating point computations may differ both in round-off and in precision (word size).
4. The intermediate states of interslave transfers and I/O are not always reproduced. The simulation does not reproduce the mechanics of data movement from one processor element to the next; only the final effect of the transfer is reproduced.
5. The simulation is very much slower than the real-time hardware.

6. The simulator provides no timing information at all.

The simulator additionally provides services not available with the MeshSP hardware alone:

1. The simulator warns about certain coding problems, such as illegal TCBs and inconsistent interslave link connections.
2. The simulator enables the power of modem commercial debugging software to be applied to the application on a slave-by-slave basis. This provides more visibility into the MeshSP code and data than is possible with the MeshSP hardware itself.

Operating System Concepts

The IBM OS/2 operating system is 32-bit and multi-tasking, and is capable of running many tasks simultaneously, each with its own memory and context. The operation of the simulator is best described with the help of some operating systems terminology.

A process is a task with its own protected area of memory that executes independently and asynchronously with respect to other processes.

A thread is a task that executes asynchronously with respect to other threads. It shares resources with other threads in the same process, such as global variables. Every process consists of one or more threads.

A pipe is an area in "shared" memory accessible to multiple processes, through which the processes pass messages or data to each other. Pipes are self-synchronizing in the sense that a read from a pipe will hold execution of that process until another process writes the expected data to the pipe.

A semaphore is a word of "shared" memory accessible to multiple processes, through which the processes may pass a signal. Execution may wait for a semaphore signal or a semaphore may simply be queried by a process with access to it.

Design Considerations

The process is a natural analogy to the MeshSP slave in the sense that it has its own area of memory that is protected from access by other processes. Furthermore, it is possible for multiple processes to execute from the same copy of the program as MeshSP slaves execute the same (broadcast) code. This means there is no need for the memory overhead of program replication in the simulator. Unlike MeshSP processing elements, processes run asynchronously. Process execution is time-sliced into the processor by the operating system. All such scheduling issues can be left to the operating system as long as the simulator can impose any synchronization required for proper operation of interslave transactions. Interslave communication and serial I/O are naturally implemented with the help of pipes, since the pipe automatically enforces the required synchronization between communicating processes.

Process and Thread Structure

Figure 11:
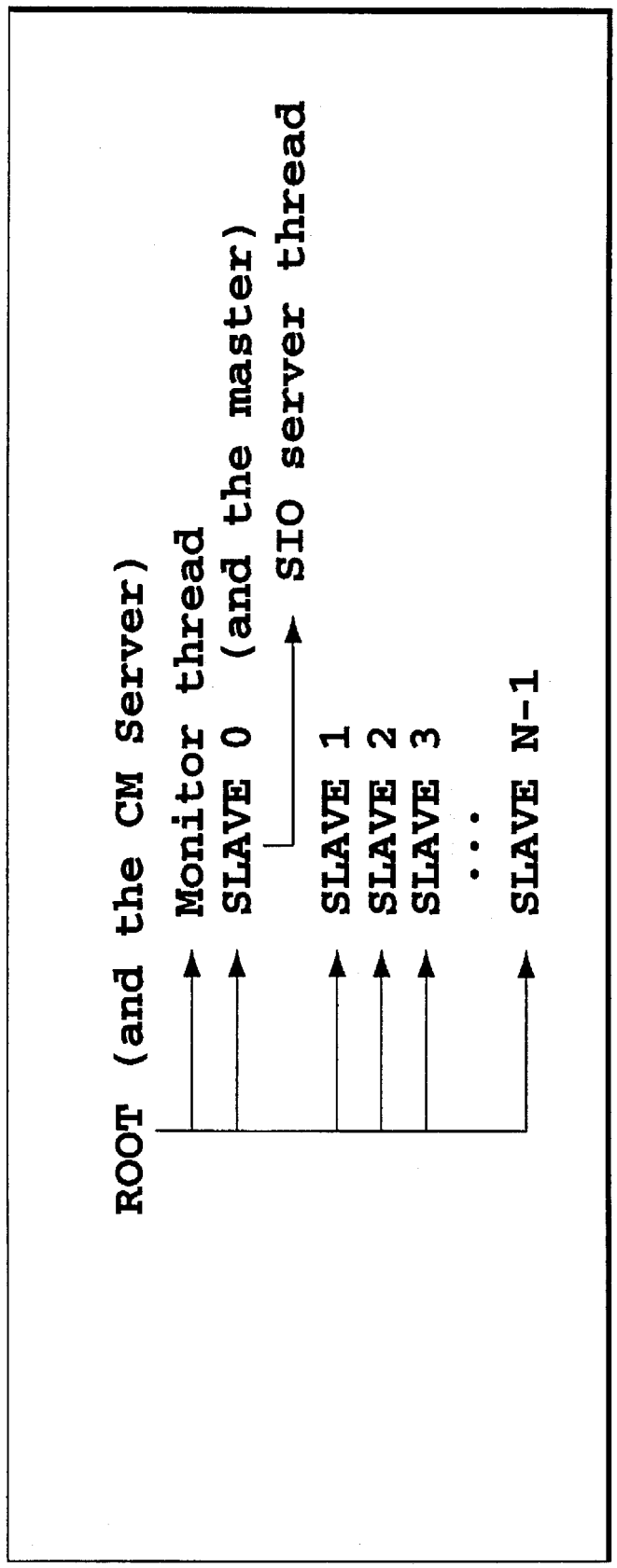
FIG. 11 illustrates selective relationships between various processes and threads of a functional simulator constructed according to the invention.
Figure 12:
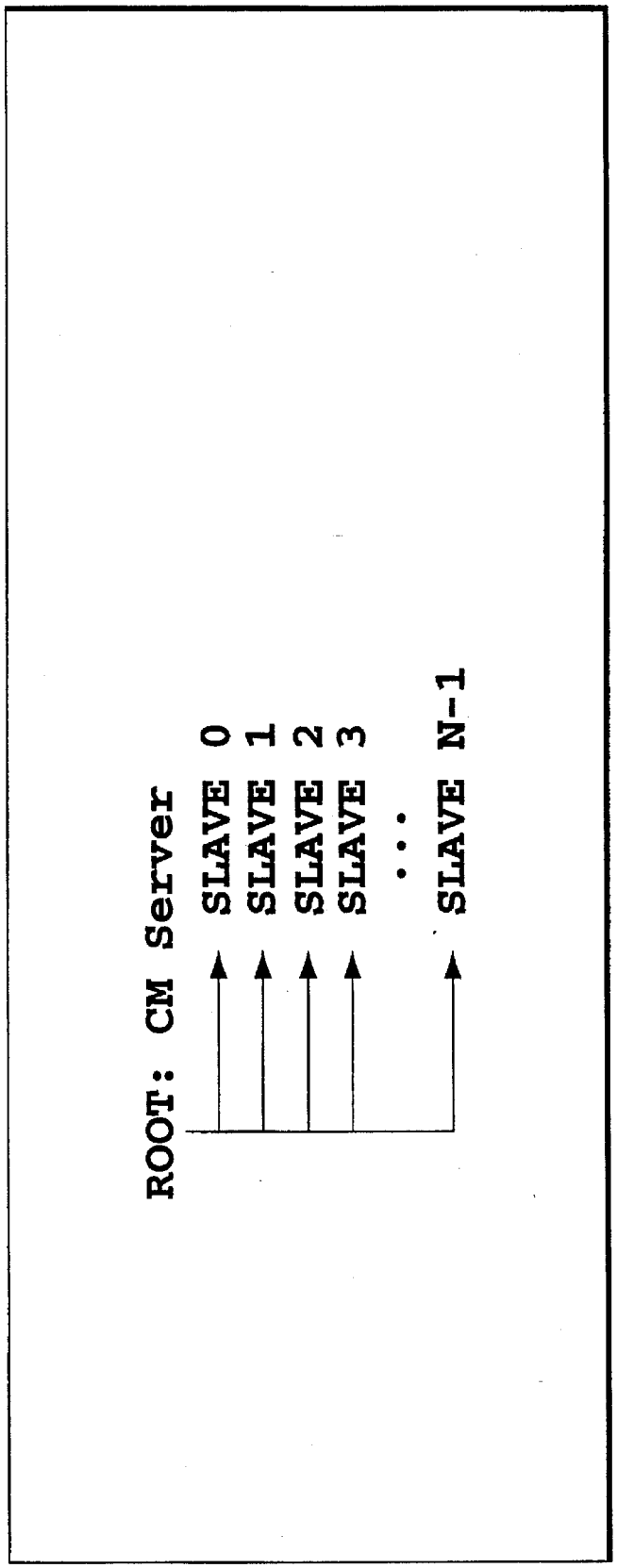
FIG. 12 illustrates certain processes involving CM data transfer within a functional simulator constructed according to the invention.

The root is the first process initiated by running the simulator. The root creates a child process for each slave; the application program runs in the child processes. The root also creates a slave monitor thread. During execution of the application, the root runs the CM server. The root does not perform any host functions. The first slave process (slave 0) creates a special thread which runs the SIO server. This process is also responsible for other host functions, such as console I/O. FIG. 11 shows selected relationships between various processes and threads.

The Root Process

The Root Process is a list of tasks done by the root. They are performed sequentially, so the following list serves as a reasonable operational flowchart of the simulator main program.
1. Establish the exit function.
2. Interpret the command line arguments.
3. Create CM semaphores.
4. Allocate shared memory for CM pipes.
5. Create CM pipes.
6. Pack crucial items of information into the "environment string" to be passed on to the slave child processes.
7. Create the child processes for all the slaves not in debug mode.
8. Create the debug sessions for all the slaves in debug mode.
9. Create the slave monitor thread.
10. Execute the CM server while the application processes execute.
11. Wait for the child processes (and debug sessions) to terminate.

The Master and Host

Master and host services that must be simulated relate to I/O: console input and output, opening and writing to files on the Host computer, etc. In the simulator, these tasks are assigned to the slave 0 process. There is no separate master because there is no broadcasting of instructions to the slave processes. There is no separate host because the slave 0 process has direct access to the physical PC peripherals: console and disks. The standard I/O library has been replaced with functions that are executed if the slave number is 0, but not executed in other slaves. These functions send their return values to all the slaves (via pipes), so the slaves all proceed as if they had received a broadcast return value from the master.

The Slave Monitor

The root process spawns a special thread which effectively monitors the slaves and aborts the entire simulation if a problem causes any one of the slave processes to terminate prematurely. This commonly occurs when the user breaks out of a running simulation, because the Ctrl-Break signal is intercepted by only one of the slave processes. When any slave process ends, it posts a semaphore which is detected by the slave monitor. The monitor has access to all of the process ID's and can kill the processes to terminate the simulation.

The SIO Server

Slave process number zero spawns a special thread that executes the "SIO server." This code handles reads and writes of data between the slaves' memory and disk files. The SIO server accesses slave data via pipes.

The CM Server

While the slave processes are running, the root process executes a piece of code called the "CM server." This code responds to any requests for interslave communication encountered in the application program by establishing pipe connections between the appropriate slave processes. These pipes connect the source slave to the destination slave to carry out the transfer.

Task Synchronization

Many of the simulation progresses are actually handled by the operating system. For example, the questions of scheduling the slave processes for execution, time-slicing, and synchronization of piped data are all under the control of OS/2. Thus it is not possible to specify the order of execution of the different slave processes. It is important to understand this when viewing the progress of one or more slaves in debug mode. Of course, the proper synchronization of interslave transfers at the algorithmic level is enforced by the placement of communication functions in the application code. The simulator faithfully reproduces the result of interslave communication for all legal MeshSP programs.

Simulation of Interslave Communication

Interslave communication presents the most complex situation for the simulator. Briefly, the application program (slave process) receives the TCB and sends it to the CM server. The CM server interprets the path and leg information, and establishes the connections between slaves. These are the connections required to transmit data from the source to the destination; the simulator does not actually pass data through all the intervening slaves as does the MeshSP hardware. The slave process takes the connection information in the form of pipe handles. Data are written to, and read from, pipes to effect the transfer. Additional complication arises from the need to simulate constant registers and the broadcast mode. Synchronization of the CM server and the slaves is another important issue. FIG. 11 shows OS/2 functional simulator processes involved in CM.

The application code requests a transfer by calling CM( ). The transfer is carried out by either CM( ) or WaitCM( ), depending on whether the communication mode is early or late. The CM server, running in parallel, helps by making the required pipe connections.

CM Server Running in Root Process

The pseudocode illustrated in FIG. 13 indicates the actions taken by the CM server as it defines the connections required to simulate interslave communication. The words break and continue are used in the same sense as the C language keywords. To understand this algorithm, it is crucial to understand the following bit of indirection: the server uses inter-process pipes to send pipe handles to the slaves. Each "source" slave receives the handle of a pipe to be used when sending data to its "destination" slave. Each slave has a CM read pipe handle and a CM write pipe handle assigned to it. The pipe is defined in the simulator main program as a connection between these handles. For a transfer from slave A to slave B, the server passes the B write handle to A via the A read pipe. Slave A then effects the CM transfer by writing its data to the B write pipe. Slave A retrieves its new data from its own read pipe.

CM in a Slave Process

The pseudocode illustrated in FIG. 14 indicates the actions taken by each slave process in the interslave communication routine.

Communication Modes

The simulator does not reproduce the interslave communication details that proceed in the MeshSP hardware. In fact, the MeshSP communications are almost always concurrent with processor computational activity, while the simulator necessarily executes these tasks sequentially. There is some freedom concerning the order of operations which gives rise to two different "modes" for simulator communication. Any true MeshSP program must be insensitive to this ordering. The two modes are provided to help identify algorithm errors involving the ordering of computation and interslave communication.

Figure 15:
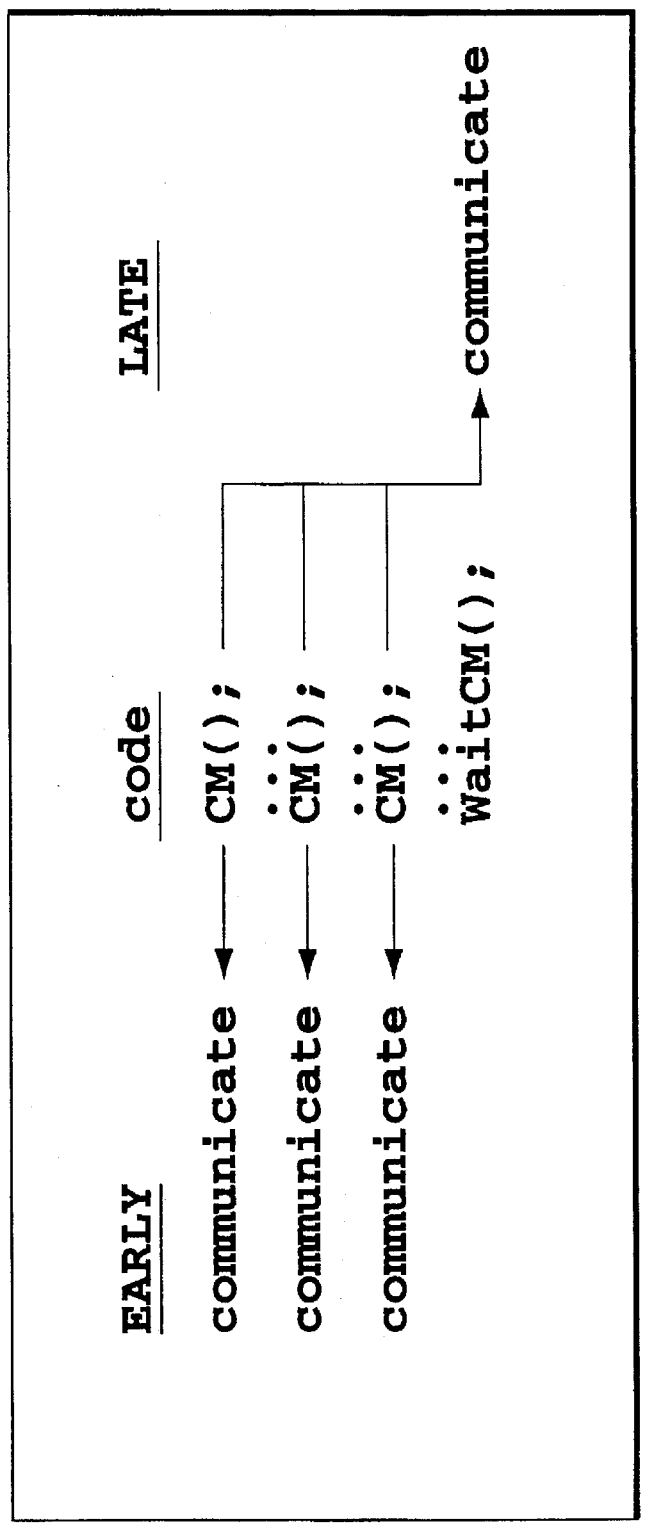
FIG. 15 illustrates early and late communications modes within a the functional simulator constructed according to the invention.

Communications are initiated with the CM( ) function. Communication may then proceed at any rate, constrained only by the requirement that all communications will be completed before the next WAITCM( ) function is completed. In contrast, the simulator carries out all communication within either the CM( ) or the WAITCM( ) function. The former case is referred to as "early communication"; and the latter is referred to as "late communication." These are, in some sense, extreme cases that bracket the situation in hardware, where the bulk of communication occurs at points between the execution of these two functions. FIG. 15 illustrates the difference between the two modes.

The invention provides several advantages which relate to the MeshSP architecture, in addition those already mentioned. First, the MeshSP provides seamless processing and thus forms a uniform fabric of processors over which data can be distributed. As these processors are fully programmable, users are free to arbitrarily redistribute the various processing tasks in time. Since neither processing power nor memory are allocated to specific subsystems, the processing resources are reallocated to different tasks without restriction. This approach achieves the computational power of a multi-processor while approximating the flexibility and simplicity of a uni-processor.

Another major architectural advantage of the invention concerns the coordination of activities in the individual processor elements. In MIMD processing, each processor element operates independently. That is, each processor has its own code as well as data, and is free to execute a conventional program with arbitrary data dependence. In SIMD, however, the processor elements are in lock-step operation; and thus the entire array of slaves executes instructions broadcast by a single master. SIMD operation allows a large fraction of hardware and time-line resources to be devoted to pure computation, minimizing the portion devoted to unproductive activities such as control and handshaking. Furthermore, since the slaves need no copies of the code, their local memories can be efficiently devoted to data while the single copy of code at the master can be optimized for speed, rather than for size.

Another advantage of the MeshSP is interprocessor connectivity, particularly relating to bandwidth and latency. High bandwidth (total words/second) is ensured by providing a sufficient number of parallel communication paths, running at adequate speeds. Low latency (maximum delay from transmission to reception) requires minimizing the maximum path length. For example, the 12-dimensional hypercube of the prior art CM-1 Connection Machine allows data to be passed from any of 4096 elements to any other in at most 12 basic steps. On the other hand, an equal number of elements arranged as a 64×64 toroidal nearest-neighbor mesh, according to the invention, requires a maximum of 64 basic steps for the most remote transfer. Many applications are dominated by local transfers, and thus by low latency. Furthermore, latency itself is seldom a major consideration as computation and communication can often be pipelined so that the required data are in place when needed. Considerations of simplicity, hardware resources, and freedom from conflict and contention provide the incentive for the toroidally connected, rectangular mesh of the MeshSP.

The MeshSP strategy is also advantageous in that it provides communication and I/O concurrency without compromising the unitary nature of its programming model: the processor element's hardware resources support these I/O functions during computation. The I/O section is initialized by the core processor section but then runs to completion in the background, interrupting the core processor section only when the desired transfer completes. In order not to excessively burden the core processor section, it was desirable to equip the I/O section with sufficient intelligence to complete complex transfers with a simple set-up and with no further assistance.

Appendix A contains, for disclosure purposes, subject matter setting forth non-limiting algorithmic examples which are suitable for application with the MeshSP architecture of the invention. In Appendix A, "SHARC", "PE", and "21060" are used interchangeably to denote the processor element of the invention.

The invention thus attains the objects set forth above, in addition to those apparent from the preceding description. Since certain changes may be made in the MeshSP processor apparatus and methods without departing from the scope of the invention, it is intended that all matter contained in the above description or shown in the accompanying drawing be interpreted as illustrative and not in a limiting sense.

It is also understood that the following claims cover all the specific and generic features of the invention described herein, and all statements of the scope of the invention which, as a matter of language, might be said to fall there between.

APPENDIX A

**FOR U.S. PATENT APPLICATION ENTITLED
"MESH PARALLEL COMPUTER ARCHITECTURE
APPARATUS AND ASSOCIATED METHODS"**

BY

IRA H. GILBERT

5 ALGORITHMIC EXAMPLES

As emphasized in Section 3, MeshSP algorithm development requires the explicit partitioning of data across slaves, as well as the explicit specification of inter-slave communication and I/O. The material presented in this section is intended to illustrate this process by describing a diverse collection of sample problems.

5.1 Trend and Mean Removal.

Before estimating the power spectral density (PSD) of some data, it is usually necessary to compute and remove the global mean and linear trend:

$$D(X,Y) - D(X,Y) - \langle D \rangle - \frac{X \langle XD \rangle}{\langle X^2 \rangle} - \frac{Y \langle YD \rangle}{\langle Y^2 \rangle} \qquad (1)$$

where $D(x,y)$ is the data field, $\langle \rangle$ indicates averaging, and $X$ and $Y$ are coordinates of the data points relative to the *global* center. If the coordinates are expressed in units such adjacent points differ by 1, it may be shown that: $\langle X^2 \rangle = \langle Y^2 \rangle = (N^2-1)/12$. In order to apply equation (1) it is necessary to form the global zeroth and first moments.

Let $X_i$ and $Y_i$ be the coordinates of the center of the data patch assigned to slave i, and let x and y be coordinates relative to the slave data center. Then:

$$\langle XD \rangle = \frac{1}{N} \sum_{i=1}^{N} (\langle xD \rangle_i + X_i \langle D \rangle_i) \qquad (2)$$

$$\langle YD \rangle = \frac{1}{N} \sum_{i=1}^{N} (\langle yD \rangle_i + Y_i \langle D \rangle_i) \qquad (3)$$

A1 where N is the array size (64 for MeshSP-1). These equations express the global moments in terms of the local moments computed relative to the slave data center.

If the number of data elements per slave is large, the task of combining the local moments is a minor part of the data conditioning algorithm. It may be efficiently accomplished by first forming partial sums in the x-direction and then combining the partial sums in the y-direction. In order to compute the partial sums, one first spreads the local moments in the x-direction. This provides each slave with the values of the local moments in the other slaves in the same row. These values are then combined to form three partial sums (every slave in a given row having the same value for each partial sum). The partial sums are then spread in the y-direction, allowing each slave to form the final sums.

The communication cost/moment for the data spreading for 8x8 slaves is:

2 directions x 7 shifts x 4 cycles/shift = 56 cycles

The arithmetic cost is:

2 directions x 8 cycles = 16 cycles

If one were forming not three global sums, but a large number of such sums, a considerably more efficient algorithm is available. In fact if the number of sums is a multiple of the array size, one may form the global sums with *no computational inefficiency* (albeit with significant communication overhead).

Let A be an array of N elements, i.e., the number of data elements within each slave equals the number of slaves in the array. By first applying the Permute_X() operation and then the Permute_Y() operation the N corresponding elements of A in each slave may be brought together in a single slave. Thus A[0] in each slave may be brought into slave 0, etc. Once grouped together in this way, a sequence of N arithmetic operations (on non-redundent data in the various slaves) serves to simultaneously form all N required sums. The final results may then be redistributed to the individual slaves by a variety of means, e.g., the SpreadX() function followed by SpreadY(). Each permutation operation involves an average distance of 2 cells, or 8 cycles. Redistributing the final sums involves a cost of 4 cycles per word. Thus the cost for each of the N sums is given by:

| | | | |
|---|---|---|---|
| communication | = | 20 | cycles |
| computation | = | 1 | cycles |
| total | = | 21 | cycles. |

A2

TABLE IV
Speedup Factor for Matrix Inversion

| Matrix | 2x2 PEs | 4x4 PEs | 8x8 PEs | 16x16 PEs |
|---|---|---|---|---|
| 64 x 64 | 3.6 | 7.7 | 3.4 | 1.6 |
| 128 x 128 | 3.8 | 13.2 | 6.8 | 3.2 |
| 256 x 256 | 3.9 | 14.5 | 13.5 | 6.4 |
| 512 x 512 | 4.0 | 15.2 | 27.0 | 12.7 |
| 1024 x 1024 | 4.0 | 15.6 | 53.9 | 25.4 |
| 2048 x 2048 | 4.0 | 15.8 | 60.8 | 50.8 |

Situations where the speed-up approaches the number of PEs represent particularly cost-effective matches between the problem and the hardware. For example, the 8x8 MeshSP-1 processor is well suited to inverting matrices with several hundreds of rows.

Gaussian Elimination With Back-Substitution

The computational benefits of this algorithm are most apparent when solving for only one right-hand side vector. While the inner loops of Gauss-Jordan elimination are executed $N^3$ times, triangular Gaussian elimination requires only $N^3/3$ iterations, and the subsequent back-substitution process is proportional to just $N^2$. How well does this parallelize?

The obvious generalization of our column-oriented Gauss-Jordan elimination would have each PE eliminate the pivot row only from rows below the pivot element. This produces an upper-diagonal matrix with about $N^3/2$ executions of the inner loop. If the dimension of the problem is much larger than the number of PEs (and the assignment of PEs to columns is appropriately interleaved) then one can make use of the knowledge that columns to the left of the pivot element do not require row-elimination. This makes it possible to approach uni-processor efficiency ($N^3/3$ iterations) as N becomes large. The other great expense, communication of the pivot columns, is cut in half since it is necessary to communicate only elements below the pivot row.

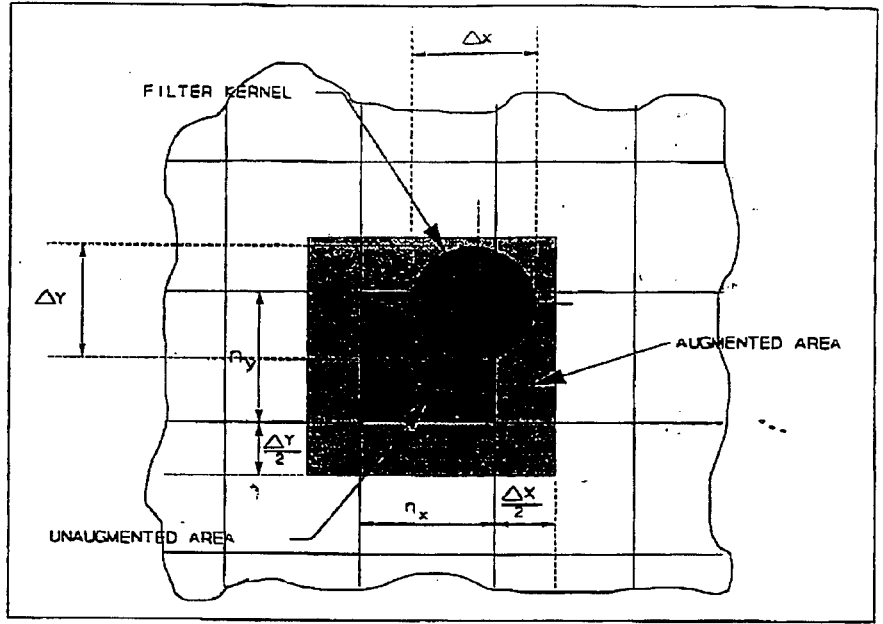

*Figure 5-1  Segmented Convolution*

Real-Space Segmented Convolution by Overlap-and-Save

For real-space convolution we require that $\Delta x$ and $\Delta y$ be even. The real-space overlap-and-save algorithm is represented by the pseudo-code in Listing 5-1. Note that there is no *computational* penalty for this parallel decomposition. No numerical operation is duplicated among the slaves. The computational speedup is simply the ratio of the total processed area to the area assigned each slave.

There is, of course, a communication penalty involved in gathering data from surrounding slaves which depends on the distance from which the data must be gathered. For simplicity consider a kernel limited in extent by $\Delta x < 2n_x$ and $\Delta y < 2n_y$. It takes 4 processor cycles to communicate a single 32-bit word from a nearest neighbor, 8 cycles from a next nearest neighbor, etc. Referring to Figure 5-1, one may determine the total communication cost (in cycles) to be $4(n_x\Delta_y + n_y\Delta_x + 2\Delta_x\Delta_y)$. If the filter kernel fills the rectangle $\Delta_x\Delta_y$, the single cycle multiply-accumulate operation results in a computational cost of $n_x n_y \Delta_x \Delta_y$. The ratio of communication to computation is then:

5.2 Segmented Convolution

A common operation in signal and image processing consists of convolution with a finite kernel. This may be accomplished on the MeshSP by distributing the data across the processor array, and then simultaneously convolving the data in each slave with a similar filter kernel.

The convolution may be performed directly in real-space or via multiplication in Fourier-space. In either case, it is necessary for each slave to access data from surrounding slaves. In general, the area to be imported from neighboring slaves must be large enough to encompass the convolution kernel, (or at least the region where it is significantly large). This allows the convolved segments to be pieced together, yielding a result which is equivalent to convolving the original, unsegmented data, with the filter kernel. This communication may be performed either before convolution (overlap-and-save), or afterward (overlap-and-add). The situation is illustrated in Figure 5-1.

In the overlap-and-save algorithm, the internal data of each slave are first augmented with data from surrounding slaves. The augmented data of the various slaves are then simultaneously convolved with the filter kernel. If the convolution is done in real-space, only the values at points within the original, unaugmented, domain need be computed. Alternatively, the convolution may be performed by transforming the augmented data to Fourier-space, multiplying by the transform of the convolution kernel, followed by inverse transformation back to real-space. This results in the *cyclic* convolution of the data with the filter kernel. Only the interior points of the resultant field are valid, and the points outside the unaugmented region are simply discarded.

The overlap-and-add algorithm begins with data from the unaugmented area only. In real-space, only interior (unaugmented) points are used as *source_points* for the finite convolution. In Fourier-space, the data in the augmentation zone are explicitly zeroed before being transformed. In either case, the full convolution is completed by importing into each slave the overlapping partial results from neighboring slaves, and summing them with the internal result to form the full convolution.

High-level functions Augment() and Excise() (Section 3.4) have been provided to perform the necessary data communication and trimming for the overlap-and-save method.

Let the filter kernel be $h(x,y)$, with support within a rectangle whose x and y dimensions are $\Delta x$ and $\Delta y$. Let nx and ny be the dimensions of $f(x,y)$, the unaugmented data assigned to each slave, while $Nx=nx+\Delta x$ and $Ny=ny+\Delta y$ are the dimensions of the augmented data. Let $g(x,y)$ be the result of convolving the data with the filter.

```
Augment(g, f, nx, ny, Δx/2, Δy/2)
Loop over x,y, points inside unaugmented domain
{
    g(x,y) = 0
    Loop over x', y', points inside kernel support space
    {
        g(x,y) = g(x,y) + h(x',y') * f(x+x', y+y')
    }
}
```

*Listing 5-1   Overlap-and-Save Algorithm*

$$\frac{communication}{computation} = 4\left[\frac{1}{n_x \Delta_y} + \frac{1}{n_y \Delta_x} + \frac{1}{n_x n_y}\right] \quad (4)$$

For virtually all reasonable sizes of data and filter this ratio is small compared with unity and computation dominates communication.

Fourier-Space Segmented Convolution by Overlap-and-Save

In order to apply Fourier-space convolution the size of the augmented region cannot be arbitrarily selected, but must match one of the transform lengths supported by the FFT library. The MeshSP library supports lengths of the form $2^n$ and $3 \times 2^n$, e.g., 16, 24, 32, 48, 64, 96, etc. The Fourier-space overlap-and-save convolution is given in Listing 5-2.

```
Augment(g, f, nx, ny, Δx/2, Δy/2)
FFT2D(g, Nx, Ny)
Loop over all points kx, ky in Fourier-space
{
    g(kx, ky) = g(kx, ky) * H(kx, ky)
}
IFFT2D(g, Nx, Ny)
Excise(SET, f, g, nx, ny, Δx/2, Δy/2)
```

*Listing 5-2   Fourier-space Overlap-and-Save*

Here FFT2D() is a two-dimensional FFT routines which transforms real data to Hermitian data, while IFFT is its inverse. H(kx, ky) is the (appropriately scaled) transform of h(x,y).

This algorithm involves a round-trip real-to-Hermitian FFT plus a single complex multiply over *half* of Fourier-space (Hermitian symmetry). In the SHARC, the time to perform a full complex FFT is approximately $2N \log_2 N$ cycles, and a real to Hermitian half that, while a complex multiply takes 4 cycles. The total computational cost is then: $2N_x N_y[1 + \log_2(N_x N_y)]$. In general, real-space convolution is economical only for filter kernels which are sufficiently compact that $\Delta_x \Delta_y < [1 + 2\ln_2((n_x+\Delta_x)(n_y+\Delta_y))]$. For example, if the data were distributed so that each slave processed a 64x64 cell portion, the first available size for the FFT would be 96x96 cells. Fourier-space convolution thus costs $96^2[1+2\log_2(96^2)]$ cycles. On the other hand, real-space convolution costs $64^2 \Delta_x \Delta_y$ cycles. The crossover point occurs when $\Delta_x \Delta_y = 62$. In this example, real-space convolution is faster then Fourier-space convolution for kernels smaller than 62, while for larger kernels the Fourier-space algorithm wins.

It should be pointed out that this simplest form of Fourier-space convolution involves a greater number of FFTs than is absolutely necessary. Since augmentation provides neighboring slaves with redundant data, transforming these data involves avoidable computation. Here we may exploit the fact that since the original data are real, their transforms are Hermitian. This symmetry allows an entire transformed row, for example, to be reconstructed from essentially half the transformed points. The alternative algorithm is given in Listing 5-3.

```
Augment in x direction
Row transform in x-direction
     (ny real-to-Hermitian transforms of length Nx)
Augment in y direction
Column transform in y-direction
     (Nx/2 full complex transforms of length Ny)
```

*Listing 5-3 A Faster 2D FFT*

The computational cost of the modified algorithm, relative to the unmodified algorithm, is then:

$$relative\ computational\ cost = \frac{1 + \frac{n_y}{N_y} \cdot \frac{\log(N_x)}{\log(N_y)}}{1 + \frac{\log(N_x)}{\log(N_y)}} \qquad (5)$$

For example, if $Nx = Ny = 2nx = 2ny$ (square array augmented to twice its linear dimension) the relative cost is 3/4, i.e a 25% saving in computation. While this savings may be worthwhile, it does introduce an element of coding complexity, since the two-dimensional augmentation and FFT library routines cannot be used whole, but must be split into parts and interwoven.

5.3 Spatial Averaging of Extended Data

A major advantage of the MeshSP architecture is its scalability. It is possible to construct quite large processor arrays which can process distributed data via such segmentation algorithms as described above. A common feature of data adaptive extended processing is the construction of statistics (mean, max, min etc.) over neighborhoods surrounding each slave.

A straightforward (but somewhat inefficient) proceedure is to first gather surrounding data via the Augment() function, and then sum them in place. For reasons of symmetry let N, the size of the averaging region, be an odd number of slaves. The staged augmentation algorithm illustrated in Figure 3-3 involves a communication cost of 1 slave step (4 cycles) per imported word, *regardless of the size of the augmentation area*. Thus, augmenting a single quantity over an NxN slave region costs $4N^2$ cycles. To this must be added the cost of summation, another $N^2$ cycles. For example, if N=9 slaves:

| | |
|---|---|
| communication: 81 shifts x 4 cycles/shift = | 324 cycles |
| computation: | 81 cycles |

A more efficient algorithm, divide and conquer, can significantly reduce these costs. It is expecially suitable if N is a power of 2 or 3. Suppose once again that $N = 3^2 = 9$. To form a sum over the 81 slave region centered on a given slave one first imports into each slave the data values from the two nearest neighbors in the x-direction. The internal value is added to the imported values to form a partial sum. The process is then repeated with the two nearest neighbors in the y-direction. At this point each slave has computed the sum of the data in the 3x3 slave area centered on itself. The entire sequence is then repeated with the importation of data from a distance of 3 slaves in each direction (see Figure 5-2).

The costs of the divide and conquer algorithm for 9x9 averaging are:

| | | | |
|---|---|---|---|
| communication: | 1st stage | 4 shifts x 4 cycles/shift = | 16 cycles |
| | 2nd stage | 12 shifts x 4 cycles/shift = | 48 cycles |
| | total | | 64 cycles |
| computation: | 1st stage | | 6 cycles |
| | 2nd stage | | 6 cycles |
| | total | | 12 cycles |

It must be emphasized that these costs ignore the overhead of initiating communication. Simply moving the TCB into the communication hardware costs 15 cycles, and additional cycles are needed for the operations associated with the CM control structure (Section 3.3). However, when one is interested in the statistics of a substantial number of quantities (for example the elements of a two-dimensional PSD)

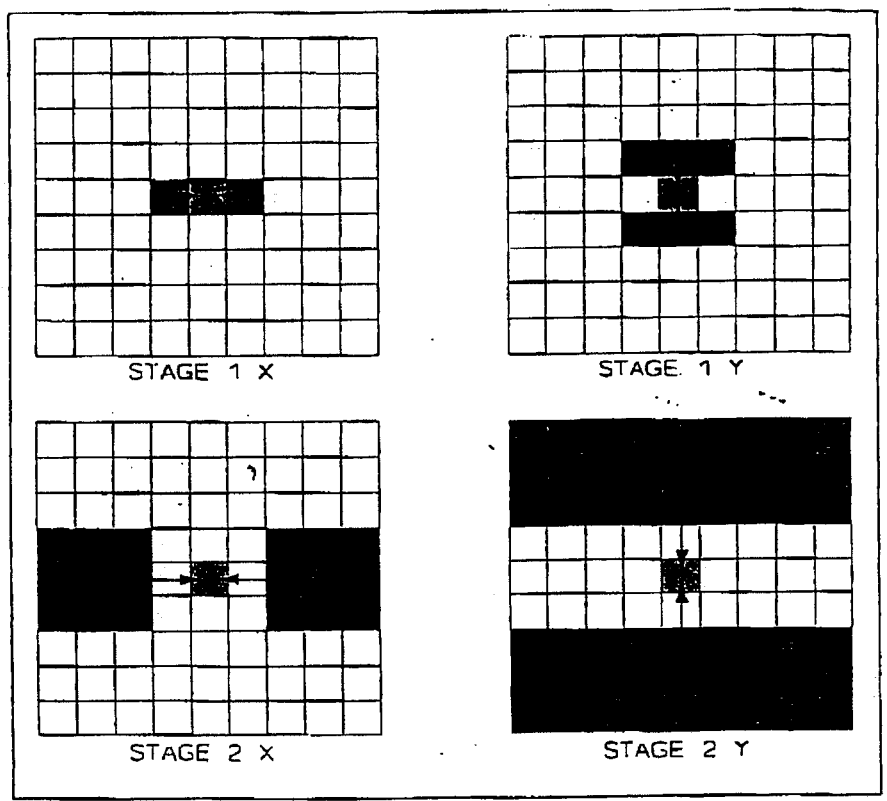

Figure 5-2  9x9 Ternary Divide and Conquer this overhead becomes a small part of the total cost.

Another potential drawback to the divide and conquer technique is the back and forth alternation of communication and computation at each stage. This threatens to make concurrency with other computation difficult during the various CM segments. The problem is avoided by programming the computational parts of the divide and conquer as a function to be called by the CM interrupt service routine via a pointer in INT_VECT_TABLE (see Section 3.3). This causes the divide-and-conquer

5.4 Global Two-dimensional FFT

The MeshSP can efficiently perform Fourier transformation of data distributed across the entire processor array. Since each point of the original data affects all points of the transformed data, it is clear that inter-slave communication is a major component of the process. A straightforward algorithm for performing a global two-dimensional FFT is:

1. Redistribute the data so that each complete row is placed in a single slave.
2. Transform the rearranged rows by a series of within-slave one-dimensional FFTs.
3. Restore the transformed data by the inverse of the row rearrangement.
4. Redistribute the data so that each column is placed in a single slave.
5. Transform the rearranged columns by a series of within-slave one-dimensional FFTs.
6. Restore the fully transformed data by the inverse of the column rearrangement.

Data Shuffling·

The inter-processor communications required to implement this general proceedure are based on the functions Permute_X() and Permute_Y(), described in Section 3.4. Their operation may be examined in detail. For simplicity we assume the processor array to be square, with ARRAY_X_DIM = ARRAY_Y_DIM = AD =.8, the size of MeshSP-1.

Let the complex data array have dimensions NX and NY, each a multiple of AD:

$NX = AD*Nx$ $NY = AD*Ny$

The complex data assigned to each slave has dimensions Nx and Ny.

Complex quantities are stored with real and imaginary parts in immediately adjacent memory locations. Similarly, complex row elements are stored in adjacent pairs of locations. In packing a complex row one is free to treat it as if it were a real row with twice the number of points (see Figure 5-3).

The situation is more complicated for columns. As shown by the right hand portion of the figure, the complex columns cannot be considered to consist of 8 inter-digitated *two-dimensional* subarrays. The problem is that *three* different address increments are needed to describe each subarray: 1 (real part additions (or other computation) to be performed as soon as the communication for each stage is complete, while allowing for full concurrency with an unrelated computational task during the lengthy communication segments.

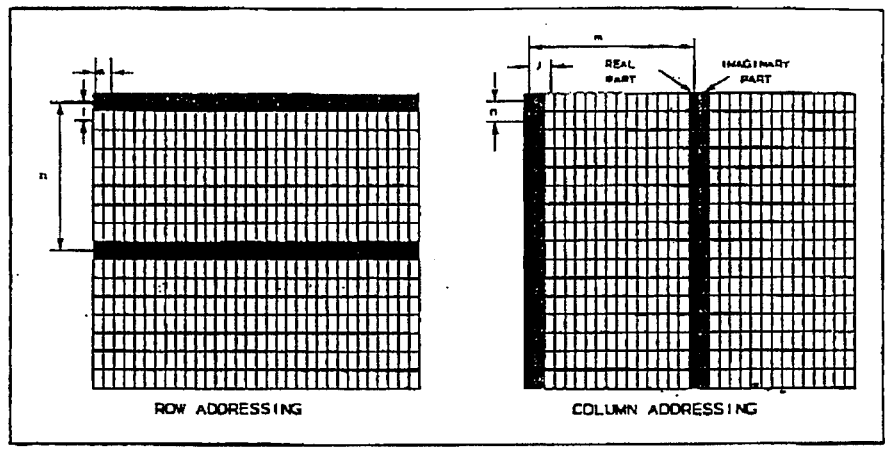

*Figure 5-3 Addressing Formats for Row and Column Packing* to imaginary part), 2 NX/8 (between adjacent elements in the same column), and 16 (between an element in a given column and its counterpart in the next column). Note however that the real part of the data, and the imaginary part of the data separately form inter-digitated two-dimensional subarrays. Thus, the process of packing each column into a single slave must be accomplished by applying two permutations, one for the real part and one for the imaginary part of the complex data. The FFT() function expects 1-dimensional data, with real and imaginary parts in adjacent locations. Therefore the column packing transforms data from the format designated as column-addressing, to the format designated as row addressing in the figure.

The details of programming this complex communication may be understood by examining the code which prepares the TCBs.

To prepare for the row packing one must first construct the dma structures which specify the arrangement of data for the original row-addressed array, and for the FFT buffer. The two arrangements are identical, only the base addresses differ.

MkDmaC( &row_dma, data, Nx, 0, 1, Nx, 0, AD, Ny/AD );

MkDmaC( &buf_dma, buffer, Nx, 0, 1, Nx, 0, AD, Ny/AD );

Next one must construct the dma structures for the real and imaginary parts of the column addressed data and FFT buffer.

MkDmaY( &r_col_dma, data,   2*Nx, 0, 2*AD, Nx/AD, 0, 1, Ny );

MkDmaY( &i_col_dma, data,   2*Nx, 1, 2*AD, Nx/AD, 0, 1, Ny );

The complex buffer dma created above cannot be used directly since it combines real and imaginary parts. Two structures are required, one for the real part and one for the imaginary part.

MkDma( &r_buf_dma, buffer, 2*Nx, 0,  2, Nx, 0, AD,  Ny/AD );

MkDma( &i_buf_dma, buffer, 2*Nx, 1,  2, Nx, 0, AD,  Ny/AD );

Having specified the form of the required sub-arrays, one may then create the required TCB to perform the permutations. Each permutation involves as many different shifts as processor rows or columns, 8 in this example. For the global FFT we require 6 different transformations, viz:

1. pack complex rows
   (fft rows)
2. unpack complex rows
3. pack real part of columns
4. pack imaginary part of columns
   (fft columns)
5. unpack real part of columns
6. unpack imaginary part of columns This requires an array of 6x8=48 TCBs. In C notation:

cm_tcb TCB[6*ARRAY_X_DIM];

Although there are 48 TCBs, they may be linked to form just 3 chains; one to prepare for the row ffts, one to prepare for the column ffts, and one to restore the data to its original arrangement. First construct the TCBs to pack and unpack the rows:

Permute_X( TCB,       +1, buf_dma, 2*Nx, row_dma, 2*Nx );
    Permute_X( TCB + AD, -1, buf_dma, 2*Nx, row_dma, 2*Nx );

Next construct the TCBs to pack and unpack the real part of the columns:

Permute_Y( TCB+2*AD, +1, r_buf_dma, 2*Nx, r_col_dma, 2 );
    Permute_Y( TCB+4*AD, -1, r_buf_dma, 2*Nx, r_col_dma, 2 );

Next construct the TCBs to pack and unpack the imaginary parts of the columns:

```
Permute_Y( TCB+3*AD, +1, i_buf_dma, 2*Nx, i_col_dma, 2 );
Permute_Y( TCB+5*AD, -1, i_buf_dma, 2*Nx, i_col_dma, 2 );
```

Finally, link up the chains which may be combined:

```
LinkCM( TCB+2*AD-1, TCB+2*AD );    unpack row -> pack real column
LinkCM( TCB+3*AD-1, TCB+3*AD );    pack real column -> pack imaginary column
LinkCM( TCB+5*AD-1, TCB+5*AD );    unpack real column -> unpack imaginary column
```

Having created these TCB chains the entire global fft consists of the following code:

```
CM( HIGH, TCB );                    /* pack rows                     */
WaitCM( TCB );
for(i=0; i<n; i++)                  /* transform n rows              */
    FFT( buffer+i*NX, NX, isign );
CM( HIGH, TCB+AD );                 /* unpack rows, pack columns     */
WaitCM( TCB+AD );
for( i=0; i<n; i++ )                /* transform n columns           */
    FFT( buffer + i*NY, NY, isign );
CM( HIGH, TCB+4*AD );               /* unpack columns                */
WaitCM( TCB+4*AD );
```

Timing and Throughput Considerations

The division of data among slaves provides full *computational* efficiency. No cycles are wasted as each slave is fully occupied in non-redundant computation. The communication process does, however exact a significant price.

By virtue of toroidal connectivity, the *greatest* distance by which a data item need be moved in either a row or column permutation is half the array dimension, or AD/2. The average distance is half that, or AD/4 slaves. If the cost of the zero shift intra-slave transfer is included this average cost is increased by 1/AD. This correction is small and will be ignored. Since four cycles are required to shift each 32-bit real quantity, the average communication cost/real word is AD cycles.

The global two-dimensional transform described above involves 4 transfers (row pack, row unpack, column pack, column unpack) for the real and imaginary part of each complex data point. For a transform of N complex points ($N/AD^2$ per slave) the total communication cost is therefore $4*2*AD*N/AD^2$ cycles. Since a *single* SHARC performs an N-point complex FFT in $2N*\log_2(N)$ cycles, the time for the array computation is $2N*\log_2(N)$ cycles/$AD^2$ cycles. Thus, the ratio of communication to computation is: $4*AD/\log_2(N)$.

For example, a 1024x1024 ($N=2^{20}$) point transform on an 8x8 processor array (AD=8) takes about $0.65 \times 10^6$ cycles (16 ms) for computation, and $1.0 \times 10^6$ cycles (25 ms) for communication. If computation and communication are performed sequentially, the total time for the FFT is the sum, or 41 ms. By proper pipelining, it is usually possible to hide much or all of the faster process (computation) behind the slower process (communication). This is especially easy if a number of such transforms are to be performed in sequence. In that case the total time is the greater of the communication and computation times. For the example cited, the slowdown factor associated with data distribution would then be 16ms/25ms=0.64.

5.5 Large One-dimensional FFT

The global FFT of Section 5.3 may be used as the basis for a one-dimensional transform of a large number of points distributed across the processor array. The algorithm used is simply the first step in a standard derivation of the fast Fourier transform. Let $A[t]$, $(t=0,1,...,N-1)$ be a complex vector of dimension N. Its transform is defined as:

$$\bar{A}(f) = \sum_{k=0}^{N-1} e^{\frac{j2\pi f t}{N}} A(t) \qquad (6)$$

For simplicity we assume the processor array has dimensions 8x8.

Let:

$$\begin{aligned}
N &= NX*NY, \text{ where NX and NY are each multiples of 8, and of the form } 2^n \text{ or } 3 \times 2^n. \\
t &= NY*x + y, \quad x = 0 .. NX-1 \quad y = 0 .. NY-1 \\
f &= k_x + NX*k_y \quad k_x = 0 .. NX-1 \quad k_y = 0 .. NY-1
\end{aligned}$$

Note that while the row-column representation for the frequency index f follows the standard convention of the x index varying more rapidly than the y index, that is not the case for the time index t. The original data are to be placed in the two-dimensional array so that adjacent values are arranged along columns, not rows. With this representation one finds:

$$\bar{A}(k_x + NXk_y) = \sum_{y=0}^{NY-1} e^{i\frac{2\pi y k_y}{NY}} e^{i\frac{2\pi y k_x}{N}} \sum_{x=0}^{NX-1} e^{i\frac{2\pi x k_x}{NX}} A(NYx+y) \qquad (7)$$

This equation may be interpreted as follows:

1. FFT in x-direction (rows)

2. Multiply result of first step by a phase factor:

$$e^{i\frac{2\pi y k_x}{N}} \qquad (8)$$

3. FFT in the y-direction (columns)

This process is essentially equivalent to the global two-dimensional FFT, requiring the additional step of multiplication by a slave and index dependent phase factor. For repeated FFTs these factors may be computed once and then stored for later use. In that case the timing considerations are essentially the same as for the global two-dimensional FFT.

5.6 Systems of Linear Equations

The importance of linear algebraic equations in science and engineering makes the parallel solution of such problems the subject of much recent research [3], [4]. The difficulty in parallelizing these problems for a SIMD architecture revolves around communication between processor elements. As in the Fourier transform problem, each element of the answer is dependent on every data item in the original problem. Solution requires frequent access to data which are likely to be widely dispersed across many PEs. In the most general cases, known as "dense matrix" problems, the computational complexity is of order $N^3$, where N is the number of equations in the linear system. On the other hand, the communication load would be expected to grow in proportion to the number of coefficients per processor (order $N^2$). One therefore expects that a large problem will be better suited to SIMD parallelization than a small one. Although a survey of parallel linear algebra techniques is beyond the scope of this report, we will describe some example algorithms for solving linear equations and discuss implementation efficiency on the MeshSP.

Consider the standard problem involving a set of N simultaneous linear equations and N unknowns $x_i$. This is expressed by the matrix equation:

$$A \cdot x = b \qquad (9)$$

where A is an NxN matrix of coefficients, x is the vector of unknowns, b is the right-hand side vector, and the dot indicates matrix multiplication. One may solve for a collection of right-hand sides $$A \cdot X = B \qquad (10)$$

where B is a set of right-hand side vectors in the form of a matrix and X is a set of solution vectors. If the right-hand side vectors form an NxN unit matrix, then the solution of $$A \cdot X = I \qquad (11)$$

provides the inverse of matrix A.

A well-known technique for the solution of these problems is Gauss-Jordan Elimination. As shown below, this algorithm accesses the matrix elements in a regular fashion which is very compatible with SIMD decomposition. For the matrix inversion problem, Gauss-Jordan elimination is about as fast and stable as any other inversion technique [5]. For the situation where one needs to solve a set of linear equations without obtaining $A^{-1}$, there are faster methods. For example, "triangular" Gaussian Elimination with Backsubstitution is about three times faster on a uni-processor. This will be discussed later.

Gauss-Jordan Elimination

The basic algorithm involves the selection of a pivot element (the largest element in a particular column i), normalization of that row by the pivot element (which becomes 1), interchanging rows to place the pivot element on the diagonal, and subtraction of a multiple of the new i-th row from all other rows in such a way as to zero the off-diagonal elements in the i-th column. Each of these operations is also performed on matrix B using the same numerical weights used for matrix A. The result is that the original equations $$A \cdot X = B \tag{12}$$

are converted to $$I \cdot X = A^{-1} \cdot B \tag{13}$$

To be specific, the serial algorithm is given in Listing 5-4 below in pseudo-code. This includes partial pivoting, which is required for numerical stability.

A large system of linear equations may be distributed across the MeshSP array by placing one column of the problem in each PE. This is very compatible with row exchange and row subtraction, since each processor holds the data needed to do those operations. However, the weights required for row subtraction must be communicated from the processor with the pivot column. The columns are distributed evenly across the processors. For example, the solution of 60 equations and 60 unknowns with 4 different right-hand sides is a 64-column problem that fits in an 8x8 MeshSP array. The inversion of a 64x64 element matrix is a 128 column problem, where each processor has a column from matrix A and a column from matrix B=I. There is no restriction on the dimensions of the problem, since the problem may be augmented to a multiple of 64 by padding with extra right-hand columns. There is obviously some inefficiency in processor utilization when the number of columns is not an even multiple of the number of PEs.

For concreteness, we focus on the square matrix inversion problem where the matrix width N is a multiple of the number of processors P. This problem is free of the inefficiencies noted so far: (1) Gauss-Jordan elimination provides an efficient solution to the matrix inversion problem and (2) no column padding is required. At issue will be the capabilities of the MeshSP processing element, the

```
/* Loop over the columns */
for (i=0; i<N; i++)

/* Find the pivot element in column i */
    for (j=i; j<N; j++)
        Find the largest A[j][i] in absolute value
        This becomes the pivot value pv
        The pivot row pr is set to j /* Normalize the pivot row in A and B */
    for (ii=0; ii<N; ii++)
        divide A[pr][ii] by pv
        divide B[pr][ii] by pv /* Interchange row pr with row i in A and B */
    for (ii=0; ii<N; ii++)
        swap A[pr][ii] with A[i][ii]
        swap B[pr][ii] with B[i][ii]

/* Eliminate the pivot row pr from other rows in A and B */
    for (j=0; j<N; j++)
        for (ii=0; ii<N; ii++)
            subtract A[j][i]*A[pr][ii] from A[j][ii]
            subtract A[j][i]*B[pr][ii] from B[j][ii]
```

*Listing 5-4  Serial Gauss-Jordan Elimination* inefficiency introduced by the SIMD requirement and the necessity of communicating intermediate results between processor elements.

The column-oriented algorithm suffers some inefficiency in the selection of the pivot. This cannot be parallelized across columns since the selections for the different columns are done sequentially, with intervening row elimination operations. In addition, the row elimination requires that each PE contain the normalized pivot column. Therefore, it is straightforward (though inefficient) to communicate the column to all PEs and perform P identical pivot selection and column normalization operations. Since the PEs perform the pivot selection on the same data, there are no special SIMD considerations (such as the need for SIMD-compatible branching surrogates). For large problems the row elimination computation overshadows the pivot selection inefficiency.

The communication of the pivot column is efficiently done with the "spreading" functions using the 21060 "broadcast communication" mode. The PE with the pivot column places it in a buffer for communication, while the other PE's fill their corresponding buffers with zeros. Then the buffer elements are communicated along the columns of the MeshSP array, with a copy of each communicated item dropped off at each PE along the way. Summation of corresponding elements communicated from all PEs results in the pivot column vector being replicated in each PE.

Listing 5-5 gives our column-oriented SIMD parallel version of the Gauss-Jordan routine. This solves the NxN element matrix inversion problem on an MeshSP array with N processor elements.

```
Download one column of matrix A to each PE
/* Each PE also has one column of the unit matrix B */
/* Loop over the columns */
for (i=0; i<N; i++)
    /* Define a mask that selects the i-th PE */
    z = zero(i-(slave_y + sqrt(N)*slave_x));

/* Mask out the i-th column, store in C */
    for (j=0; j<N; j++)  C[j]=A[j]*z;

/* Broadcast the pivot column to all PEs */
    Spread_X ( C );
    Sum the N communicated columns
    Spread_Y ( C );
    Sum the N communicated columns /* Find the pivot element in column i */
    for (j=i; j<N; j++)
        Find the largest A[j] in absolute value
        This becomes the pivot value pv
        The pivot row pr is set to j /* Normalize the pivot row in A and B */
    divide A[pr] by pv
    divide B[pr] by pv /* Interchange row pr with row i in A and B */
    swap A[pr] with A[i]
    swap B[pr] with B[i]

/* Eliminate the pivot row from other rows in A and B */
    for (j=0; j<N; j++)
        subtract A[i]*C[j] from A[j]
        subtract B[i]*C[j] from B[j]
```

*Listing 5-5   SIMD Gauss-Jordan Elimination*

The generalization to larger arrays is simple: each PE holds several columns of arrays A and B. For example, by devoting about 32% of the SHARC's internal memory to the storage of A and B, it is possible to invert a 1024x1024 element matrix with an 8x8 MeshSP processor. In this problem each PE holds 16 columns of A and 16 columns of B.

We address the maximum possible performance for the matrix inversion problem. We assume the time-critical sections are assembly-coded and the coding details may vary depending on the problem dimension. The performance benchmarks necessarily reflect the unique capabilities of the 21060 core processor, as well as the MeshSP SIMD architecture. For example, the 21060 can perform the row elimination inner loop at speeds approaching 3 clock cycles per pair of points in A and B. This requires that one array is stored in 21060 on-chip "data memory" in 32-bit words while the other is stored in on-chip "program memory" consuming 48-bits per word.

Another assumption is that concurrency between computation and communication is exploited by the code whenever possible. The key to obtaining this concurrency is the recognition that pivot columns are selected in a predictable pattern; so the next column may be distributed while the current column is in use for the computationally intensive row-elimination operation. This requires additional row-elimination operations on the communicated column, but this overhead is small when the problem dimension is larger than the number of PEs.

We note that the inversion of large matrices is fraught with danger due to accumulated round-off error. A common solution to this problem is to refine the answer with an iterative improvement algorithm, usually involving one additional matrix inversion of equal size [6]. The discussion below reflects only a single pass at the inversion.

The cycle counts for the most expensive operations are given below for an MeshSP array of P processing elements.

| | |
|---|---|
| Masking the pivot column | $N^2$ |
| Communication of the pivot columns | $8N^2\sqrt{P}$ |
| Elimination on the new pivot column | $2N^2$ |
| Finding pivot element | $2N^2$ |
| Elimination on arrays A and B | $3N^3/\text{ARRAY\_SIZE}$ |

Timing estimates are shown below for six matrix inversion problems of differing dimension on four different MeshSP arrays. The shaded cells indicate that the problem does not fit within the 512K-byte SHARC memory constraint.

Table I shows the time to perform the computations for the SIMD inversion algorithm. The times are in seconds and are based on the 40MHz clock for the SHARC chip. This does not include the communication overhead.

A22

TABLE I
Computation Time for Matrix Inversion (seconds)

| Matrix | 2x2 PEs | 4x4 PEs | 8x8 PEs | 16x16 PEs |
|---|---|---|---|---|
| 64 x 64 | 0.005 | 0.002 | 0.001 | 0.001 |
| 128 x 128 | 0.041 | 0.012 | 0.005 | 0.003 |
| 256 x 256 | 0.323 | 0.087 | 0.028 | 0.014 |
| 512 x 512 | | 0.662 | 0.191 | 0.073 |
| 1024 x 1024 | | | 1.39 | 0.447 |
| 2048 x 2048 | | | | 3.04 |

Table II shows the communication time as a fraction of the total computation time. Clearly, the communication time overwhelms the smaller problems on MeshSP processors with a significant number of PEs.

TABLE II
Communication Time as a Fraction of Computation

| Matrix | 2x2 PEs | 4x4 PEs | 8x8 PEs | 16x16 PEs |
|---|---|---|---|---|
| 64 x 64 | 15% | 136% | 640% | 1780% |
| 128 x 128 | 8% | 82% | 492% | 1710% |
| 256 x 256 | 4% | 45% | 326% | 1460% |
| 512 x 512 | 2% | 24% | 192% | 1080% |
| 1024 x 1024 | 1% | 12% | 106% | 703% |
| 2048 x 2048 | 1% | 6% | 55% | 413% |

Table III shows the total time to invert, including the communication time. We assume the use of any available concurrency between communication and computation. Therefore, the total time is less than the sum of time from Tables 1 and 2.

TABLE III
Total Time for Matrix Inversion (seconds)

| Matrix | 2x2 PEs | 4x4 PEs | 8x8 PEs | 16x16 PEs |
|---|---|---|---|---|
| 64 x 64 | 0.005 | 0.003 | 0.006 | 0.012 |
| 128 x 128 | 0.041 | 0.012 | 0.023 | 0.050 |
| 256 x 256 | 0.323 | 0.087 | 0.094 | 0.198 |
| 512 x 512 | 2.55 | 0.662 | 0.37 | 0.793 |
| 1024 x 1024 | 20.3 | 5.17 | 1.50 | 3.17 |
| 2048 x 2048 | 162 | 40.8 | 10.6 | 12.7 |

Table IV gives the SIMD speedup factor. This is defined with respect to a uni-processor version of the code (no communication or other SIMD overhead) running in a single SHARC chip (with an imagined unlimited on-chip memory).

On the other hand, back-substitution suffers from additional SIMD inefficiencies. The back-substitution step, executed N times, involves a vector inner-product operation where one vector is a partial row in the main matrix A and the other vector is part of the right-hand side b. The multiplications can be parallelized by distributing the solution vector x and the vector b across PEs, but this creates partial sums in each PE which must be communicated to a common point for the computation of the new x element. Parallelized backsubstitution remains an $N^2$ process, making the overall Gaussian elimination algorithm quite efficient for large N. A SIMD algorithm is given in pseudo-code in Listing 5-6.

Cycle count estimates for the most expensive operations are given below for a MeshSP array of P processing elements.

GAUSSIAN ELIMINATION:

| Operation | Cycles |
|---|---|
| Masking the pivot column | $(1/2)N^2$ |
| Communication of the pivot columns | $8N^2\sqrt{P}$ |
| Elimination on the new pivot column | $N^2$ |
| Finding pivot element | $N^2$ |
| Elimination on arrays A and B | $N^3/P$ |

BACKSUBSTITUTION:

| Operation | Cycles |
|---|---|
| Communicate r.h.s. to other PEs | $N\sqrt{P}$ |
| Vector inner product | $N^2/(2P)$ |
| Communicate and add partial sums | $10N\sqrt{P}$ |

Table V shows the total time for the solution of N equations and N unknowns for six different values of N. Table VI shows the speed-up with respect to a comparable uni-processor version of the algorithm. Shaded entries are prohibited by the SHARC memory size.

```
/*
    The solution vector x is spread across PEs.
    x[i] and b[i] are assigned to PE number i/P (integer divide).
    Note the interleaved column storage order of matrix A:
    One PE holds A[k*P][j] for all j and k=0..N/P.
    One solution vector element is known: x[N-1] = b[N-1]
*/

Distribute the right-hand side vector b[] across PEs x[N-1]=b[N-1]

/* Loop over elements of the solution vector x */
for (j=N-2; j<=0; j--)

/*
        Vector inner product of A*x
        Each CE forms (N-i)/P products
    */
    i = pe_num
    for (k=0; k<(N-j)/P; k++)  psum = psum + A[k*P+i][j] * x[k*P+i]

/* Sum the partial sums over to all PEs */
    Spread_X ( psum );
    Sum the communicated items
    Spread_Y ( psum );
    Sum the communicated items, store in sum /* One CE computes the next solution vector element */
    x[j] = b[j] - sum.
```

Listing 5-6 *SIMD Gaussian Elimination and Backsubstitution*

TABLE V
Total Time for Gaussian Elimination (seconds)

| Equations | 2x2 PEs | 4x4 PEs | 8x8 PEs | 16x16 PEs |
|---|---|---|---|---|
| 64 | 0.002 | 0.001 | 0.003 | 0.007 |
| 128 | 0.015 | 0.005 | 0.012 | 0.025 |
| 256 | 0.110 | 0.032 | 0.047 | 0.100 |
| 512 | 0.860 | 0.231 | 0.188 | 0.399 |
| 1024 | 6.79 | 1.76 | 0.750 | 1.59 |
| 2048 | 54.0 | 13.7 | 3.68 | 6.35 |

TABLE VI
Speedup Factor for Gaussian Elimination

| Equations | 2x2 PEs | 4x4 PEs | 8x8 PEs | 16x16 PEs |
|---|---|---|---|---|
| 64 | 3.3 | 4.9 | 2.2 | 1.0 |
| 128 | 3.6 | 10.0 | 4.4 | 2.1 |
| 256 | 3.8 | 13.3 | 8.9 | 4.2 |
| 512 | 3.9 | 14.6 | 17.9 | 8.4 |
| 1024 | 4.0 | 15.3 | 35.9 | 16.9 |
| 2048 | 4.0 | 15.6 | 58.4 | 33.8 |

5.7 Multi-Layer Perceptron Learning by Back Propagation

The Multi-layer Perceptron is a neural network architecture which is widely used to recognize patterns in complex data. One of its original successes was NETtalk [7], a system which learned to produce natural sounding speech from ASCII text. This section includes a brief description of a simple form of the algorithm, emphasizing the partitioning of data for MeshSP implementation. More details can be found in a number of standard texts [8].

The multi-layer perceptron consists of a number of layers of units, each of which receives input from units in the layer just below, and supplies output to the layer just above. The lowest layer receives input data, rather than the output of a lower level. The activation of the j-th unit of level $\alpha$, $x^\alpha_j$, is a linear sum of the outputs of layer $\alpha-1$:

$$x^\alpha_j = \sum_i y^{\alpha-1}_i w^\alpha_{i,j} - \theta_j \qquad (14)$$

Here $y^{\alpha-1}_i$ is the output of unit $i$ in layer $\alpha-1$, and $\theta_j$ is a threshold that may depend on the unit. The output of a unit is a sigmoidal function of its activation, going from 0 for large negative values of activation, to 1 for large positive values, with a non-negative slope everywhere:

$$y^\alpha_j = s(x^\alpha_j) \qquad (15)$$

The "knowledge" of the net is contained in the values of the weights $w^\alpha_{i,j}$. These weights are adjusted in a process of supervised learning called the "generalized delta rule". This rule adjusts each weight according to :

$$\Delta w^\alpha_{i,j} = -\eta \, y^{\alpha-1}_i \, \epsilon^\alpha_j \qquad (16)$$

Here $\eta$ is a scaling constant, and $\epsilon^\alpha_j$ is an error measurement. If the unit is an output unit, the error is simply the difference between the actual output and the target output:

$$\epsilon^\alpha_j = y^\alpha_j - t^\alpha_j \qquad \text{output unit} \qquad (17)$$

If the unit is not an output unit the definition of error is somewhat less direct:

$$\varepsilon^\alpha{}_j = s(x^\alpha{}_j) \sum_k w^{\alpha+1}{}_{j,k} \varepsilon^{\alpha+1}{}_k \qquad (18)$$

MeshSP Implementation

For simplicity, assume that each layer has N units, where N is a multiple of the array dimension (8 for MeshSP-1). The weights of each layer then form an N x N array. These weights may be distributed across the array so that each slave contains an N/8 x N/8 subarray.

The figure below illustrates the four steps in a single stage of propagation. The arrangement of input data is shown in the upper left. These may be the original input, or the results of a previous stage. The first step consists of spreading these data in the row or x-direction so that each slave in every processor row contains contains *all* inputs associated with that row. This allows each slave to compute its *partial* contributions to the eight outputs associated with its column, on the basis of its weight subarray (lower left). For example, the slave in the first row and second column will compute contributions to outputs 8-15 with inputs 0-7. The partial sums may then be rearranged (via the permutation communication pattern) so that all eight partial sums for each output are placed within a single slave. The partial sums may then be combined and appropriately transformed or multiplied according to equations (7) or (10), depending on whether the propagation is forward or backward. As shown in the lower right, the final output is not in the same order as the original input data, but as its transpose.

This poses no difficulty, but does require the next stage of propagation spread these data in the y-direction (rather than x) and permute in the x-direction, rather than y. In general, at each stage the x and y communication directions must be interchanged.

Efficiency and Communication Cost

For data dimensions which are a multiple of the number of processors (i.e., N = 64n for MeshSP-1) the MeshSP decomposition incurs no computational penalty. The communication cost is readily estimated.

Assume the processor array to be square, AD*AD. Each stage of the processing requires spreading $N/AD^2$ inputs and permuting $(N/AD)^2$ partial sums per slave. Four cycles are required to communicate a single 32-bit word to a nearest neighbor. Therefore the cost of distributing $N/AD^2$ inputs over an entire row or column is 4N/AD cycles. Furthermore, the *average* path length (half the maximum path length) for the permute operation is AD/4 cells. Therefore the cost of permuting the N/AD partial sums is: 4 (AD/4) (N/AD) = N cycles. Thus, the total communication cost is 4N/AD + N cycles. For comparison, the cost of simply performing the multiply accumulate operation for the

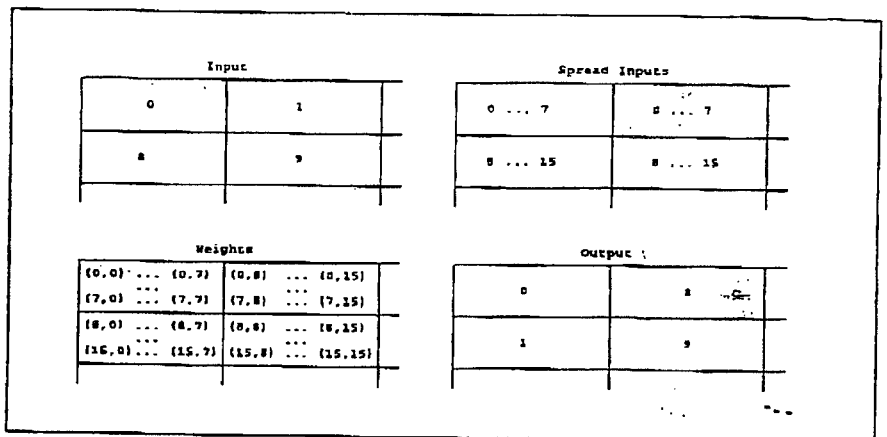
Figure 5-4 Propagation Steps
partial sums is given by $(N/AD)^2$. Thus, the ratio of communication to computation is less than $AD(4+AD)/N$. The cost of communication is less than the cost of computation whenever $N > AD(AD+4)$, e.g., $N>96$ for $AD=8$. Since forward propagation and back propagation are treated symmetrically, this result holds for both directions.

5.8 Tomographic Reconstruction

Tomography (from the Greek *tomos*, section) refers to the cross-sectional imaging of an object. The most familiar examples are found in the technology of medical imaging, where one measures some quantity of diagnostic value at a location inside the body. Modern medical imaging techniques such as x-ray Computed Tomography (CT), Magnetic Resonance Imaging (MRI), Positron Emission Tomography (PET), and Single Photon Emission Computed Tomography (SPECT) depend on the numerical solution of a class of inverse problems. The prototypical example is the determination (reconstruction) of a two-dimensional spatial density function on a plane from a set of one-dimensional integrals at various angles. For example, the x-ray CT scan consists of measurements of the transmission of a pencil-beam, which is related to the integral of x-ray absorption density through the body on that line (see Figure 5-5). A set of integrals with a particular integration direction is known as a *projection*. Modern medical imaging systems can use projections at hundreds of different angles.

Reconstructions of functions from their integrals are used in an increasingly wide range of applications. Well-established non-medical applications are found in the fields of radioastronomy, electron microscopy, geology, and non-destructive materials testing. The solution of the mathematical problem of reconstruction dates to a paper by Radon in 1917. The recent explosion of interest in medical applications has produced a mature collection of numerical techniques, which are described extensively in the literature. For a good introduction to computerized tomographic imaging, see [9].

We will discuss an algorithm widely used in CT scanners called *filtered backprojection*. We will show that the problem can be cast naturally in a SIMD form which allows computation to proceed on the MeshSP with complete efficiency. By "complete efficiency" we mean 1. There are no computations in the parallel algorithm which would not take place in the serial version.

2. There is no overhead cost forced by interslave communications.

3. The time to reconstruct is directly proportional to the number of processing elements in the MeshSP array.

An Example Problem

The geometry of our reconstruction problem is given in Figure 5-6. A density function $f$ is defined on the (x,y)-plane within the unit circle. Outside the circle, $f=0$. Some number of projection functions $p_\theta(t)$ are available. For every point $t$, $p_\theta(t)$ is a line integral through the density:

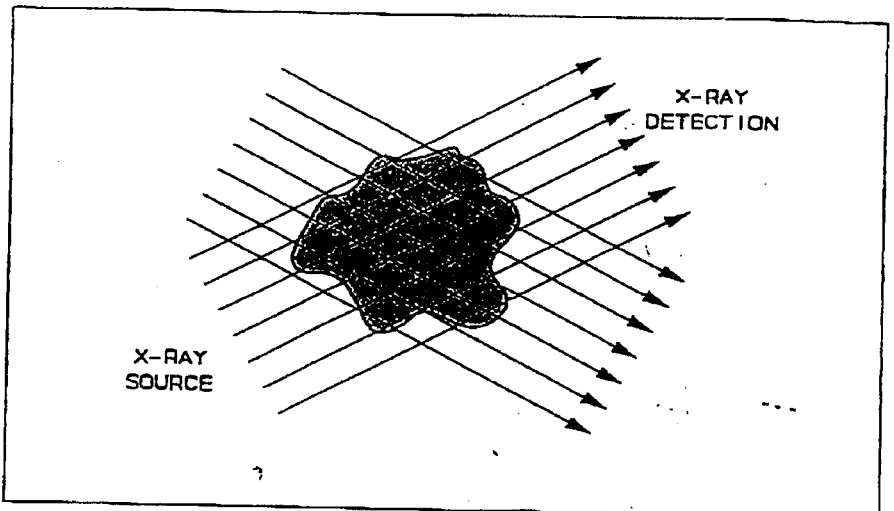

Figure 5-5 CT Measurements For Two Projection Angles $$p_\theta(t) = \int f(t,s)\,ds \qquad (19)$$

where t and s are the rotated coordinates:

$$\begin{aligned} s &= x\cos\theta + y\sin\theta \\ t &= -x\sin\theta + y\cos\theta \end{aligned} \qquad (20)$$

and θ is the angle between the x-axis and the s-axis (projection direction).

The information contained in the continuous density function $f(x,y)$ is preserved in the projections $p$ to an extent that depends on the sampling interval dt along t, the spatial resolution along t, and the number of projections available. The reconstruction problem is easily stated:

Given projections $p_\theta(t)$ for several different angles, estimate $f(x,y)$.

In the x-ray CT example, $p$ is related to the attenuation of an x-ray beam due to absorption in the body. It should be noted that there are many variations on the reconstruction problem depending on the

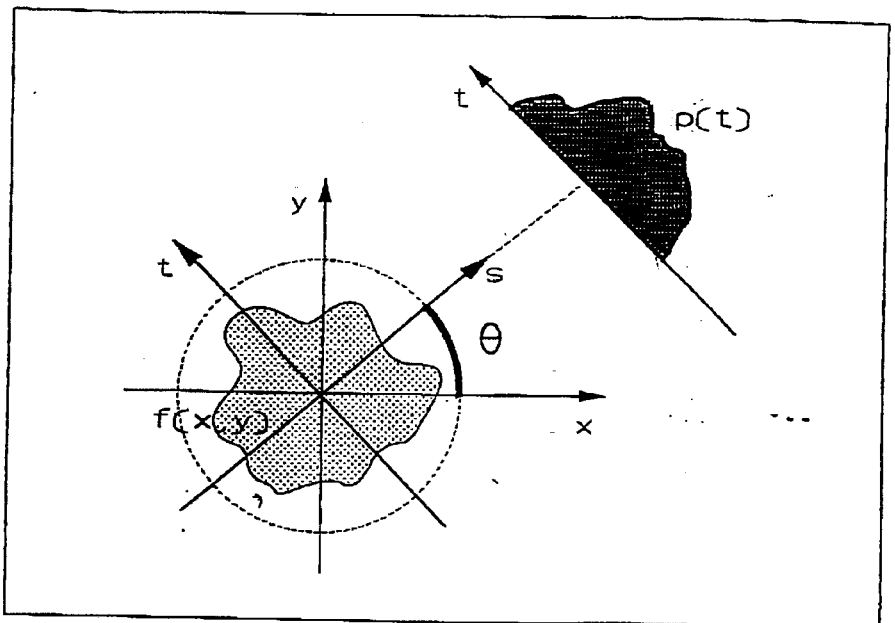

*Figure 5-6 The Geometry of Projection* physics of the particular situation. For example, x-ray systems are subject to an effect known as beam hardening, where the average energy of the x-ray photons increases as the beam propagates through tissue, violating the assumption that transmitted energy flux depends on the integral of tissue density. Another variation is the fan-beam geometry used by many x-ray systems, where the integration paths making up a projection are not mutually parallel. We address only the simple geometrical problem posed above because it is a starting point for a wide range of applications.

Filtered Backprojection

The Fourier-transformed projections $p$ are related to the 2D Fourier transform $F$ of the density $f$ by the Fourier Slice Theorem. It states that the transform of a projection $$P(k_t) = \int p(t) e^{-2\pi i k_t t} dt \qquad (21)$$

is equal to the function found from the 2D transform of the density $$F(k_x, k_y) = \iint f(x,y) e^{-2\pi i \vec{k}\cdot\vec{x}} dx\,dy \qquad (22)$$

by taking values from the line in the $(k_x,k_y)$-plane passing through the origin and making an angle $\theta+90°$ with the $k_x$-axis, as shown in Figure 5-7a.

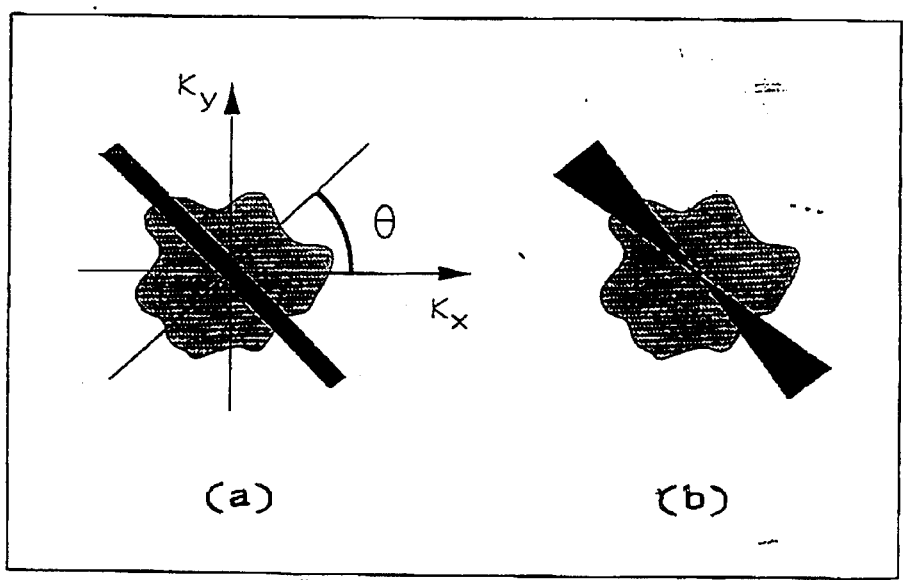

*Figure 5-7 A Slice in Fourier Space*

Clearly, a reconstruction can be done by generating the 2D field $F(k_x,k_y)$ via interpolation from the transformed projection data $P_\theta(k)$, where the projections $p$ have been sampled at a sufficiently fine spatial resolution $dt$ and angular spacing $d\theta$. The density function $f$ is then obtained from an inverse 2D transform of $F$.

Although the preceding prescription seems very straightforward, the filtered backprojection algorithm is more often employed in practice. Consider a set of projections at equally spaced angles covering the interval $0° \leq \theta < 180°$. This suffices for our simple integrals; though real applications often benefit from 360° coverage. Consider projection $p_\theta(t)$. If one constructs a density function $g$ such that $$g(x,y) = c\, p_\theta(-x \sin\theta + y \cos\theta) \qquad (23)$$

then one has "backprojected" $p_\theta$ to the (x,y)-plane. The constant c can be adjusted to make the θ-projection of $g$ equal to $p_\theta$. Simply backprojecting all the $p$'s will not reconstruct the original density. This is understood with the help of the Fourier Slice Theorem: the projections $P(k)$ contribute too heavily at the low spatial frequencies by a factor of $1/|k|$. Each projection contributes a band (as in Figure 5-7a) with a width determined by the extent of the $p(t)$ measurement. Ideally, one would like to sum pie-slice-shaped contributions to Fourier-space as suggested in Figure 5-7b. This situation can be approximated by filtering (weighting) the $P(k)$ with the function $|k|$. In practice one also rolls-off the high frequencies in $P(k)$ to an extent that depends on the angular sample spacing and measurement noise. The desired density is reconstructed by backprojecting the complete set of filtered projections $p'(t)$ in (x,y)-space. The advantages of filtered backprojection for medical imaging systems are:

1. Filtering and backprojection can begin for each projection as soon as it becomes available. Reconstruction thus proceeds in parallel with data collection. 2D Fourier reconstruction requires all the data to be available at the start.

2. To control patient exposure, one can add projections incrementally until the desired information is evident.

3. Properly interpolating projection data in 2D Fourier-space is more complicated than the linear interpolation used in backprojection.

A MeshSP Implementation

At first sight, one might assume the backprojection geometry to be ill-suited to mesh SIMD processing. In fact, the reconstruction problem can be implemented on the MeshSP in a very straightforward way and with nearly complete efficiency. The key is to map the desired density function to the 2D slave array and pass each projection function through all the slaves via the interprocessor communication network. The 8x8 algorithm proceeds as follows:

1. A TCB is constructed which will transmit one filtered projection $p'(t)$ to a neighboring slave. A one-dimensional ring of connections is established between the 64 slaves, so that a projection function may be passed through all the slaves in bucket-brigade fashion by calling the CM() function 63 times. A suitable communication pattern on the toroidally connected MeshSP array is shown in Figure 5-8.

2. 64 projections are downloaded to the slaves via the SIO system. Each slave receives one projection. The projections may represent any angles. Reconstruction from these angles may proceed while additional data are being collected. The complete reconstruction may consist of many sets of 64 projections. If the total number of projections is not a multiple of 64, the number is augmented with zeroed projections.

3. Each slave filters its projection data. We implement the filtering as a weighting of the transformed $P(k)$. The projections $p$ are zero-padded to avoid wrap-around aliasing. An inverse transform provides the filtered projections $p'$ in real-space.

4. Each slave initiates communication of the filtered projection to the next slave. This is carried out concurrently with the backprojection operation. For a square array of width N samples, each filtered projection requires $N*sqrt(2)$ samples to permit backprojection to all parts of the final density. The filtered projection $p_i'$ is accompanied by the angle $\theta$ (to identify the projection) and the numbers $\sin\theta$ and $\cos\theta$ (to save computation).

5. Each slave backprojects to the area assigned to it. This is done with a loop over the final points $f(x,y)$, a coordinate transform to t, and a linear interpolation between projection data cells. Because each slave is concerned only with the density cells assigned to it, there is no wasted computation.

6. The concurrent combination of communication and backprojection repeats for subsequent projections.

7. While the 64 backprojections are in progress, the next set of 64 projections can be downloaded in the background via the SIO system.

8. After all projections have been processed the reconstructed density $f$ is uploaded to the Host via the SIO.

The assertion that this MeshSP algorithm proceeds efficiently depends on the ability to "hide" the data transfers behind the backprojection computation. The transfer of the projection to the next slave is always nearest-neighbor and requires $4*N*sqrt(2)$ cycles. The backprojection operation is performed for $(N/8)^2$ cells, with an estimated 10 cycles per cell required for the coordinate rotation and linear interpolation. For N=256, the communication time is 15% of the computation time.

MeshSP Timing

An estimate of the real time to reconstruct is made with the following definitions:

$N^2$  is the number of cells in the output density.

A36

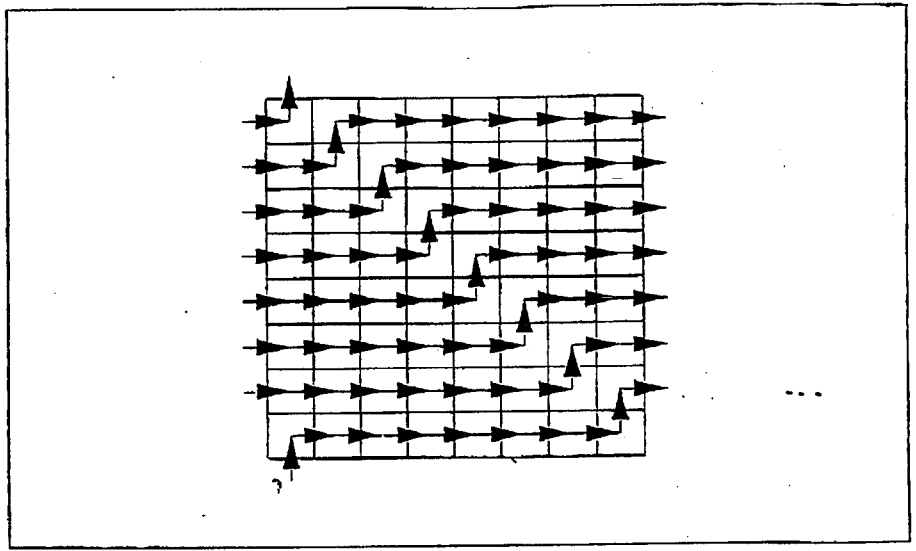

*Figure 5-8*
*A 1-D Communication Ring on a 2D Toroidal Processor Array*

N      is the number of non-zero cells in a projection.

2 N      is the number of cells in a zero-padded projection.

1.42 N      is the number of cells in a filtered projection.

$S^2$      is the number of MeshSP slaves in the square array.

M      is the number of projections (a multiple of $S^2$).

Timing estimates are given below for various components of the algorithm for the following case: N=256, S=8, M=1024. A 40MHz processor clock is assumed.

*Projection download:* Time is allocated to download the first $S^2$ projections to the slave array via the SIO. Subsequent downloads happen in the background during computation. Each MeshSP slave column receives NS data points at $5 \times 10^6$ bytes/sec. The required time is $8NS \times 10^{-7}$ sec = 2 ms.

*Round trip FFTs:* Each slave transforms the zero-padded projection of a real array of 2N samples for each new set of projections ($M/S^2$ sets). The one-way transform time is approximately $1.0(2N)\log_2(2N)$ cycles. The required time is $(NM/S^2)\log_2(2N)10^{-4}$ sec = 37 ms.

*Filtering:* Weighting by the precomputed k-space filter requires $(M/S^2)2N$ multiplications and stores. The required time is $N(M/S^2)10^{-6}$ sec = 4 ms.

*Backprojection:* This requires 10 cycles per density cell per projection. There are $(N/S)^2$ cells per slave. The required time is $.25M(N/S)^2 10^{-6}$ sec = 262 ms.

*Density Upload:* Each MeshSP-1 column must upload $SN^2$ floats over the bit-serial SIO at 5M bytes/sec. The required time is $N^2/S \; 4 \times 2 \times 10^{-7}$ sec = 7 ms.

The total reconstruction time of a 256x256 cell density function from 1024 projections is 312 ms. Other reconstruction times are listed in Table VIII for different image sizes and numbers of projections.

Table VIII
Time for Reconstruction (seconds)

| Image size | Projections | | | | |
|---|---|---|---|---|---|
| | 128 | 256 | 512 | 1024 | 2048 |
| 128 x 128 | .013 | .023 | .044 | .086 | .17 |
| 256 x 256 | .046 | .084 | .17 | .31 | .61 |
| 512 x 512 | .17 | .31 | .60 | 1.2 | 2.3 |
| 1024 x 1024 | .66 | 1.2 | 2.3 | 4.5 | 8.9 |
| 2048 x 2048 | 2.6 | 4.7 | 9.0 | 17. | 35. |

REFERENCES

[1] I. H. Gilbert, *The Synchronous Processor*, The Lincoln Laboratory Journal 1, No. 1, (Spring 1988).

[2] *ADSP-21060 SHARC, Preliminary User's Manual*, Analog Devices, (September 1993).

[3] Gallivan, K. A. et. al., "Parallel Algorithms for Dense Linear Algebra Computations", SIAM Review, vol. 32, no. 1, pp 54-135 (1990).

[4] Bertsekas, D. P. and J. N Tsitsiklis, *Parallel and Distributed Computation*, Englewood Cliffs, NJ: Prentice Hall, (1984).

[5] Press, W. H., et. al., *Numerical Recipes in C*, 2nd Edition, New York, NY: Cambridge University Press (1992) p36.

[6] ibid., p55.

[7] Terrance Sejnowski and C.R. Rosenberg, NETtalk: *A parallel network that learns to read aloud*, Dept. of Electrical Engineering and Computer Science, Johns Hopkins University, Baltimore MD, Technical Report 86-01 (1986).

[8] David Rumelhart, Jay McClelland, and the PDP research group, *Parallel Distributed Processing, Volume 1*, Cambridge, MA: MIT Press (1986) pp 322-328.

[9] A. C. Kak and M. Slaney, *Principles of Computerized Tomographic Imaging*, New York, NY: IEEE Press (1988).

I claim:

1. Digital data processing apparatus for synchronously processing data from a host computer, comprising:

program memory means for storing data, and bus means connecting said program memory means to the host computer;

a master processor element and an array of slave processor elements, said master processor element having means to access said data within said program memory and for broadcasting instructions to said array; and input/output module means connected to communicate with said bus means and having a plurality of data links connected to said array, each of said data links providing serial communication with selected slave processor elements;

wherein each of said slave processor elements comprises
(i) an input/output processor section having interprocessor communication links for communicating data through link ports to and from selected other processor elements within said array, and further having means for communicating data to and from said input/output module means, the input/output processor section being programmable to through-route data by defining transfer leg specifications including link port selection and leg durations,
(ii) internal memory means having a storage capacity of at least 128 kilobytes for storing executable code and data, and
(iii) a core processor section for processing said executable code and said instructions, each of said processor sections being operable independently from the other of said processor sections;

said slave processor elements synchronously executing at least one of said instructions and said executable code.

2. Digital data processing apparatus according to claim 1, wherein each of said slave processor elements further comprises means for supporting either SIMD or MIMD processing.

3. Digital data processing apparatus according to claim 1, further comprising a host computer having an interface for communicating with external users and means for controlling said apparatus.

4. Digital data processing apparatus according to claim 1 wherein said master processor element and said slave processor elements have identical architectures.

5. Digital data processing apparatus according to claim 1 wherein said processor elements are compatible with single instruction-stream multiple data-stream operation, and further comprising means for communicating data amongst said processor elements as a single instruction-stream multiple data-stream.

6. Digital data processing apparatus according to claim 1 wherein each of said slave processor elements further comprises means for communicating on a nearest-neighbor mesh with selected others of said slave processor elements.

7. Digital data processing apparatus according to claim 1, further comprising buffer means for electronically buffering said instructions between said program memory and said array.

8. Digital data processing apparatus according to claim 1, further comprising means for simultaneously providing data stored in said program memory to said master processor element and said array.

9. Digital data processing apparatus according to claim 1 wherein said input/output processor section comprises six interprocessor communication links, four of said interprocessor communication links providing nearest-neighbor mesh communication with four adjacent slave processor elements, two other interprocessor communication links providing fault tolerance with two of said four adjacent slave processor elements in the event of a failure.

10. Digital data processing apparatus according to claim 9 wherein said array is arranged with a sequence of slave processor elements located in the X direction and a sequence of slave processor elements located in the Y direction, and further comprising means for toroidally connecting said slave processor elements such that each slave processor element is no further than four X locations and four Y locations from any other of said slave processor elements.

11. Digital data processing apparatus according to claim 1 wherein said array comprises a plurality of columns of said slave processor elements, and wherein each of said data links connects to a separate column.

12. Digital data processing apparatus according to claim 11 wherein said input/output processor section provides at least five megabytes per second throughput, and wherein said bus means and each of said data links provide at least forty megabytes per second throughput.

13. Digital data processing apparatus according to claim 1, further comprising means for communicating a slave ready signal between said master processor and said array, and wherein said array comprises means for generating said slave ready signal after processing either of said instructions and said executable code.

14. Digital data processing apparatus according to claim 1, further comprising means for communicating an interrupt between said master processor and the host computer, and wherein said master processor comprises means for generating an interrupt to request selected services from the host computer.

15. Digital data processing apparatus according to claim 1, further comprising means for communicating control signals between the host computer and said master processor, said master processor further comprising means for responding to said control signals.

16. Digital data processing apparatus according to claim 1 wherein said apparatus is arranged as a PC-compatible printed circuit board, further comprising means for interfacing with additional printed circuit boards containing said slave processor elements.

17. Digital data processing apparatus according to claim 1 wherein each of said interprocessor communication links is a multiple bit-wide data path.

18. Digital data processing apparatus according to claim 1, further comprising means for specifying an arrangement of data as at least one transfer control block data structure, said data structure having a transmit data block and a receive data block, said transmit data block describing a data transfer to a slave processor element, said receive data block describing a data transfer from a slave processor element.

19. Digital data processing apparatus according to claim 18 wherein said input/output processor section further comprises a direct memory access controller having a transmit channel for transmitting data, and a receive channel for receiving data, each of said processor elements further comprising means for loading said transmit channel with said transmit data block, and for loading said receive channel with said receive data block.

20. Digital data processor apparatus according to claim 19 wherein said data structure has a word indicating whether additional transfer control blocks are connected to said transfer control block, and wherein said input/output processor section further comprises auto-chaining means for successively loading and unloading said data blocks in said channels when said word indicates additional connected transfer control blocks.

21. Digital data processing apparatus according to claim 19, wherein said core processor section further comprises means for storing a starting address of said transmit data block in said transmit channel, and for storing a starting address of said receive data block in said receive channel.

22. Digital signal processing apparatus according to claim 21 wherein said transfer control block data structure further includes a word indicating whether additional transfer control data blocks are included in a connecting group of data, said direct memory access controller further having means for interpreting said word and for automatically loading and unloading said additional data blocks without interfering with said core processor section.

23. Digital data processing apparatus according to claim 1 wherein a transfer through plural slave processor elements is controlled by the transfer leg specifications in the plural slave processor elements.

24. A digital data processing apparatus as claimed in claim 1 wherein:

the interprocessor communication means comprises a set of selectable link ports; and the input/output processor section further comprises:

an input/output register set for holding data transferred between the internal memory means and the selectable link ports and data transferred between selectable link ports; and an I/O controller which, for successive data elements, performs a direct memory access to read the data elements from the internal memory means to the input/output register set and, after a programmable number of cycles of data transfers between selectable ports through the input/output register set, performs a direct memory access to write the data elements from the input/output register set to the internal memory means.

25. A digital data processing apparatus as claimed in claim 24 wherein the I/O controller selects transmit and receive link ports and is programmed by means of a transfer control data structure which identifies memory addresses for the direct memory accesses, selects transmit and receive link ports and identifies the programmable number of cycles of data transfers.

26. A digital data processing apparatus as claimed in claim 25 wherein the transfer control data structure further comprises transmit and receive subarray parameters defining a two dimensional subarray and by which the I/O controller determines addresses from which data elements are read and addresses into which data elements are written.

27. A digital data processing apparatus as claimed in claim 25 wherein the data structure further comprises a chain pointer for pointing to subsequent transfer control data structures for automatic reprogramming of the I/O controller and continued data transfer.

28. A digital data processing apparatus as claimed in claim 24 wherein the I/O controller is programmable to write data into memory from the input/output register set in each of said programmable number of cycles in a broadcast communication mode.

29. A monolithic processor element for use in a synchronous digital data processing system, comprising:

(i) an input/output processor section having interprocessor communication means for transferring data through link ports to and from selected other monolithic processor elements in the system, and further having serial port means for transferring data to and from the system, the input/output processor section being programmable to through-route data by defining transfer leg specifications including link port selection and leg durations;

(ii) external port means for receiving instructions for the system, and for communicating interrupts to the system;

(iii) a core processor section for processing instructions and data, each of said processor sections being operable independently from the other of said processor sections; and (iv) internal memory means having a storage capacity of at least 128 kilobytes for storing data and executable code, and further having bus means for communicating with said processor sections and said external port means;

said processor element being programmably operable to synchronously process data in conjunction with other processor elements in the system.

30. A monolithic processor element according to claim 29 wherein said processor element has a throughput rate of at least 120MFLOPS.

31. A monolithic processor element according to claim 29, further comprising means for processing data as either SIMD or MIMD compatible data.

32. A monolithic processor element according to claim 29 wherein said interprocessor communication means comprises a plurality of multiple bit-wide data paths.

33. A monolithic processor element according to claim 29 wherein said interprocessor communication means comprises six nibble ports for communicating on a nearest-neighbor mesh with other processing elements in the system, each of said nibble ports providing a 4-bit wide data path.

34. A monolithic processor element according to claim 29 wherein said input/output processor section further comprises means for transferring two-dimensional arrays of data.

35. A monolithic processor element according to claim 34 wherein said means for transferring two-dimensional arrays comprises a direct memory access controller having multiple data channels.

36. A monolithic processor element as claimed in claim 29 wherein:

the interprocessor communication means comprises a set of selectable link ports; and the input/output processor section further comprises:

an input/output register set for holding data transferred between the internal memory means and the selectable link ports and data transferred between selectable link ports; and an I/O controller which, for successive data elements, performs a direct memory access to read the data elements from the internal memory means to the input/output register set and, after a programmable number of cycles of data transfers between selectable ports through the input/output register set, performs a direct memory access to write the data elements from the input/output register set to the internal memory means.

37. A monolithic processor as claimed in claim 36 wherein the I/O controller selects transit and receive link ports and is programmed by means of a transfer control data structure which identifies memory addresses for the direct memory accesses, selects transmit and receive link ports and identifies the programmable number of cycles of data transfers.

38. A monolithic processor as claimed in claim 37 wherein the transfer control data structure further comprises transmit and receive subarray parameters defining a two dimensional subarray and by which the I/O controller determines addresses from which data elements are read and addresses into which data elements are written.

39. A monolithic processor as claimed in claim 37 wherein the data structure further comprises a chain pointer for pointing to subsequent transfer control data structures for automatic reprogramming of the I/O controller and continued data transfer.

40. A monolithic processor as claimed in claim 36 wherein the I/O controller is programmable to write data into memory from the input/output register set in each of said programmable number of cycles in a broadcast communication mode.

* * * * *